INVENTORS:
JAMES B. WAGNER
KENNETH O. STRANEY
BY Isidore Match
ATTORNEY

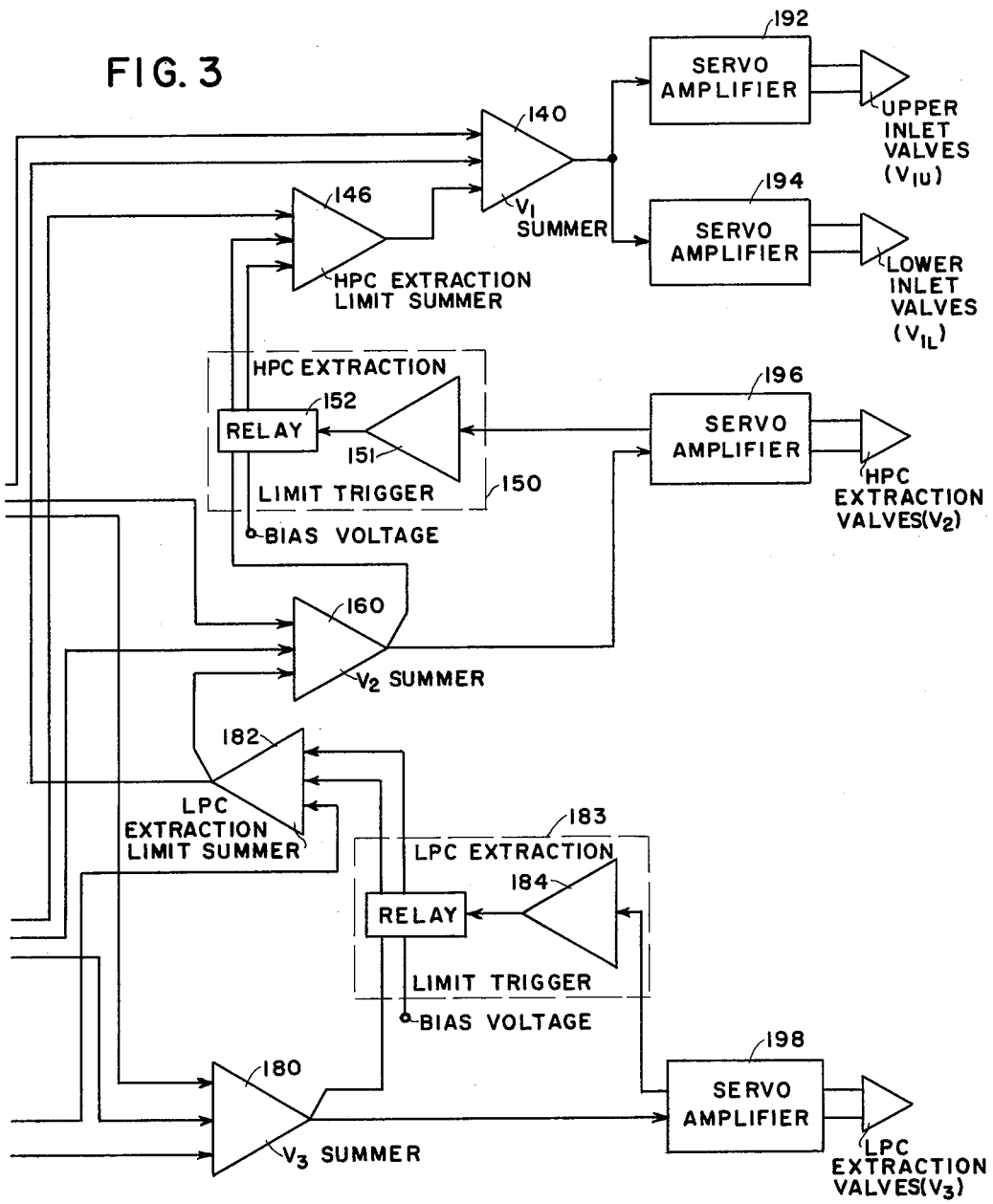

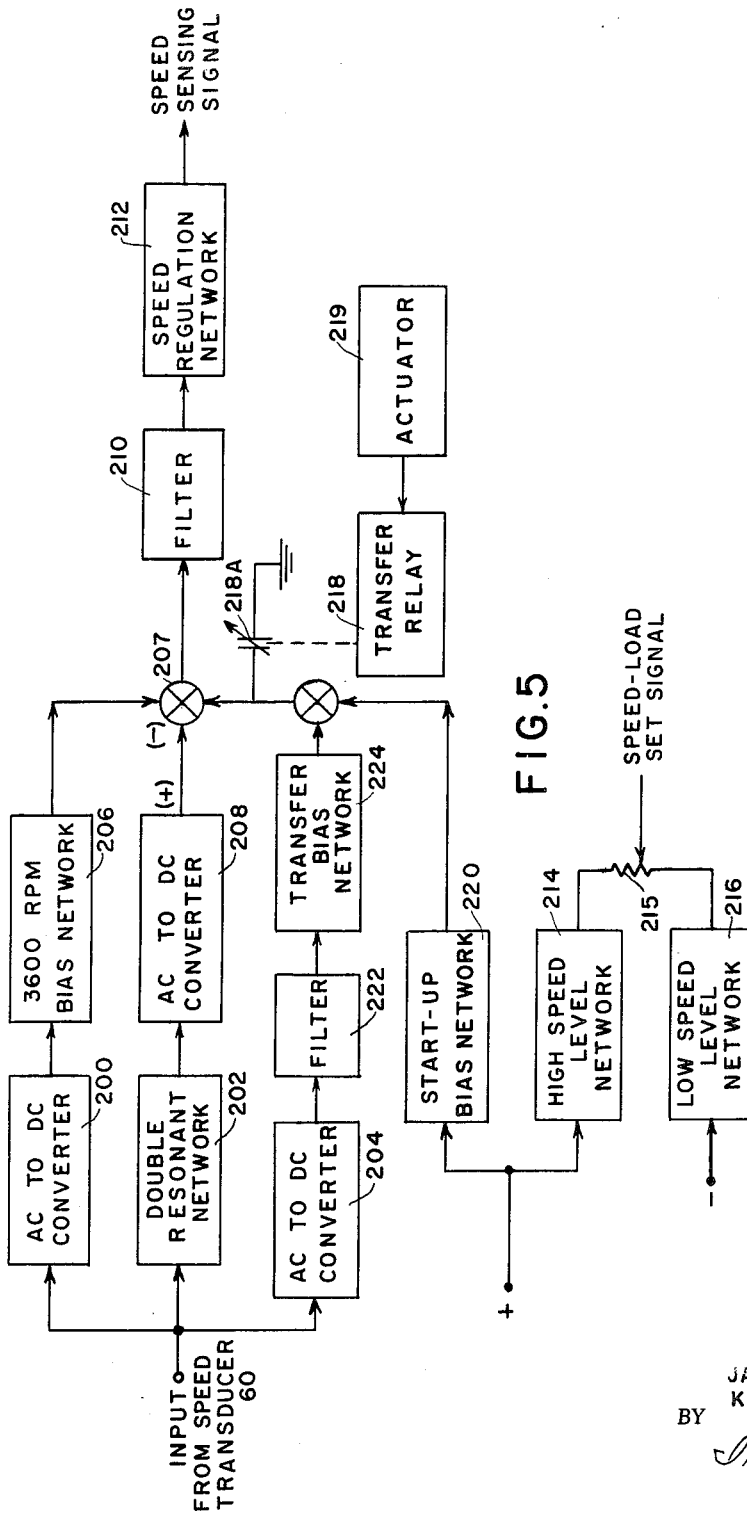

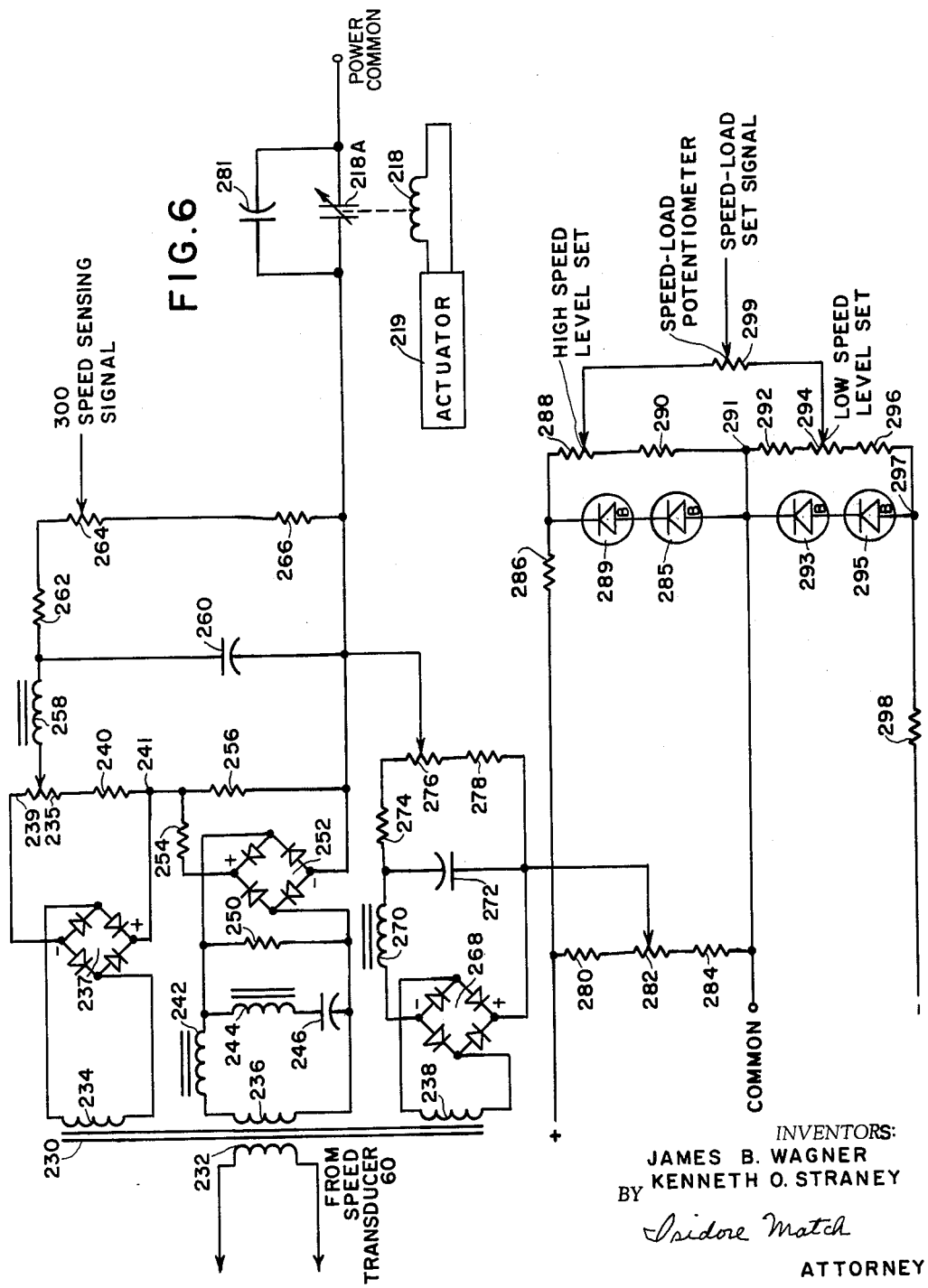

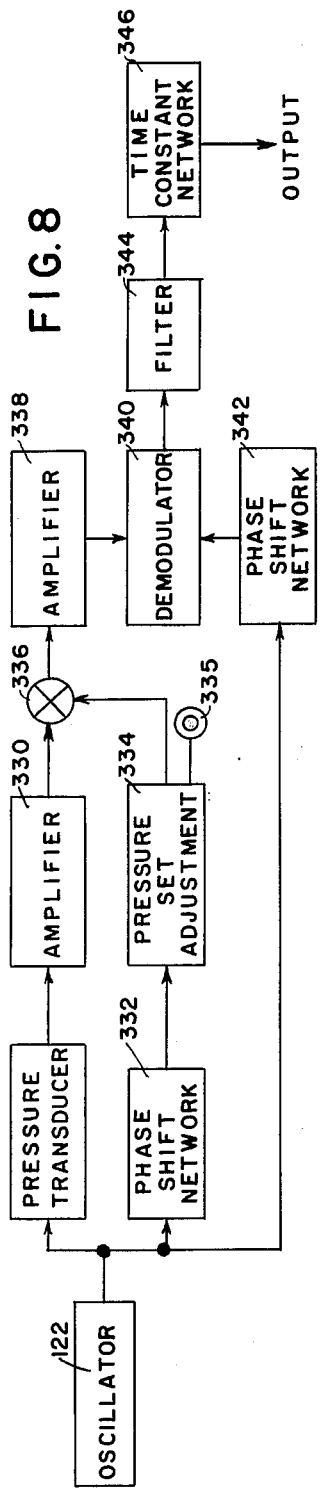
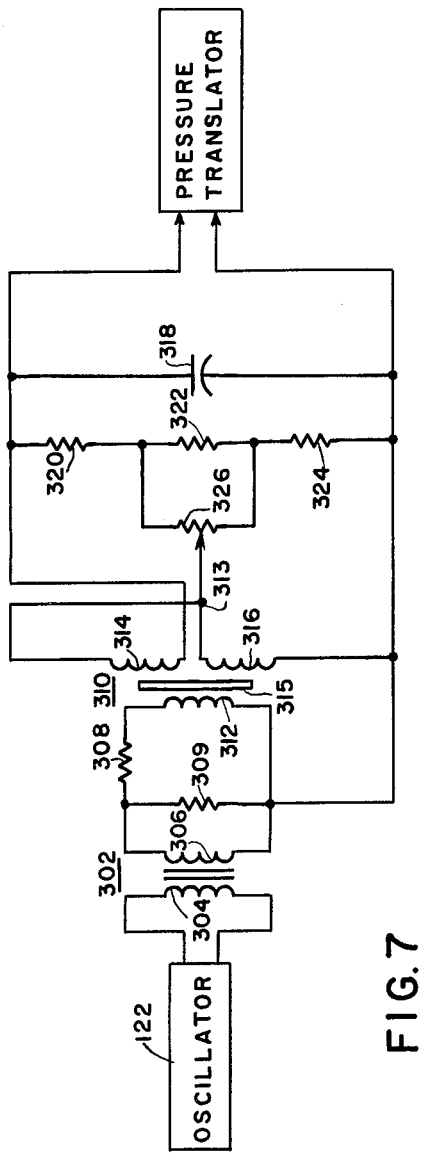

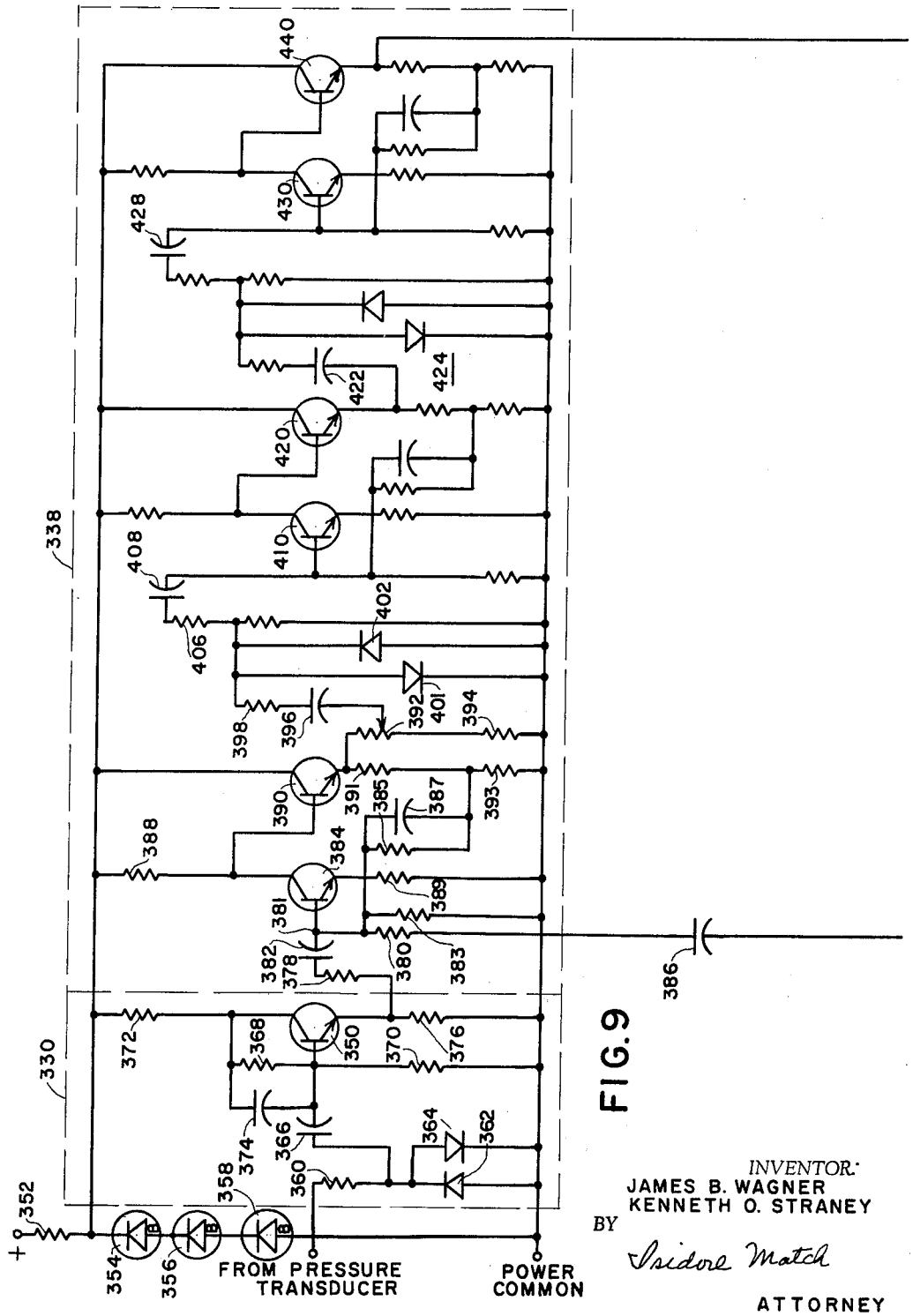

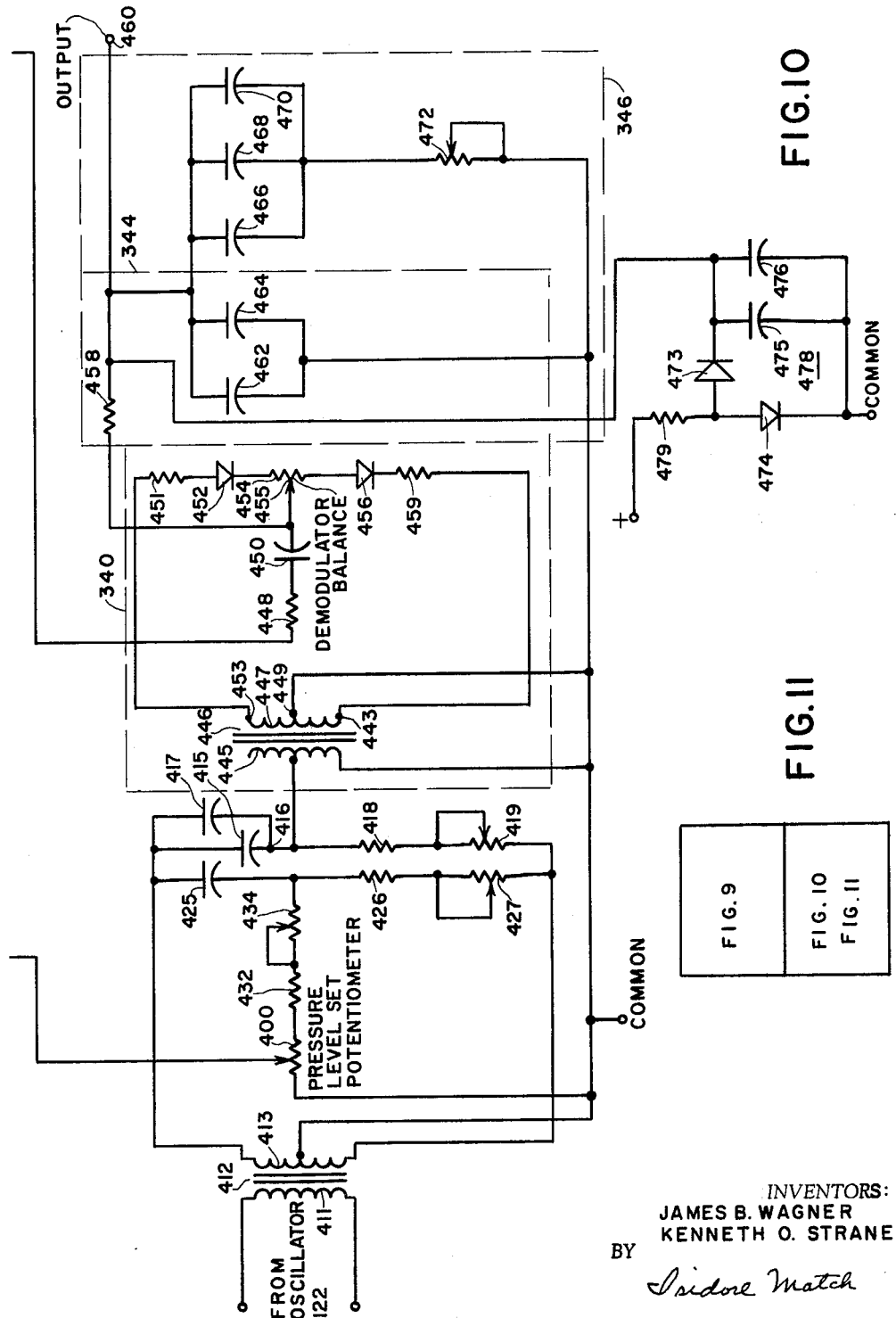

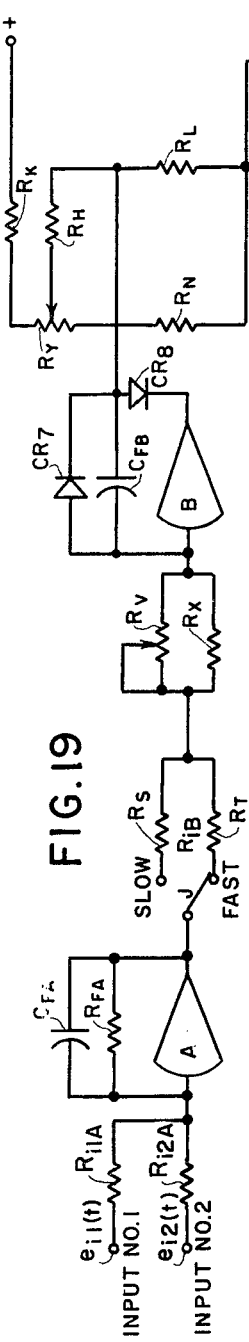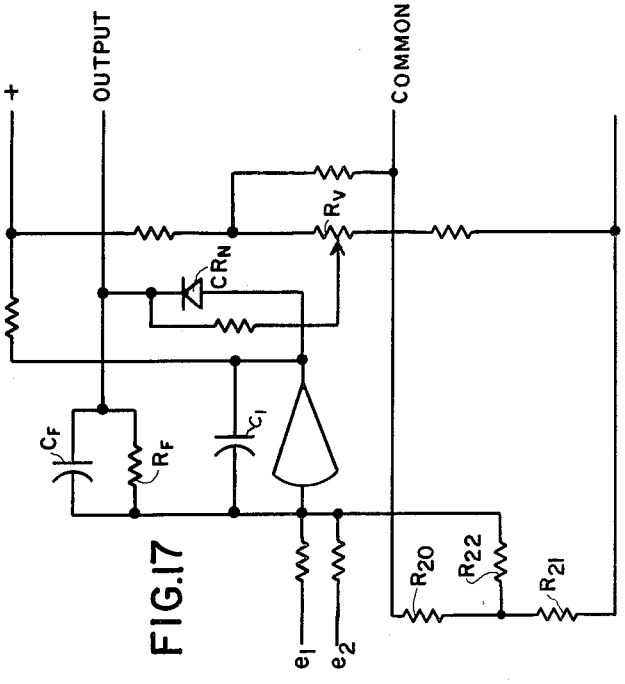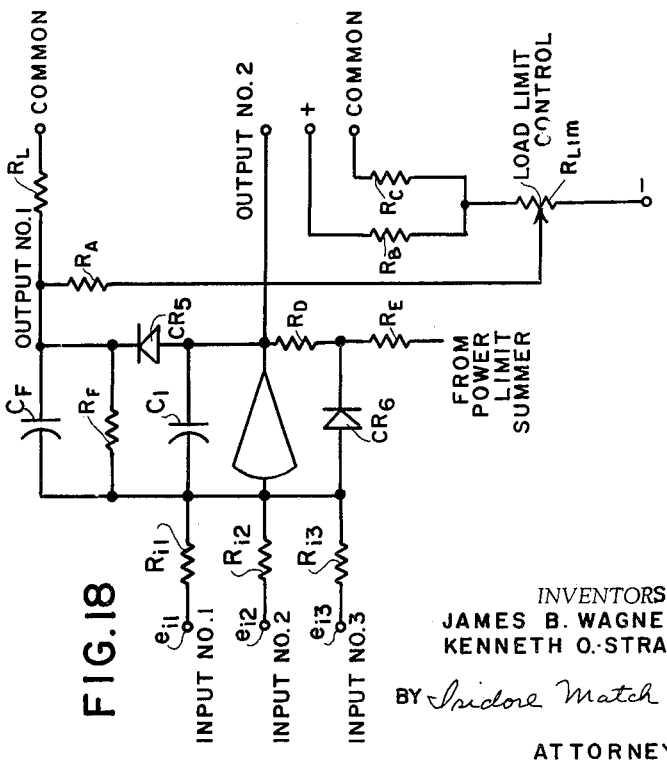

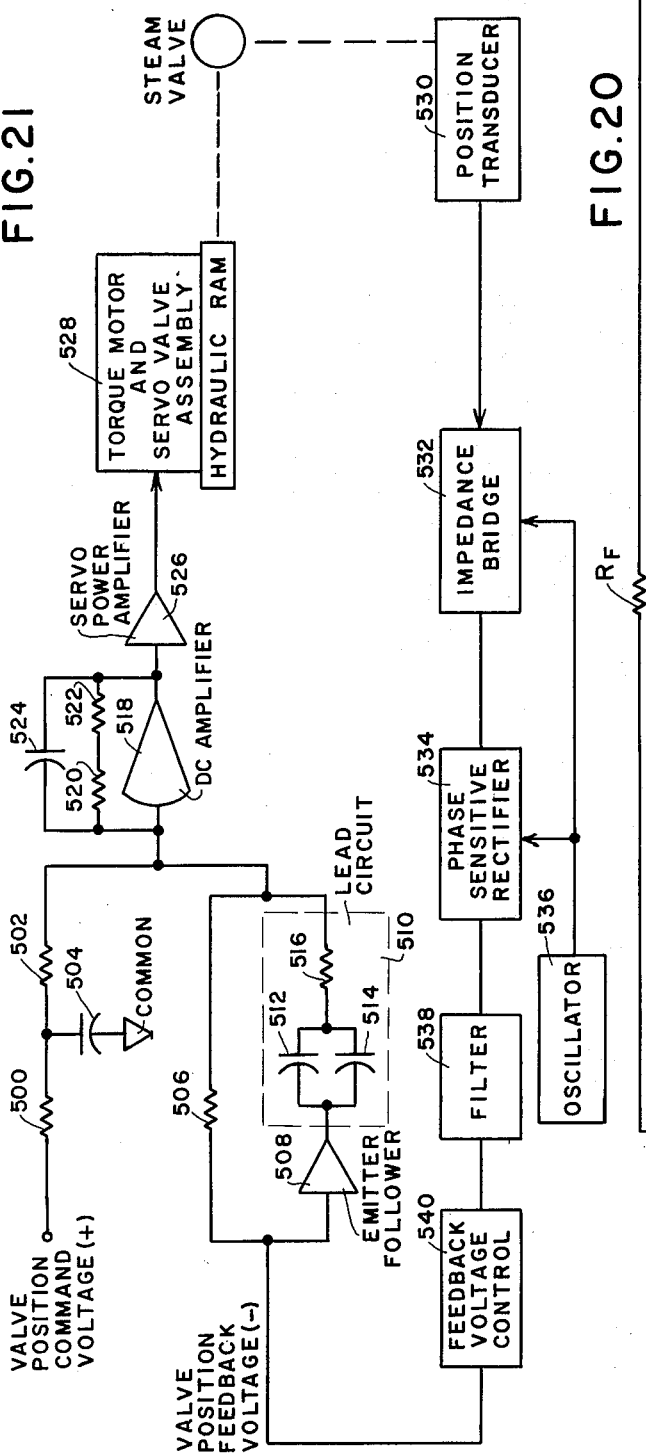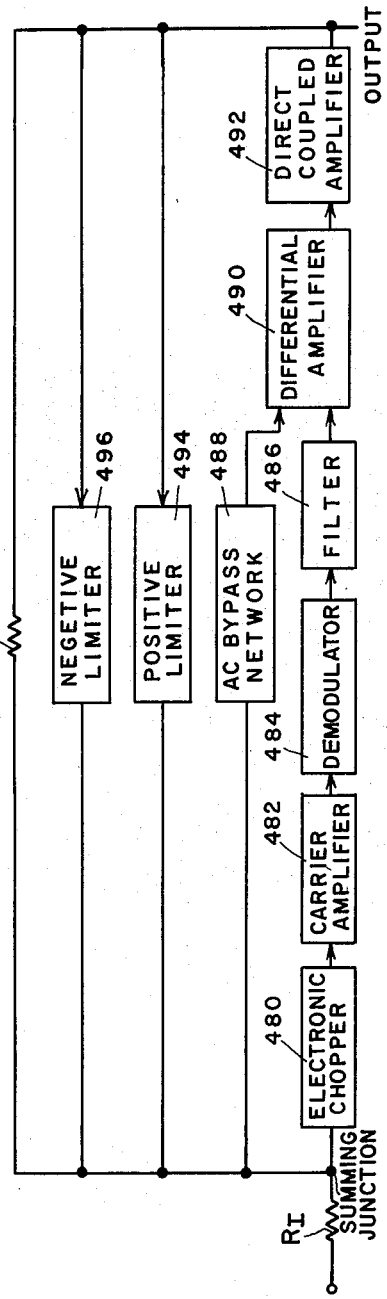

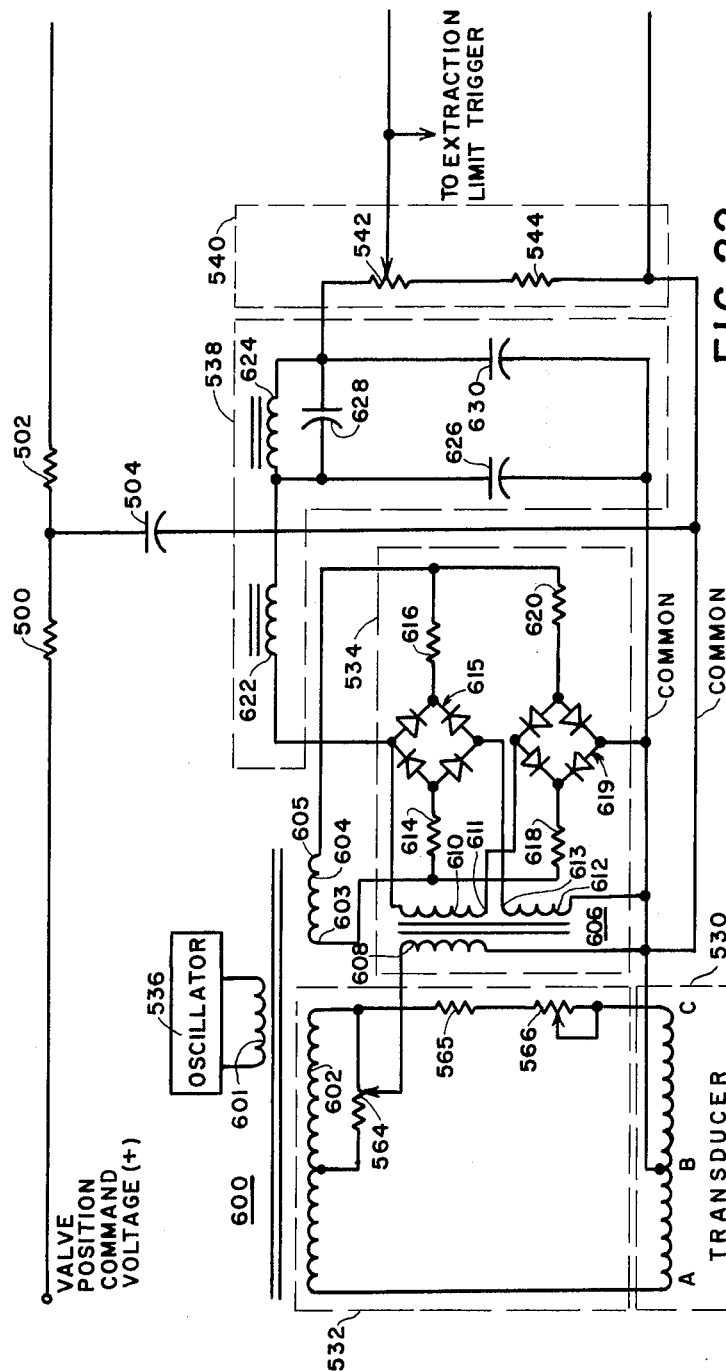
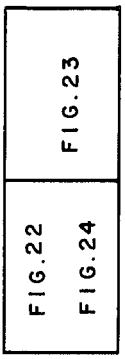

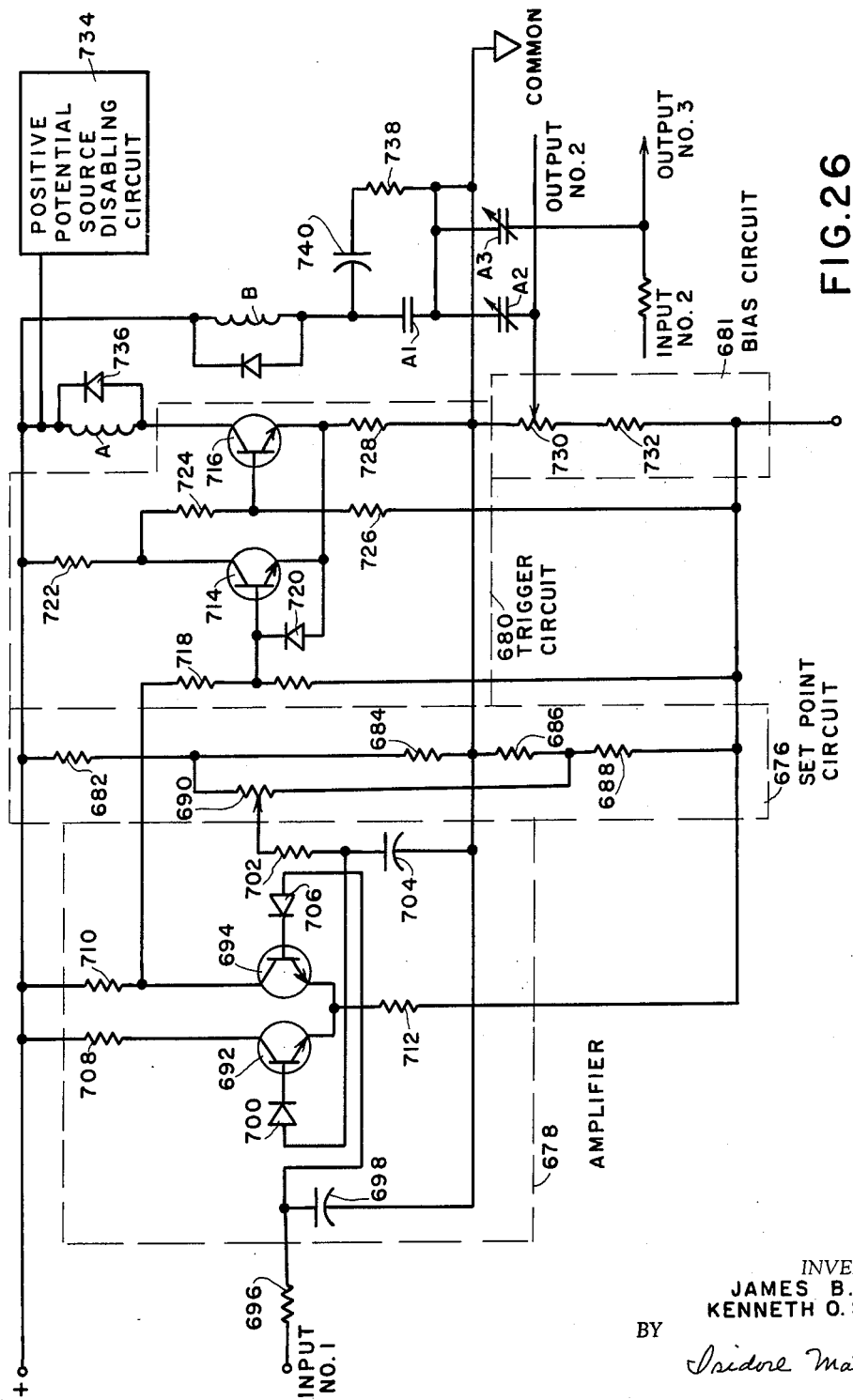

United States Patent Office 3,233,413
Patented Feb. 8, 1966

3,233,413
CONTROL SYSTEM
James B. Wagner, Lynnfield, and Kenneth O. Straney, Danvers, Mass., assignors to General Electric Company, a corporation of New York
Filed June 21, 1963, Ser. No. 289,477
57 Claims. (60—105)

This invention relates to electric control systems for elastic fluid turbines. More particularly, it relates to an electric control system suitable for use with multi-stage elastic fluid turbines of the plural extraction and mixed pressure type.

In multi-stage, elastic fluid turbines of the type having a plurality of extraction conduits connected to a corresponding number intermediate stages thereof for removing fluid therefrom under different intermediate pressures respectively, each of the stages to which the extraction conduits are connected has an interstage valve arrangement. Such valve arrangement is operatively associated and cooperates with the inlet valves of the turbine and the valve arrangements of the other extraction conduits to maintain substantially constant the pressure of the fluid in the extraction conduits respectively connected to such stages. Ordinarily, the fluid used is steam and the steam extracted from the turbine through these conduits is employed for some useful purpose such as process steam, heating, etc. When conduits are connected to intermediate stages of the turbine respectively for the purpose of being supplied with fluid either from these intermediate stages or from an external source, in such case, the intermediate stages are termed mixed pressure stages.

If only one conduit is connected to an intermediate stage comprising an interstage valve arrangement, then such turbine is designated as a single automatic extraction type turbine. If two conduits are connected to two different intermediate stages, each of the stages comprising respective interstage valve arrangements, then such turbine is generally described as a double automatic extraction type turbine. If the exhaust steam provided through an exhaust conduit is utilized for some useful purpose, then such turbine is generally described as a double automatic extraction non-condensing type turbine.

In the operation of a double automatic extraction condensing type turbine, the pressure in a first extraction conduit, i.e. the conduit proximal to the inlet valves, is greater than the second extraction conduit, the former being suitably designated as the high pressure conduit and the latter being designated as the low pressure conduit. The exhaust conduit in this type of turbine is, of course, distal to the low pressure conduit and the pressure of steam therein is lower than that in the low pressure conduit.

When steam is extracted from the two intermediate conduits of the double automatic extraction, condensing type turbine, during operation thereof, it is desirable to control the regulation provided by the respective positions of the inlet valves and the interstage valves in such a manner that the speed of the turbine is maintained substantially constant irrespective of the changes in the load on the turbine and even though the requirements for extraction steam may vary considerably. Also, it is desirable to maintain pressure of the steam in the extraction conduits at respectively substantially constant values despite any changes in requirements for extraction steam and irrespective of changes in electrical load.

In U.S. Patent No. 3,064,435 to Wagner and Straney for "Control System," filed August 14, 1961, issued November 20, 1962, and assigned to the General Electric Company, assignee of this application, there is shown and described an electrical control system for elastic fluid turbines of the double extraction type which is efficacious for dynamically controlling the positions of the inlet valves and the high pressure conduit and low pressure conduit extraction valves in the turbine to effect the regulation of the speed of the turbine and the pressure in the extraction conduits. However, in the control system disclosed in the aforesaid patent, no provision is made for making a preference between speed and pressure regulation at a time when either or both of the high and low pressure extraction conduit valves are in the closed position whereby the design limits of the turbine have been reached and extraction pressure can no longer be controlled. It is desirable to provide for such preference, to insure the maintaining of speed-load regulation in this extraction pressure limited situation and to further insure the maintaining of over-speed protection in the event of the total loss of electrical load.

Where the turbine is of the double automatic extraction, non-condensing type and it is desired to utilize the steam in the exhaust conduit for a useful purpose but it is not desired to regulate the pressure in the exhaust conduit, then speed and extraction conduit pressure control may also be effected to maintain substantially constant, turbine speed, irrespective of changes in the load and the varying of the requirements of extraction conduit steam.

However, where in the double automatic extraction, non-condensing type turbine, it is also desired to regulate the pressure in the exhaust conduit, then the local turbine has to be tied into a parallel arrangement of a plurality of turbines having a load bus common to all of the turbines and/or to the distribution line of a utility network. In a parallel arrangement, the local turbine generator combination is connected to the load bus through a generator breaker. A load bus is connected to a utility network distribution line through a tie line breaker. In a parallel arrangement and/or a utility network tie in, frequency control of the local turbine generator is maintained by the arrangement and/or the network. Thus, parallel operation permits exhaust pressure control wherein the fluid flow through the turbine can be controlled to maintain exhaust conduit pressure with the resultant change in real power developed by the turbine generator without a consequent change in system frequency.

In the control system of the aforesaid patent, wherein the local turbine would be a unit tied into a multiple generating system, no provision is made for controlling pressure in the exhaust conduit in cooperation with the control of the other speed and pressure variables of the system. Clearly, where the turbine is of the non-condensing type, such control is required to maintain the interrelationship between speed load regulation and high pressure conduit, low pressure conduit and exhaust conduit pressure regulation.

There are situations wherein, in a multiple extraction type turbine, the high pressure conduit may be utilized either for providing extraction steam and/or admitting steam into the turbine. Where such arrangement is used, provision has to be made for controlling admission pressure in accordance with the over-all control of the turbine.

In the operation of steam turbines, the possibility always exists that the initial pressure of steam admitted thereinto may suddenly fall to so low a level that water in the liquid state is actually admitted itno the turbine with the consequent deleterious effects that result therefrom. One of these deleterious effects is the so-called "water-carryover" to a turbine, i.e. the actual admission of water in the liquid state into the turbine, and provision has to be made in the control system for insuring that at the time that initial pressure falls to the dangerous possible water-carryover level, that the turbine steam flow must be automatically reduced so that its possibility of occurrence is minimized.

As was stated hereinabove, when a local turbine generator is integrated into a multiple system, the frequency is controlled by arrangements which maintain the frequency of the whole system. When the local turbine generator is the sole source of power, then the frequency of the turbine generator may vary substantially because of periods of heavy load, and periods of light load coupled with the "drooping" speed-load characteristic of the turbine. Consequently, when devices have to be operated by the turbine which require precise frequency such as electric clocks, synchronous motors and the like, provision has to be made to insure that the frequency of the turbine output is substantially constant, i.e. that the turbine operates isochronously.

If the generator breaker connecting the local turbine generator to the local load bus should open, an acute crisis may be presented due to the abrupt loss of load of the local turbine generator and the consequent great rapid increase in speed thereof. Provision has to be made in such situation to insure that the control system of the turbine maintains speed at a safe level irrespective of the demands made for controlling extraction or exhaust pressure. If the tie line between the local load bus and the utility distribution line should open through an unforeseen cause such as a lightning stroke, the local turbine might be subjected to deleterious effects due to a drastic change in speed and its load may be similarly so subjected. In such emergency situation, it is necessary that the local turbine at least maintain its essential load at the proper frequency. To insure the maintaining of such essential load at such frequency, provision has to be made to maintain speed regulation of the local turbine in such a contingency. To effect this, there has to be an automatic transfer of control from exhaust conduit pressure control to speed regulation.

Accordingly, it is an important object of this invention to provide an improved electrical control system for elastic fluid turbines of the double automatic extraction condensing type.

It is another object to provide an electrical control system for elastic fluid turbines of the double automatic extraction non-condensing type for accurately controlling the speed of the turbine shaft and the pressure in a pair of extraction conduits and in the exhaust conduit.

It is still another object to provide an electrical control system in accordance with the preceding objects for controlling admission pressure in the high pressure conduit.

It is a further object to provide an electrical control system in accordance with the preceding objects to automatically commence reducing the turbine load commensurately with a decrease in initial pressure of steam admitted into the turbine at a predetermined initial pressure and to substantially decrease the load to zero at a chosen minimum initial pressure, thereby to lower the steam flow into the turbine and to prevent water-carryover into the turbine.

It is still a further object to provide an electrical control system in accordance with the preceding objects in which a preference is made for speed regulation when the extraction valves in one or both of the extraction conduits assume the closed position whereby pressure in these conduits are no longer susceptible to regulation.

It is also an object to provide an electrical control system in accordance with the preceding objects wherein exhaust conduit pressure regulation is maintained and wherein an abrupt rapid increase in speed of the local turbine in a parallel arrangement is minimized if the turbine should be disconnected from its electrical load.

It is yet a further object to provide an electrical control system in accordance with the preceding objects wherein an automatic transfer may be made from exhaust pressure to speed regulation when the turbine is suddenly disconnected from a utility distribution line.

It is yet another object to provide an electrical control system in accordance with the preceding objects where isochronous operation of the turbine is maintained when it is in a unitary generating system.

Generally speaking and in accordance with the invention, there is provided an elastic fluid, multi-stage turbine connected into an arrangement of a plurality of turbines, the arrangement including means for controlling the frequency of the turbines therein, a rotatably mounted output shaft, inlet valve means governing the flow of fluid into the turbine, a first extraction conduit connected to a first intermediate stage of the turbine, a second extraction conduit connected to a second intermediate stage of the turbine, an exhaust conduit, first interstage valve means governing the portion of the fluid which flows through the first extraction conduit, second interstage valve means governing the portion of fluid which flows through the second extraction conduit. There is further provided the combination comprising first, second, third and fourth means for generating respective first, second, third and fourth signals. The first means is responsive to the speed of the output shaft, the first signal being a function of such speed; the second means is responsive to the pressure in the exhaust conduit, the second signal being a function of the exhaust conduit pressure; the third means is responsive to the pressure in the first extraction conduit, the third signal being a function of the first extraction conduit pressure; and the fourth means is responsive to the pressure in the second extraction conduit, the fourth signal being a function of the second extraction conduit pressure. Means are also provided for modifying the first signal with the second signal to provide a first resultant signal, for modifying the first resultant signal with the third and fourth signals, for modifying the third signal with the first resultant signal and the fourth signals, and for modifying the fourth signal with the first resultant signal and the third signal, the modified first resultant signal controlling the position of the inlet valve means, the modified third signal controlling the position of the first extraction valve means, and the modified fourth signal controlling the position of the second extraction valve means.

The novel features of this invention which are believed to be new are set forth with particularity in the appended claims. The invention itself, however, may best be understood by reference to the following description when taken in conjunction with the accompanying drawings which show an embodiment of a control system in accordance with the invention.

In the drawings, FIG. 1 is a schematic view partly in section of a multi-stage turbine provided with two intermediate stages to which there are respectively connected extraction conduits and having inlet valve means and interstage valve means associated therewith, and an exhaust conduit and including the control system of this invention;

FIGS. 2 and 3 taken together as in FIG. 4 is a block diagram of the control system of the invention;

FIG. 5 is a block diagram of a circuit suitable for use as the speed translator in the system of FIGS. 2–4;

FIG. 6 is a schematic depiction of a circuit represented by the block diagram of FIG. 5;

FIG. 7 is a schematic diagram of an arrangement suitable for use as the pressure transducers in the system of FIGS. 2–4;

FIG. 8 is a block diagram of a circuit suitable for use as the pressure translators in the system of FIGS. 2–4;

Figure 2:
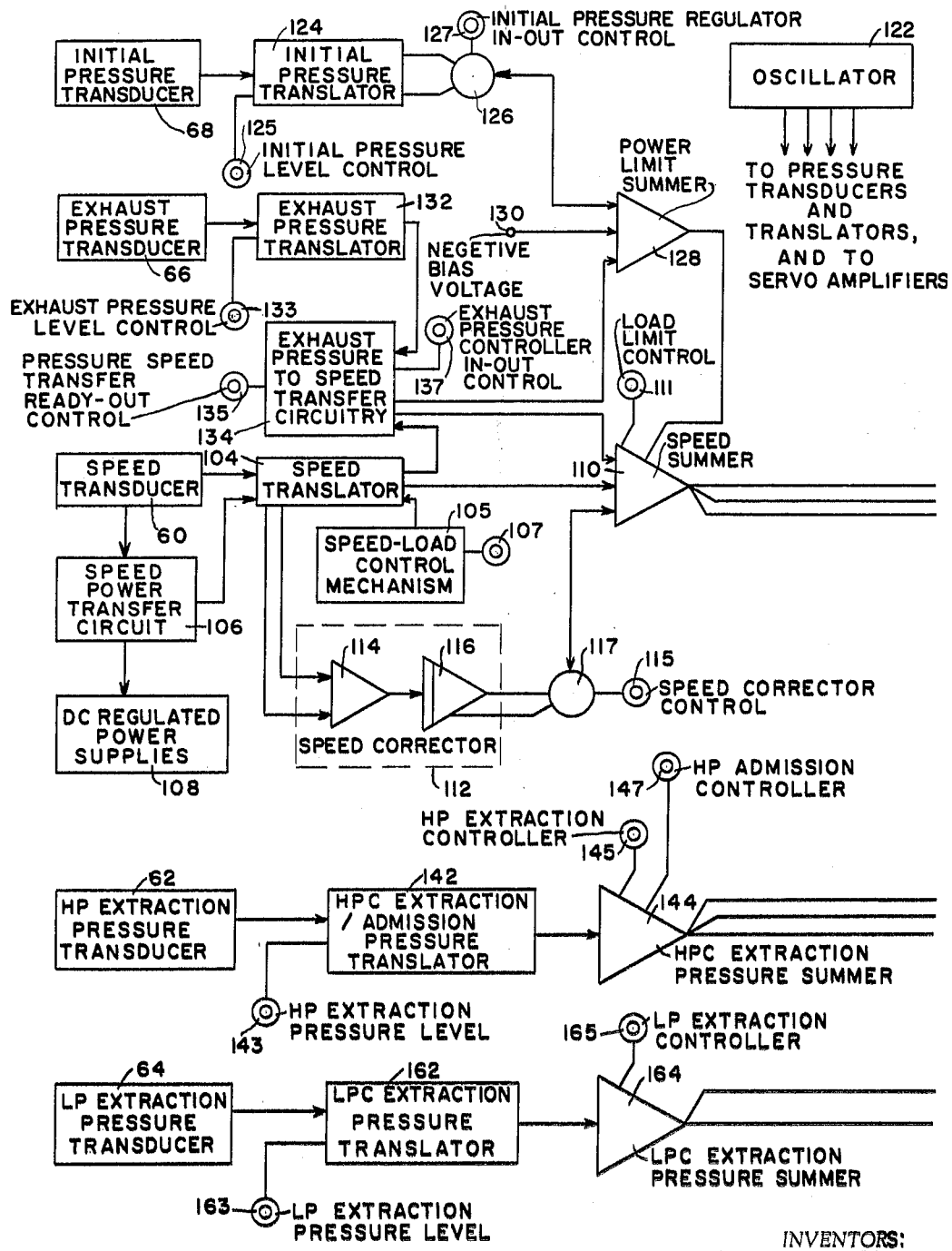
Figure 12:
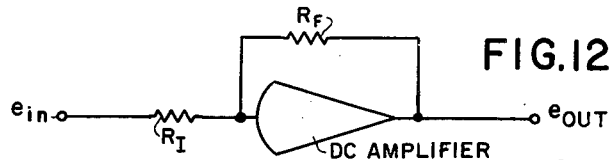
Figure 13:
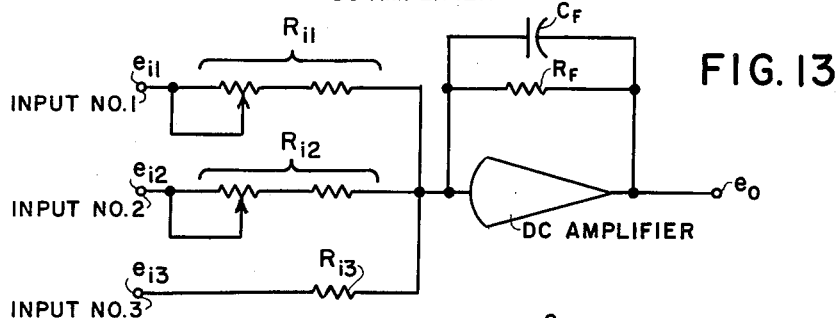
Figure 14:
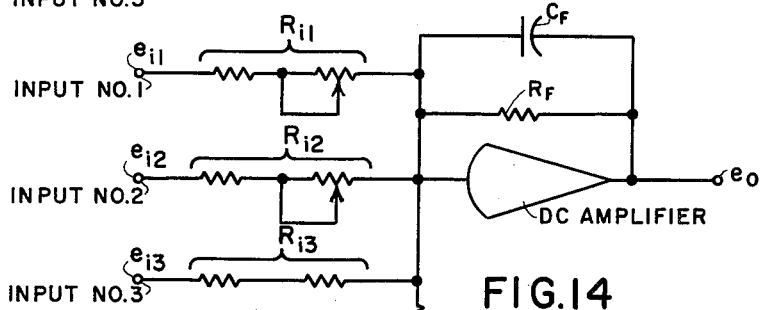
Figure 25:
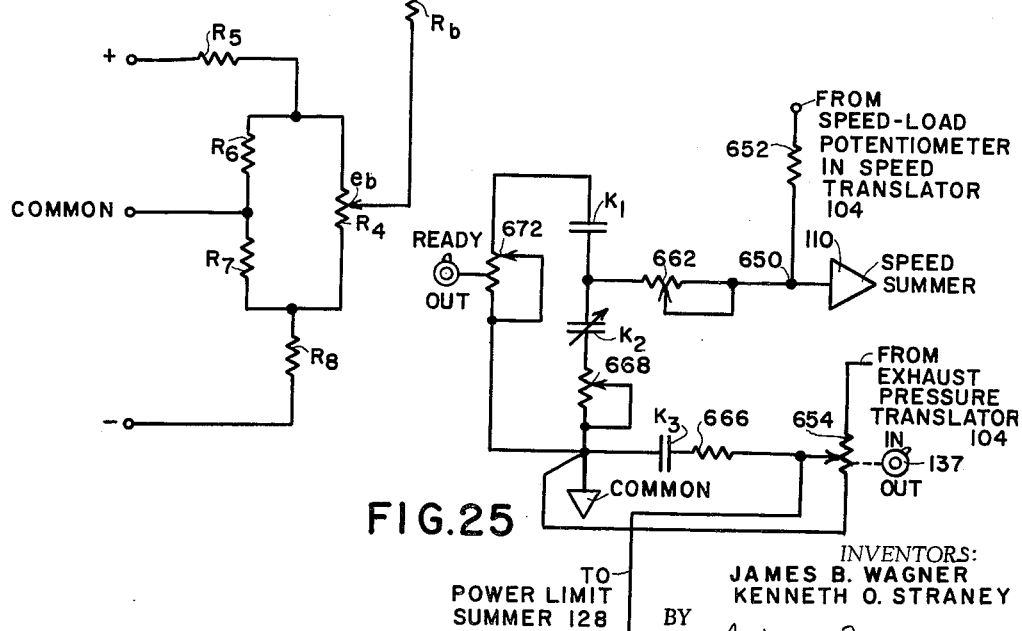
Figure 16:
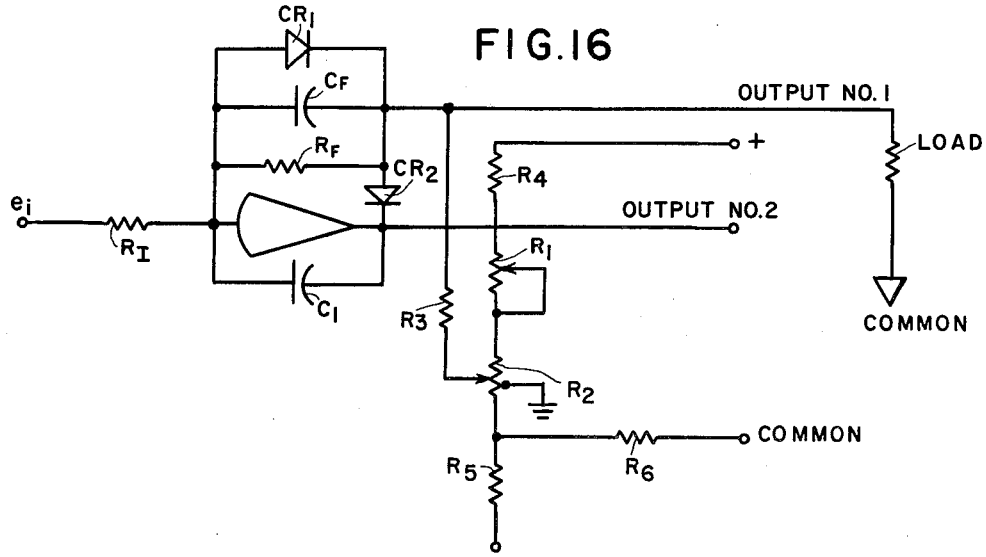
Figure 15:
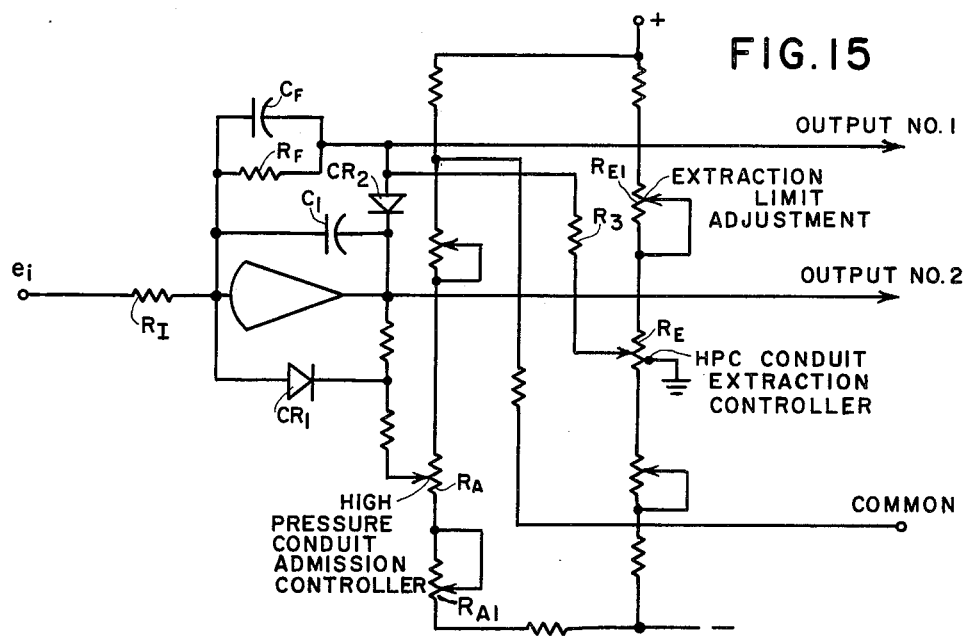
Figure 23:
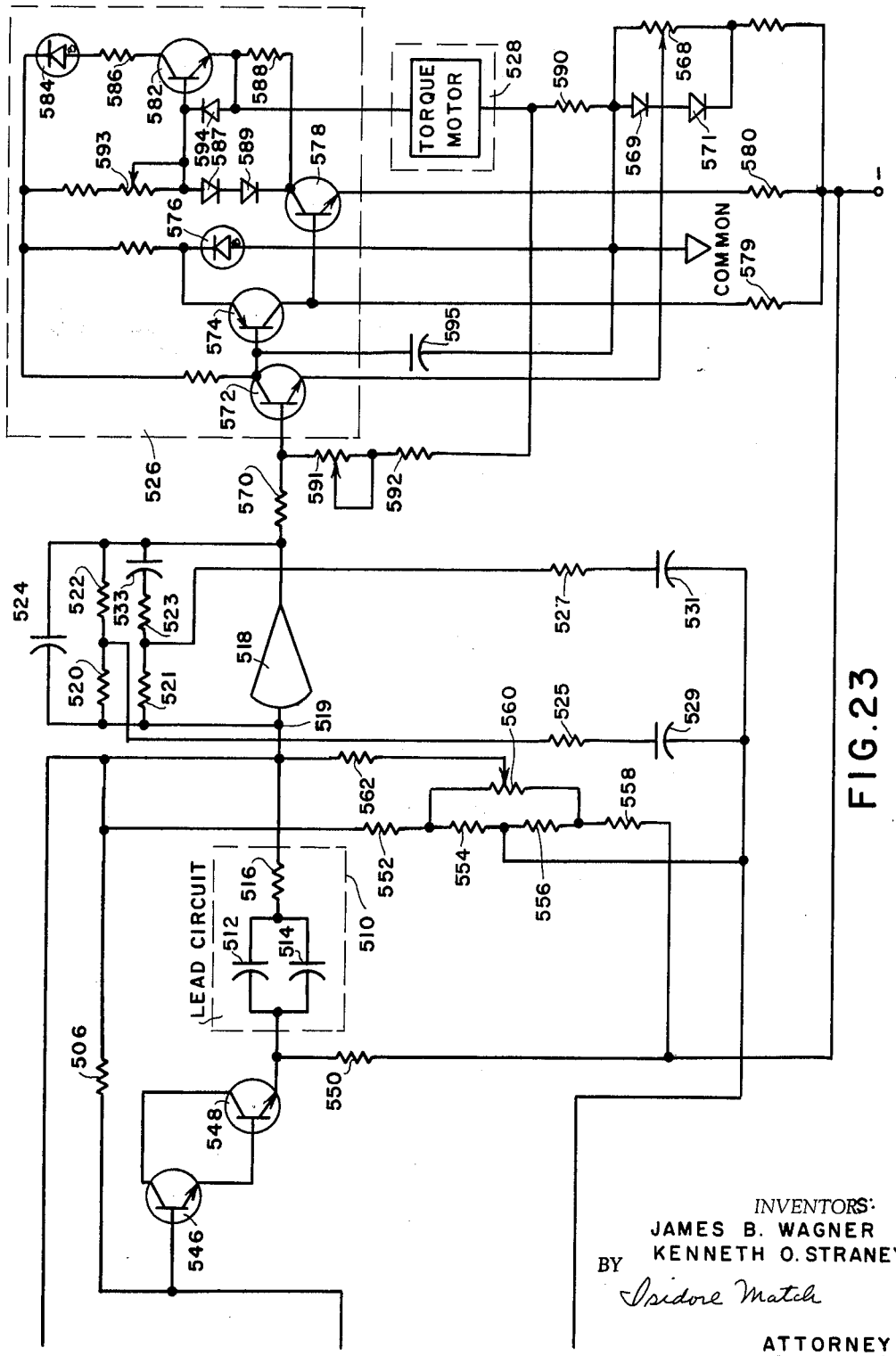

FIGS. 9 and 10 taken together as in FIG. 11 is a schematic diagram of a circuit represented by the block diagram of FIG. 8;

FIG. 12 is a diagram of an operational summing amplifier suitably utilized in the system of this invention;

FIG. 13 is a block diagram of a three-input summer which may be used as the extraction limit summers of the system of FIGS. 2–4;

FIG. 14 is a block diagram of a three-input summer with an internal bias injector which is suitable for use as the valve position command voltage summers of the system of FIGS. 2–4;

FIG. 15 is a diagram of a one-input summer with a variable positive series voltage limiter and a variable negative feedback voltage limiter which is suitable for use as the high pressure conduit extraction pressure summer of the system of FIGS. 2–4;

FIG. 16 is a diagram of a one-input summer with a variable positive voltage limiter and a fixed negative voltage limiter which is suitable for use as the low pressure conduit extraction pressure summer of the system of FIGS. 2–4;

FIG. 17 is a diagram of a three-input summer with a variable negative series voltage limiter and a variable negative voltage limiter controllable by an external voltage source suitable for use as the speed summer of the system of FIGS. 2–4;

FIG. 18 is a diagram of a summer suitable for use as the power limit summer of the system of FIGS. 2–4;

FIG. 19 is a diagram of a two-input summer and integrator suitable for use as the speed corrector stage of the system of FIGS. 2–4;

FIG. 20 is a block diagram of a D.C. amplifier suitable for use in the summers employed in the system of FIGS. 2–4;

FIG. 21 is a block diagram of a servo amplifier suitable for use in the system of FIGS. 2–4;

FIGS. 22 and 23 taken together as in FIG. 24 is a schematic diagram of a circuit represented by the block diagram of FIG. 21;

FIG. 25 is a schematic diagram of a circuit suitable for use as the exhaust pressure to speed transfer stage of the system of FIGS. 2–4; and FIG. 26 is a schematic diagram of a circuit suitable for use as the extraction limit triggers of the system of FIGS. 2–4.

Figure 1:
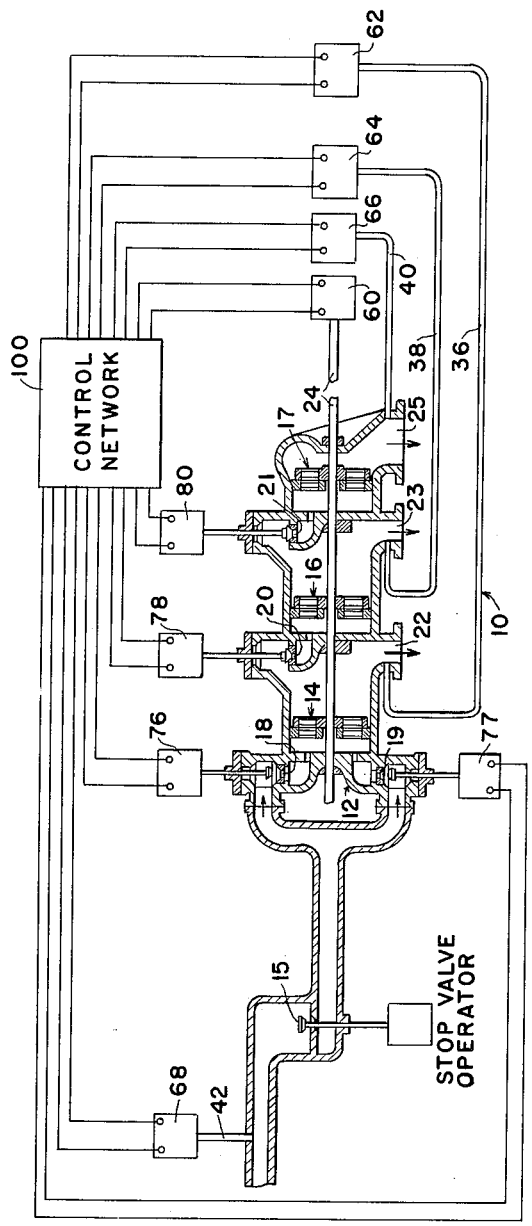

Referring now to FIG. 1, there is illustrated therein an elastic fluid double extraction condensing turbine generally designated by the numeral 10 and wherein there are included high pressure, low pressure and exhaust conduits together with the control system of this invention. Turbine 10 comprises a casing 12 supporting a rotatably mounted output shaft 24 and includes a plurality of stages, three representative stages being indicated respectively by the designating numerals 14, 16 and 17, stages 14, 16 and 17 respectively preceding each other.

In the arrangement shown, casing 12 carries the usual stationary diaphragms arranged in cooperating relationship with the usual wheels rigidly secured to the output shaft 24. Casing 12 is provided with upper and lower inlet valve means 18 and 19 respectively, interstage valve means 20 and interstage valve means 21, i.e. a high pressure extraction conduit control valve means and a low pressure extraction conduit control valve means and a stop valve means 15. Inlet valve means 18 and 19 control the flow of fluid from a boiler or other fluid source (not shown) to stage 14. Interstage valve means 20 controls the distribution of elastic fluid from stage 14 to the next stage 16 and through extraction conduit 22 thereby governing the quantity of extraction fluid in high pressure extraction conduit 22. Interstage valve means 21 controls the distribution of elastic fluid from stage 16 to the next stage 17 and through extraction conduit 23 thereby governing the quantity of extraction fluid in low pressure extraction conduit 23. It is, of course, understood that stop valve means 15, inlet valve means 18 and 19 and interstage valve means 20 and 21 in actual practice are each a multiple system of mechanically co-acting units which open sequentially in response to a single input mechanical motion such as provided by a hydraulic ram actuator. Casing 12 is further provided with an exhaust conduit 25 which may be connected to a condenser or a utilization device (not shown). The mechanical output of the turbine is taken from output shaft 24 in a suitable manner. For example, an electric power generator (not shown) may be operatively connected thereto as a load.

In the control system of the invention, the rotary motion of shaft 24 is applied to a transducer 60, suitably a permanent magnet generator, which serves to provide an electric signal whose amplitude and frequency are functions of the speed of shaft 24, the signal produced by transducer 60 being applied to a control network generally designated by the number 100. The pressure in high pressure extraction conduit 22 is transmitted by means of a pipe 36 to a pressure transducer 62 which provides an electric signal that is a function of the pressure in conduit 22; the pressure in low pressure extraction conduit 23 is transmitted by means of a pipe 28 to a pressure transducer 64 which provides an electric signal which is a function of the pressure in conduit 23; the pressure in exhaust conduit 25 is transmitted by a pipe 40 to a pressure transducer 66 which provides an electric signal which is a function of the pressure in conduit 25. To regulate initial pressure, such pressure is transmitted by a pipe 42 disposed before stop valve 15 to a pressure transducer 68 which provides an electric signal that is a function of such initial pressure. Actually conduits 22 and 23 may be provided with extraction check valves (not shown) to prevent reverse flow of steam from the extraction conduit to the turbine and blocking valves (not shown) to seal off the extraction line from the turbine when it is not in use. The high pressure conduit 22 may be provided with an admission control valve (not shown) for throttling steam during start up, such valve functioning in a manner similar to that of stop valve 15.

The electric signals respectively produced by transducers 60, 62, 64, 66 and 68 are applied to control network 100 wherein they are combined in accordance with the principles of the control system of this invention to provide control signals that are respectively applied to servo amplifiers 76, 77, 78 and 80. Servo amplifiers 76 and 77 are connected respectively to the stems of upper and lower inlet valve means 18 and 19 and servo amplifiers 78 and 80 are connected to the stems of interstage valve means 20 and 21 respectively, the servo amplifiers thereby controlling the respective positions of these valve means.

In FIGS. 2 to 4, there are shown in block form, an arrangement of the control system in accordance with the principles of the invention and including the speed transducer 60, the initial pressure transducer 68, the exhaust pressure transducer 66, the high pressure conduit extraction pressure transducer 62 and the low pressure conduit extraction pressure transducer 64.

Shaft 24 actuates speed transducer 60 to produce an output therefrom which is a sinusoidal voltage having an amplitude and frequency proportional to speed. This transducer may suitably be a permanent magnet generator of the type well known in the art. For example, in the event that there is utilized a fourteen pole permanent magnet generator, i.e. comprising seven pairs of poles, the frequency of this sinusoidal output is seven times the revolutions per second of turbine shaft 24. Thus, with a shaft speed of 3600 revolutions per minute, i.e., 60 revolutions per second, speed transducer 60 may provide a sinusoidal output voltage having a frequency of 420 cycles per second. The output from speed transducer 60 is applied as an input both to a speed translator stage 104 and to a speed power transfer circuit 106.

Speed power transfer circuit 106 functions to enable the utilization of the readily available A.C. line voltage for initially actuating the electrical system in the event that turbine shaft rotation is not occurring. Stage 106 itself may be powered by an A.C. voltage having a 60 cycle per second frequency. Of course, when turbine shaft 24 is rotating, the voltage output from speed transducer 60 is utilized to produce the supply voltage for the components of the control system of FIGS. 2 to 4. Speed power transfer circuit 106 may suitably be one such as shown in FIG. 6 of the aforesaid Wagner and Straney patent.

It is seen that the output of speed power transfer circuit 106 is applied as the supply voltage to a stage 108 which provides a positive regulated voltage supply, such supply suitably having a value of +30 volts, and which provides a regulated negative voltage supply which may have a value such as about −16 volts, these regulated voltages being the unidirectional supply voltages for the components of the control system.

Speed translator stage 104, a suitable example of which is shown in FIGS. 5 and 6, to which the output of speed transducer 60 is applied, operates to produce a direct current output voltage, i.e. a speed sensing signal, whose amplitude and polarity are proportional to the instantaneous deviation of the frequency of the alternating current input voltage thereto from a preset reference value of frequency. This D.C. output voltage suitably can be modified by an arrangement such as a relay circuit, which in response to an externally applied direct current voltage applied thereto, provides a positive direct current voltage output of a preset magnitude to furnish start-up bias voltage for the control system for that condition of operation where the alternating current voltage input has a zero frequency value. Contained in speed translator stage 104 is means such as a variable resistor, for example, which enables the selection of a maximum reference voltage level to provide a maximum speed level for turbine shaft 24 under no load conditions. As shown in FIGS. 5 and 6, this voltage level moves in the negative direction with increasing speed.

The stage 105 legended speed-load control mechanism essentially enables speed translator stage 104 to provide an additional function in producing a second direct current output voltage signal and to this end contains a potentiometer whose setting can be controlled externally, such as by a potentiometer control knob 107. Speed-load control mechanism stage 105 functions to enable the selection of a voltage level about which variations of turbine speed are referenced. As shown in FIGS. 5 and 6, this signal voltage may be chosen to be positive.

As will be further shown hereinbelow, the direct current signal voltages produced by speed translator stage 104 have a magnitude which influence the turbine steam valve positions in response to changes in existing turbine speed or load from a desired value. Thus, the manually adjustable output voltage from the speed translator stage 104 as enabled by speed load control mechanism stage 105 sets the desired turbine speed or load, such voltage conveniently being designated as the speed-load set signal. The other output voltage from the speed translator 104 is a measure of a change in existing turbine speed from the rated synchronized turbine speed, the aforedesignated speed sensing signal. As has been stated hereinabove, this speed sensing signal may be changed from zero at very low turbine speeds to insure that the proper steam valve positions can be obtained to start the turbine under all operating conditions, a start-up bias network being included in speed translator stage 104 to perform this function.

The speed sensing output signal of speed translator stage 104 is applied as one input to a summer 110 legended speed summer, a suitable example of which is shown in FIG. 17, and as a first input to a speed corrector stage 112, a suitable example of which is shown in FIG. 17. Speed summer 110 and the other summers in the system of this invention may suitably be inverting operational amplifiers arranged to function as adders or may be passive resistance network adders which are respectively operatively associated with the D.C. amplifiers which invert the input applied thereto. The speed-load set signal output of speed translator stage 104 is applied as the second input to speed corrector stage 112 and as an input to a stage 134 legended exhaust pressure to speed transfer circuitry, a suitable example of which is shown in FIG. 25 and whose function will be explained hereinbelow. The speed-load set signal is applied as an input to speed summer 110 through stage 134.

Speed corrector stage 112 which comprises a summer stage 114 and an integrator 116 in cascade arrangement functions to produce isochronous operation of the turbine when it is a unitary generating system or when the turbine generator is part of a parallel arrangement of turbine generators which are each tied to a common load bus by a generator breaker and the turbine equipped with a speed corrector control is utilized to establish isochronous operation for the parallel arrangement. Speed corrector stage 112 cannot be used when the frequency of the local turbine is being controlled by frequency controlling apparatus included in a multiple turbine generator system tied into a utility network. Associated with speed corrector stage 112 is a potentiometer 117 externally controllable by a knob 115. Potentiometer 117 is utilized only in an "in" and "out" position and enables the smooth insertion or removal of speed corrector stage 112 from service.

In considering the operation of speed corrector stage 112, let the condition be assumed where it is out of service. In such situation, there is applied to speed summer 110 only the speed sensing and speed-load set signals and the summed output of speed summer 110 is a D.C. signal which reflects the addition of the speed sensing signal to the speed-load set signal. Consequently, the speed-load set signal establishes the generated kilowatt power level since the larger such signal is, the further the inlet valves will open and, consequently, the larger the load. Speed summer 110 functions to compare these two signals and the D.C. output of speed summer 110 varies about the reference level established by the speed-load set signal as dictated by changes in turbine shaft speed. Consequently, with a chosen setting of the speed-load control potentiometer, speed will change only with a change in load.

The purpose of speed corrector stage 112 is to automatically maintain electrical system frequency at a constant preset value. This maintaining can be accomplished by continually adjusting the generated power to match exactly that of the load at a given frequency. Thus, considering the situation where speed corrector stage 112 is in service, it operates to compare the speed sensing signal with the speed-load set signal. When the difference between the two compared signal levels is zero, the turbine speed is the desired one and the output voltage of speed corrector stage 112 applied to speed summer 110 remains unchanged. However, should the network load change, the difference between the two signal levels would no longer be zero and there would result a different or "error" signal. The electrical sign associated with this error signal indicates whether instantaneous speed is too high or too low. With the sign convention wherein an increase in speed provides a negative increment of output voltage from speed translator 104, a positive output from speed corrector 112 would indicate too low a speed and a negative output would indicate too high a speed. The speed corrector error signal as produced at the output of summer 114 is the inversion of the sum of the speed sensing and speed-load set signal outputs from speed translator 104. The output of summer 114 is continuously monitored by integrator 116 which re-inverts the input thereto. Consequently, the output of speed corrector 112 is the phase with its set input and is in the direction to increase the output signal voltage level of speed summer 110 in the negative direction if the speed is too low and to effect the reverse if the speed is too high. It is, of course, to be realized that the output of integrator 116 is a signal which is the time integrated value of the deviation of the system from desired speed.

The initial pressure regulating channel in the system of FIGS. 2 to 4 functions to automatically cause the reduction of turbine steam flow to eliminate the possibility of "water-carryover" into the turbine in the event that the initial steam pressure should drop below a predetermined point.

In this channel, an initial pressure transducer 68 which suitably may be a Bourdon tube, differential transformer type transducer, a suitable example of which is shown in FIG. 7, is excited by an oscillator 122, transducer 68 sensing initial steam pressure and producing an A.C. output signal whose amplitude changes in response to a change in steam pressure from a predetermined level.

This A.C. voltage output from transducer 68 is applied to an initial pressure translator stage 124, a suitable example of which is shown in FIGS. 8–11. The function of initial pressure translator stage 124 is to provide a D.C. output voltage which is a specified linear function of a deviation in the amplitude of the A.C. input voltage thereto from an adjustable A.C. bias voltage which may suitably be provided by a potentiometer associated with translator 124. The value of this adjustable bias voltage may be externally controlled by a knob 125 which is operatively connected to the aforesaid potentiometer, the setting on the potentiometer determining the initial pressure point of operation, i.e. that voltage representing the pressure at which it is desired to initiate the limiting of flow of steam into the turbine. The gain of initial pressure translator 124 is chosen such that in coaction with the other components of the control system, the flow of steam to the turbine is reduced to one representing a no load value when a predetermined minimum initial pressure exists. The values of the circuit components in initial pressure translator stage 124 are selected such that a positive increment in output voltage is produced therefrom for a decrease in steam pressure within the aforesaid range of the initial limiting voltage to the no load value voltage. The setting on the potentiometer externally controlled by knob 125 determines the initial limiting voltage at which initial pressure regulation commences. Initial pressure translator 124 suitably includes means to insure that the output thereof is of positive polarity. A potentiometer 126 is provided associated with initial pressure translator stage 124 and controllable externally by a knob 127, potentiometer 126 being utilized only in an upper and a lower position, to enable the bringing of the initial pressure translator stage into and out of service gradually rather than abruptly.

To understand the operation of the initial pressure regulating channel, it is necessary to understand the operation of power limit summer 128, a suitable example of which is shown in FIG. 18, and speed summer 110 in connection therewith.

It has been shown that with respect to the outputs of speed translator stage 104 and speed corrector stage 112 that the output of speel summer 110 is a signal which varies about the speed-load set signal provided by speed-load control mechanism stage 105. It is recalled that since speed summer 110 contains an inverting amplifier, in accordance with the sign conventions set forth, a positive increment of output from speed summer 110 represents a need to decrease speed, i.e. to further close the inlet valves, and a negative increment of output therefrom indicates a need to increase speed and thereby to further open the inlet valves. Speed summer 110 also suitably contains a load limit potentiometer externally controllable by a knob 111 which sets a negative voltage limit for the output of speed summer 110. Consequently, speed summer 110 will permit unimpeded passage of the resultant of the summation of the speed sensing and speed-load set signals therethrough as long as this negative limit, i.e., the load limit does not provide an overriding signal. Such load limiting action occurs when the setting on the load limit potentiometer in speed summer 110 is less negative than the resultant of the summing of the speed sensing and speed-load set signals.

Now with the initial pressure regulating channel in service, let it be assumed that the positive output from translator 124 falls into the range set by the potentiometer controlled by knob 125 and the no load value voltage, with a decreasing initial pressure, the correspondingly positively increasing output of translator 124 will be inverted by the amplifier in power limit summer 128, and applied as a positively decreasing external voltage to speed summer 110. As initial pressure decreases within the operating range of translator 124 toward the no load value for the inlet valves, this external voltage functions in the operation of speed summer 110 to impose a negative limit on the output thereof, the voltage from translator 124 resulting in the no load value effecting an almost complete closure of the inlet valves. The no load value voltage output of speed summer 110 results from a voltage output of power limit summer 128 which is slightly negative in polarity. The values of the circuit components of power limit summer 128 are so chosen that a predetermined negative value output therefrom would result in an output from speed summer 110 to command a complete closure of the inlet valves. However, included in power summer 128 are means to insure that the output thereof is always slightly less negative than its predetermined value. This insures that there always is a slight negative output from speed summer 110 at the aforesaid no load value to permit a minimum flow of steam into the turbine and thereby prevent motoring of the turbine generator set. A negative bias voltage 130 of a given value is included in the input to power limit summer 128 to insure that there is no limit imposed on the output of speed summer 110 when there is no input to power limit summer 128 from either initial pressure translator 124 and/or exhaust pressure translator 132.

Thus, a decrease in initial pressure to the initial pressure operating point causes a positively decreasing output from power limit summer 128 which tends to decrease the turbine electrical load. From the foregoing, it is seen that the initial pressure regulating channel can override the speed control system thus reducing the electrical load. It is to be noted in this connection that the initial pressure regulating limiter is a "ceiling" control which permits the inlet control valves to be closed almost completely in the event of a sufficient drop in initial pressure. In the event that the initial pressure level is restored to a normally desired level, initial pressure regulator action is automatically cleared since the output of power limit summer 128 will not be influenced by the initial pressure regulating channel but will be determined by the negative bias voltage input thereto.

The exhaust pressure regulating channel which comprises a transducer 66 similar to initial pressure transducer 68 and an exhaust pressure translator 132 similar to initial pressure translator 124 is utilized for controlling the pressure in the exhaust conduit when the local turbine is a unit tied in with other systems capable of maintaining frequency control. In such latter situation, speed control in the local turbine is maintained by the frequency control arrangement in the system and the steam control valves in the turbine are permitted the freedom to establish the exhaust conduit pressure by changing the unit generated load as required.

To bring the exhaust pressure regulating channel into service, a potentiometer contained in stage 134 and externally controllable by a knob 137 is rotated to the IN position. This potentiometer is only utilized in an upper and lower position and enables the smoothly bringing into and taking out of service of the exhaust pressure regulating channel. When knob 137 is rotated to the IN position, knob 107 which controls the speed-load set potentiometer in stage 105 is also rotated to provide a close to maximum magnitude voltage speed-load set signal, for example, one which may represent a speed of about 3850 R.P.M. with no electrical load on the turbine generator. The speed-load set signal is raised in this situation as will be clear in the explanation of the exhaust pressure regulating channel, to insure that any limiting action by the exhaust pressure regulating channel will produce inlet valve position changes.

Also, to bring the exhaust pressure regulating channel into service, speed corrector stage 112 has to be placed out of service by the rotation of knob 115 to the OUT position and the rotation of knob 135 to the ready position to bring stage 134 into the ready state.

An exhaust pressure conduit level set potentiometer externally controllable by a knob 133 is included in exhaust pressure translator 132 to provide a chosen reference level which represents an exhaust pressure level at which it is desired that the system operate.

The output of exhaust pressure translator 132 in accordance with the adopted sign conventions of the system of FIGS. 2–4 is a voltage which provides a negative increment of D.C. voltage with a fall in exhaust pressure and is applied as an input to power limit summer 128 through exhaust pressure to speed transfer circuitry stage 134 as will be further explained hereinbelow.

With a fall in exhaust pressure, the positively decreasing voltage signal applied to power limit summer 128 through stage 134 is inverted by summer 128 to inject a positively increasing voltage into the output of speed summer 110 from the output of power limit summer 128. This can be understood when it is realized that the output of exhaust translator 132 bucks negative bias voltage 130. A positively decreasing voltage from translator 132 has less subtracting effect on bias voltage 130 whereby the output of power limit summer 128 is a positively increasing voltage. This, of course, in accordance with the operation of speed summer 110, tends to make its output more negative and indicates a command for a greater opening of the inlet valves.

If the speed-load set signal had not been increased for this operation, the possibility might have existed where the output of power limit summer 128 would negatively limit the output of speed summer 110 whereby insufficient opening of the inlet valves might be called for.

The values of the circuit components in exhaust translator 132 are chosen such that the output of translator 132 can never be a voltage of a negative polarity. This is to insure that the initial pressure regulating action is not counteracted by exhaust pressure control at a time when initial pressure regulation and exhaust pressure control are concurrently taking place. Consequently, when concurrent operation is taking place, the output of power limit summer 128 is primarily determined by the output of initial pressure translator 124 should the initial pressure fall into the operating range of translator 124.

As has been stated hereinabove, exhaust pressure regulation is utilized to establish the generated load of the local turbine when the frequency control of the local turbine generator is maintained by a multiple system into which it is tied. If this multiple system is a utility network into which the local turbine generator is connected through a tie line breaker, and if this electrical tie opens, the system frequency of the turbine may rise or fall depending upon the exhaust pressure level at which the local turbine is being operated. When such tie line opens, the net effect may be a substantial loss of frequency control with the harmful consequences that may flow therefrom.

Accordingly, when such tie line opens, the immediate need is to restore normal frequency and incremental speed regulation by the local turbine, and to maintain the essential local electrical loads on the turbine. To this end, the system of FIGS. 2–4 enables the transfer of exhaust pressure to speed control, such transfer being effected by the stage legended exhaust pressure to speed transfer circuitry 134, a suitable example of which is shown in FIG. 25.

The output of stage 132 when it is in operation consequently is a signal having a value which represents a change in exhaust pressure from a desired value. This output, applied to power limit summer 128, causes an output from power limit summer 128 which negatively limits the output of speed summer 110 to whatever control valve openings are required to maintain exhaust pressure.

When the tie line opens, stage 134 removes the application as an input to power limit summer 128 of the output of exhaust translator 132 by suitable relay logic. Simultaneously, the speed-load set signal applied as the input to speed summer 110 is reduced in value to a predetermined level which corresponds to one representing essential electrical loads for the turbine. Consequently, normal speed control operation now takes place at this predetermined level. When the tie-in to the utility network is restored, the exhaust pressure control may be placed back into service by resetting the relay logic in stage 134. This is done, as will be further described, by concurrently rotating knob 135 to the OUT position and knob 107 to provide a lower speed-load set signal and rotating knob 137 to the out-of-service position. The exhaust pressure controller is then physically placed in service by rotating knob 135 to the ready position and then concurrently rotating knob 107 to provide a near maximum speed-load set signal and rotating knob 137 to the in-service position.

The operation of speed summer 110 can now be understood. It is realized that the output of speed summer 110 will be the contribution of the speed regulating channel to the control of the inlet valves as influenced either by the initial pressure regulating or the exhaust pressure regulating channels. As will be shown hereinbelow, the output of $V_1$ summer 140 which is the command voltage for the position of the inlet valves, in accordance with the sign conventions adopted in the system of FIGS. 2–4, has to be increased in the positive direction to call for a further opening of the inlet valves and to be incrementally decreased to call for a closing of the inlet valves. As will be seen hereinbelow, this sign convention is also utilized with the extraction conduit valves so that a positively incrementally increasing voltage commands a further opening thereof and an incrementally decreasing voltage commands a further closing thereof. Since the summers of the system are chosen to have inverting D.C. amplifiers contained therein, an incrementally decreasing output from speed summer 110 consequently calls for a further opening of the inlet valves.

Contained in speed summer 110 is a potentiometer externally controllable by a knob 111 the setting on this potentiometer effecting a negative limit to the output of summer 110, such negative limit representing a chosen maximum load. Thus, no matter what the value of the resultant from the summing of the inputs to speed summer 110, the output cannot exceed this negative limit. Consequently, the potentiometer controlled by knob 111 effects a ceiling control of the output of speed summer 110.

In emergency situations, such as where initial pressure falls below a safe operating point and water-carryover to the turbine might occur, a second negative limit is imposed on the output of speed summer 110, i.e., the aforedescribed limit as produced in response to the output of power summer 128 when initial pressure falls to the water-carryover pressure point for the load existing at that time.

Should the exhaust pressure controller be in operation, this second negative limit is also imposed in response to changes in exhaust pressure from the desired exhaust pressure value. This second negative limit produced by initial pressure control or exhaust pressure control is operative in addition to the negative limit imposed by the load limit potentiometer and will override the load limit control where necessary.

If the turbine generator is connected to its load bus through a generator breaker and should this breaker open, then the speed of the turbine, due to its abrupt loss of electrical load, may rise precipitously. This is an acutely critical situation. To avoid the disastrous consequences which might result from such quick and great rise in speed of the turbine, since the output of speed summer 110 is the resultant of the difference between the speed sensing and speed-load set signal, it is seen that as the speed sensing signal increases in magnitude negatively in response to a rise in speed, the output of speed summer decreases incrementally and a point will be quickly reached where the input to and consequently the output of speed summer 110 will be substantially zero to command a complete closing of the inlet valves irrespective of the limits set by the load limit control potentiometer or the output of power limit summer 128.

In an arrangement where the local turbine controls isochronous operation of the arrangement, speed corrector 112 as has been previously described functions to insure isochronous operation by comparing the speed sensing signal output of speed translator 104 with the speed-load set signal as provided by the speed load control mechanism 105. The time integrated difference between these signals applied as an input to speed summer 110 provides a constant monitor of the speed of the system and, accordingly, is that component in the output of speed summer 110 which insures constant speed.

As will be further explained, the summers which produce the command voltages for the valve systems of the turbine, viz., $V_1$ summer 140 for the inlet valves, $V_2$ summer 160 for the high pressure extraction conduit valves and $V_3$ summer 180 for the low pressure extraction conduit valves, all produce outputs which reflect the synthesis of speed regulation and high pressure conduit and low pressure conduit extraction pressure regulation signals. Thus, there is also provided in the system of FIGS. 2 to 4, a high pressure conduit extraction pressure regulating channel and a low pressure conduit extraction pressure regulating channel.

In the high pressure conduit extraction pressure regulating channel, there is provided a transducer 62 which is similar in structure and operation to initial pressure transducer 68 and exhaust pressure transducer 66. The output of transducer 62 is applied to a high pressure conduit extraction and admission pressure translator 142, translator 142 being similar to initial pressure and exhaust pressure translators 124 and 132 respectively, and, similar to them, also containing a potentiometer therein, controllable externally by knob 143, the setting on the latter potentiometer determining the extraction pressure level in the high pressure conduit at which it is desired that the system operate.

It is seen that the output of high pressure conduit translator 142 is applied to the $V_1$ summer through two inverting amplifiers, viz., those contained in high pressure conduit extraction pressure summer 144 and high pressure extraction limit summer 146.

The output of high pressure conduit translator 142 is applied as an input to the $V_2$ summer through one inverting amplifier, i.e., that contained in high pressure conduit extraction pressure summer 144 and is also applied as an input to the $V_3$ 180 summer through summer 144. Thus, in the event that pressure in the high pressure conduit decreases, a further closing of the high pressure conduit valves is called for whereby the input to $V_2$ summer 160 reflecting the pressure in the high pressure conduit has to be positive and assuming that the electrical load is at the desired level, the input to $V_1$ summer 140 reflecting the high pressure conduit control has to be negative to insert a component in the output of $V_1$ summer 140 which calls for a further opening of the inlet valves. Consequently, the circuit components in translator 142 are so arranged whereby a decrease in extraction pressure in the high pressure conduit produces a negative increment of voltage output therefrom and an increase in pressure therein produces a positive increment.

In the high pressure conduit, transducer 62 has its output balanced to a null voltage, such null or zero voltage being obtained at the highest pressure conduit extraction pressure that it is desired that the system operate at. The potentiometer externally controllable by knob 143 in high pressure conduit translator 142 provides a chosen reference voltage level which represents a pressure level for which it is desired that the system operate at. Such latter pressure cannot exceed the null level initially chosen.

The output of translator 142 is applied as an input to high pressure conduit extraction pressure summer 144. Summer 144 suitably may be a one input summer including a variable positive series voltage limiter and a variable negative feedback voltage limiter as shown in FIG. 15 and may be utilized where extraction pressure and admission pressure are controlled in the high pressure conduit. To that end, potentiometers contained in summer 144 and externally controllable by knobs 145 and 147 respectively set flow limits for high pressure conduit extraction and admission steam. The potentiometer controlled by knob 145 determines the positive voltage limit and accordingly controls the degree of closure permitted for the high pressure conduit valves when steam is extracted. The potentiometer controlled by knob 147 determines the negative voltage limit and accordingly controls the degree of opening permitted for the high pressure conduit valves when steam is admitted into the high pressure extraction conduit.

The low pressure conduit extraction pressure regulating channel also includes a transducer 64 which is similar in structure and operation to the other pressure transducers in the system, the output of which is applied to a low pressure conduit extraction pressure translator 162 which is similar to the other pressure translators of the system, tranducer 64 being balanced to a null voltage at the highest desired operating pressure in the low pressure conduit. As in the other pressure translators, translator 162 contains a potentiometer externally controllable by a knob 163 which sets the desired level of extraction pressure in the low pressure conduit. The output of low pressure conduit extraction pressure translator 162 is applied to a low pressure conduit extraction pressure summer 164 which is similar to summer 144 in the high pressure conduit pressure regulating channel. Thus, low pressure conduit extraction pressure summer 164 is a circuit as shown in FIG. 16 and which contains a variable positive series voltage limiter and a fixed negative feedback voltage limiter. The variable positive series voltage limiter includes a potentiometer externally controllable by a knob 165 which sets a positive limit on the output of summer 164 and thereby sets a maximum flow limit of extraction steam in the low pressure conduit. The negative voltage limit is utilized to prevent the low pressure control from attempting to admit steam into the low pressure extraction conduit. Since the signal representing the output of the low pressure regulating channel as produced by translator 162 has to be negative to call for a further opening of the inlet valves, a further opening of the high pressure conduit valves and a further closing of the low pressure conduit valves, the output of low pressure conduit extraction pressure translator 162 is chosen to a negative increment of D.C. voltage with a decrease in pressure in the low pressure conduit and a positive increment when the reverse situation obtains.

Reference can now be made to the operation of $V_1$ summer 140, $V_2$ summer 160 and $V_3$ summer 180, suitable examples of which are shown in FIG. 14. Such operation is first explained as if the high pressure and low pressure limit channels as embodied in high pressure extraction limit trigger 150 and high pressure extraction limit summer 146, and low pressure extraction limit trigger 183 and low pressure extraction limit summer 182 were not included in the circuit.

In such situation, the inputs to $V_1$ summer, which controls the position of the inlet valves, would be the output of speed summer 110, the output of high pressure conduit extraction pressure summer 144 and the output of low pressure conduit extraction pressure summer 164. If a further opening of the inlet valves is called for, the values of the circuit components of the system of FIG. 2 to 4 are so chosen that the output of $V_1$ summer 140, is a positive signal, i.e., the resultant of the summing of the inputs to $V_1$ summer 140 is negative. If the high pressure conduit valves are commanded to open because of pressure or load considerations, then the output of $V_2$ summer is positive, i.e., the resultant of the summing of the speed sensing, high and low pressure conduit signals at the input to $V_2$ summer is negative. If a further opening of the low pressure conduit valves is called for, the input to $V_3$ summer 180 which is the resultant of the summing of the outputs of summer 110, 144 and 164 is negative to cause a further opening of the low pressure conduit extraction valves. Conversely, an opposite series of events correspondingly causes an opposite series of effects.

$V_2$ summer 160 and $V_3$ summer 180 each have included therein means for providing an adjustable bias voltage input thereto which represents an indexing or lead position for the stems of the high and low pressure conduit valve means respectively. The index positions of these valves respectively represents positions which cause them to be opened before the inlet valves as the voltage from the speed summer is negatively incremented from its zero value. If such indexing were not made, there would be no complete path for steam to travel under startup conditions of the turbine.

The output of $V_1$ summer 140 which produces the command voltage for controlling the position of the upper and lower inlet valves, the output of $V_2$ summer 160 which produces the command voltage for controlling the position of the high pressure conduit extraction valves and the output of $V_3$ summer 180 which produces the command voltage for controlling the position of the low pressure conduit extraction valves are each applied to like servo amplifiers 192, 194, 196, and 198, respectively, suitable examples of which are shown in FIGS. 21 to 24. In this connection, the output of $V_1$ summer 140 is applied to servo amplifiers 192 and 194 since the position of both the upper and lower inlet valves are being controlled. The function of each servo amplifier is to control an electro-hydraulically operated turbine steam valve by means of a positional servo system. To accomplish this control, the command voltage received by each servo amplifier is compared with a feedback voltage proportional to the actual valve position. The resultant error voltage damped by the subtracting of a signal proportional to valve velocity from the resultant of the comparison, is amplified by an amplifier and this amplified output current controls a suitable device such as a torque motor and hydraulic servo valve assembly on the turbine. The servo valve assembly actuates a hydraulic ram which causes the movement of the steam valves. Allowance for a mechanical overtravel is provided in the valve positioning mechanism to insure that under all conditions the steam valves may be completely closed. Consequently, a small positive voltage source is provided for application to a servo amplifier which represents a resultant small motion in a hydraulic ram.

The servo amplifiers are included in the system of the invention to produce respective positions of valves substantially exactly proportional to the position represented by the respective outputs of the summers which produce the command voltages therefor substantially independent of reaction forces on the valves. It is readily appreciated that these reaction forces are quite great and may be in the order of many thousands of pounds. In addition, there may be regions of abrupt negative force gradients. The servo amplifiers insure accurate positioning of the valves substantially independent of the strength and non-linearities of these reaction forces.

When a combination of conditions obtains such as wherein either of the valves in the high pressure conduit or in the low pressure conduit or both are in the closed position whereby the valves in these conduits are no longer susceptible to control of steam flow therethrough, the system of this invention as shown in FIGS. 2 to 4 permits a preference for retaining speed control as against retaining pressure control. In such situations, the limiting networks in the high pressure conduit and low pressure conduit regulating channels are severally or jointly enabled.

In understanding the operation of such limiting, it is, of course, to be realized that with the extrusion valves in either or both of the extraction conduits in an open position, the limiting networks are not enabled. In this connection, it is noted that the output of high pressure conduit extraction limit summer 146 and the output of low pressure conduit extraction limit summer 182 are applied as inputs to the $V_1$ summer 140. When either or both of the limit channels are enabled, it will be shown that effectively the pressure control signals of the channel or channels, which are limited are removed as inputs to $V_1$ summer 140.

Considering the operation of the high pressure extraction limit channel, there is applied to a trigger circuit 151 contained in a high pressure extraction limit trigger stage 150, a suitable example of which is shown in FIG. 26, a voltage taken from the high pressure regulating channel servo amplifier 196 which represents the position of the high pressure conduit extraction valves. In trigger circuit 151, there is included an arrangement for providing a set point voltage which represents the high pressure extraction valves in almost the closed position. In the operation of the servo amplifier, the output of a summer controlling valve position such as $V_2$ summer 160 in the high pressure conduit channel, which is increasingly positive if a further opening of the valves is called for and decreasingly positive if further closing of the valves is called for, is compared with the voltage which represents the position of the valves, the latter voltage if increasingly negative calling for a further opening of the valves and if decreasingly negative calling for a further closing of the valves. Consequently, the set point voltage provided in trigger circuit 151 and representative of the almost closed position of the high pressure conduit extraction valves is chosen to have a given negative value.

When the aforesaid output taken from servo amplifier 196 is less negative than the value of the set point voltage contained in trigger circuit 151, then trigger circuit 151 is actuated and such actuation results in the energization of a relay arrangement 152. As shown in FIGS. 2–4, relay 152 has applied thereto two inputs. Actually, these inputs are not modified by relay arrangement 152 but permitted to be passed therethrough upon the relays actuation. A first input to relay arrangement 152 is the output of $V_2$ summer 160, and the other is a negative bias voltage. The bias voltage is utilized to counteract the voltage introduced into the input of $V_2$ summer 160 by the setting of the index or lead set potentiometer therein plus the voltage produced which represents the distance traveled by the hydraulic ram for the high pressure conduit extraction valves from the initial indexed position to the valves verging on impending open position. When relay 152 is actuated, certain contacts associated therewith change their state whereby the output of $V_2$ summer 160 is applied as an input to high pressure extraction limit summer 146 and the bias voltage is also applied as an input to this summer.

It is recalled that in the regulating channel for the high pressure extraction conduit, pressure translator 142 produces a negative increment of D.C. voltage with a decrease in pressure level. In the event that pressure in the high pressure conduit has decreased to the point where the high pressure conduit extraction valves have assumed the closed position because of either a sufficient drop in pressure in the high pressure extraction conduit and/or a drop in electrical load on the turbine, the limit trigger 151 is enabled whereby the output of summer 144 and the negative bias voltage are applied as inputs to high pressure extraction limit summer 146. The values of the circuit components are chosen such that during limited operation, the resultant of the summing of the inputs to high pressure extraction limit summer 146 reflects zero influence of the output of summer 144. This is because the component of the output of $V_2$ summer 160 resulting from the input thereto of the output of high pressure conduit extraction pressure summer 144 is exactly equal and opposite in sign to the output summer 144 that is introduced directly into the input to summer 146. The bias voltage introduced into the input of summer 146 cancels those components in the output of $V_2$ summer 160 which represent the indexing voltage and the mechanical overtravel of the hydraulic ram for the high pressure conduit valves. Thus, upon the enabling of limit trigger 151, there takes place a complete cancellation of the high pressure extraction signal as it influences the $V_1$ summer and any further decrease in the high pressure extraction conduit produces no net voltage input to $V_1$ summer 140, attributable to the high pressure conduit.

Since closure of the high pressure conduit valves cuts off any further steam flow to the lower pressure stages of the turbine, steam flow ceases in the low pressure conduit. Consequently, low pressure conduit extraction pressure control must be disabled. This is effected by the application of the output of low pressure conduit extraction pressure summer 164 as an input to $V_2$ summer 160 and $V_1$ summer 140 through low pressure extraction limit summer 182. The values of the circuit components are chosen such that the component in the output of $V_2$ summer 160 which reflects the input thereto of the output of the summer 164 as appearing in the output of summer 146, and the output of summer 182 cancel whereby the low pressure conduit control signal is also removed as an influence on the output of $V_1$ summer 140.

Thus, the net input to $V_1$ summer 140 during the high pressure conduit limited situation results from the summation of the output of speed summer 110 and the output of summer 146 which is the inversion of the speed component in the output of $V_2$ summer 160. Since, the output of summer 146 representing speed is the twice inverted output of speed summer 110, effectively, at the input to $V_1$ summer 140, the output of speed summer 110 is substantially added to itself in the same polarity. The amount that the speed sensing signal from summer 110 is increased in this high pressure conduit limited situation is that required to maintain constant speed load characteristics of the operating portion of the turbine.

The voltages representing the indexing and mechanical overtravel are cancelled since they do not represent increments which have to be added to the $V_1$ summer input to maintain the speed-load regulation and load for this high pressure conduit limited condition.

The limiting arrangement in the low pressure conduit regulating channel operates in substantially the same manner as that in the high pressure conduit channel. Thus, when the valves position voltage taken from servo amplifier 198 is less negative than a set point voltage provided in the trigger circuit 184 of low pressure conduit extraction limit trigger stage 183, trigger circuit 184 is enabled with the consequent enabling of a relay arrangement and the application of the output of $V_3$ summer 180 and the negative bias voltage representing indexing and mechanical overtravel of the low pressure conduit valves to summer 182. In this situation, the output of low pressure conduit extraction pressure summer 164 is applied as the third input to summer 182. As in the situation of limiting with respect to the high pressure conduit regulating channel, the pressure, indexing and mechanical overtravel components in the output of $V_3$ summer 180 are cancelled as inputs to $V_1$ summer 140 and $V_2$ summer 160. The speed component is the output of $V_3$ summer, as inverted by summer 182, adds to the input to summers 140 and 160 to thereby restore the speed load regulation when only the high and intermediate stages of the turbine are generating power.

It is thus seen that with the limiting arrangements of the system of FIGS. 2 to 4, preference for speed control is retained in the situations where either of the high pressure and low pressure conduit extraction valves are in the closed position.

When no limiting action is occurring in a pressure conduit channel, i.e., when a valves' position representative voltage taken from a pressure conduit channel servo amplifier is more negative than the set voltage in a corresponding trigger circuit, the trigger circuit is not enabled. Consequently, the input to a limit summer is only the output of an extraction pressure summer, the limit summer functioning to invert the input thereto. Thus, for example, with a decrease in high pressure conduit extraction steam, the output of summer 144 would be positive and high pressure conduit extraction limit summer 146 would invert this output so that the control from the high pressure conduit regulating channel would be applied as a negative input to $V_1$ summer to call for a greater opening of the inlet valves. It is noted that the low pressure conduit control signal is applied to $V_2$ summer through low pressure conduit extraction limit summer 182. Thus, a decrease in pressure in the low pressure conduit which is reflected as an increasingly positive input to $V_3$ summer 180 to call for a further closing of the low pressure conduit valves is applied as an increasingly negative input to $V_2$ summer 140 to call for a further opening of the high pressure conduit valves.

*Speed translator*

In FIG. 5 there is shown a block diagram of a circuit suitable for use as the speed translator 104 of FIGS. 2–4 and in FIG. 6 there is shown a schematic diagram of a circuit represented by the block diagram of FIG. 5.

Referring now to FIG. 5, the output from speed transducer 60 (FIGS. 2 to 4) is applied as an input to a stage 200 legended as an A.C. to D.C. converter, a stage 202, legended as double resonant network, and a stage 204 also legended as an A.C. to D.C. converter.

Converter stages 200 and 204 may suitably be fullwave rectifiers at whose outputs there are provided unidirectional voltages whose magnitudes are directly proportional to the magnitude of the output of speed transducer 60. These unidirectional voltages accordingly exhibit a linear increase in magnitude with turbine speed. The unidirectional output of converter stage 200 is applied to a stage 206 legended as a 3600 r.p.m. bias network which may be an attenuating network whereby an attenuated portion of the output of converter 200 exists at the output of stage 206. The double resonant network of stage 202 is suitably an inductor-capacitor circuit which produces an alternating current voltage output which is a function of the frequency of the output of speed transducer 60. The amplitude of the voltage output of stage 202 at any given frequency is a linear function of the A.C. voltage applied thereto.

The output of double resonant network 202 is applied as an input to an A.C. to D.C. converter stage 208 which may also be a full wave rectifier, the output produced by stage 208 being a unidirectional voltage whose output is a function of the A.C. input frequency.

The circuit components of stages 200 and 206 are so arranged and their values so chosen whereby the voltage that is produced thereby increases in the negative direction with an increase in the magnitude of the A.C. input thereto. The circuit components are so arranged in double resonant network 202 and converter 208 such that the output of stage 208 is a positive voltage which exhibits a maximum at a predetermined input frequency.

The output of bias network 20 and converter 208 are added, such addition being shown conceptually at stage 207 whereby the unidirectional voltage resulting from this summation is a function of the input frequency and of the A.C. voltage. The output of 3600 r.p.m. bias network 206 is adjusted to cancel the output from the double resonant network branch of the circuit at a chosen input frequency such as 420 cycles per second (3600 r.p.m.). This adjustment for zero net output voltage at this chosen frequency is substantially independent of the magnitude of the output of speed transducer 60 since both bias network 206 and converter 208 have linear unidirectional voltage outputs with respect to the A.C. input voltage. The alternating current rectifier ripple components in the resultant from the summation at stage 207 are removed in a suitable low pass filter 210 and the output of filter 210 is attenuated by an adjustable amount in a speed regulation network stage 212 to obtain the desired speed sensing signal.

The speed-load set signal is obtained from a potentiometer 215. This is the potentiometer whose setting is externally controllable by the knob 107 associated with the speed load control mechanism stage 105 (FIGS. 2–4). The speed-load control mechanism also includes a high speed level network 214 connected to the positive D.C. supply and a low speed level network 216 connected to the negative D.C. supply, potentiometer 215 being connected between the outputs of stages 214 and 216. Potentiometer 215 is supplied with positive and negative voltages by networks 214 and 216 respectively, these networks providing an adjustment and regulation of the voltages appearing at each end of potentiometer 215.

In the arrangement of the control system of this invention, a positive output algebraic sum of the speed sensing and the speed-load set output signal voltages has been chosen to be required to start the turbine. In order to insure that this is the case, regardless of the setting of the speed-load control potentiometer 215, a positive bias is added to the speed sensing signal during startup. It is, of course, realized that otherwise this speed sensing signal is zero volt at zero speed. Such positive bias addition is accomplished by energizing a transfer relay 218 whose drive may be supplied by a suitable actuator 219 (not shown). During startup conditions, normally closed relay contacts 218A associated with transfer relay 218 are transferred to the open state by the actuation of transfer relay 218 and a startup bias network 220 injects a positive D.C. voltage obtained from the positive voltage supply. As the turbine is started and speed increases, a D.C. voltage is developed at the output of a transfer bias network 224, by means of converter 204 and a filter 222 which are energized by the A.C. output of speed transducer 60. This transfer bias network output voltage is subtracted from the startup bias voltage produced from stage 220 to reduce the net bias voltage as the turbine speed is increased by changing the setting on the speed load control potentiometer 215. The attenuation of the transfer bias network is suitably adjusted for a net zero bias and a chosen A.C. input frequency, such as 385 cycles per second (3300 r.p.m. turbine speed). At this chosen frequency, the actuation is caused to be removed from transfer relay 218 and, thereafter, normally closed contacts 218 maintain the net injected bias voltage at zero volt.

The circuit of FIG. 6 which may be utilized as the speed translator as depicted in block form in FIG. 5 is described for convenience of explanation as comprising three sections, viz., those sections associated with secondary winding portions 234, 236 and 238 of transformer 230, the signal produced at the output of speed transducer 60 being applied to the primary winding 232 of transformer 230.

The section associated with secondary winding portion 234 produces a D.C. voltage having an amplitude directly proportional to the amplitude of a voltage produced from speed transducer 60. In this section, the voltage across secondary winding portion 234 is full wave rectified in a rectifier 237, rectifier 237 corresponding to A.C. to D.C. converter stage 200 in FIG. 5 and then is applied across the series arrangement of a variable resistor 235 and a resistor 240. The voltage which results across resistors 235 and 240 is a unidirectional voltage with terminal 239 negative with respect to terminal 241. Variable resistor 235 is the 3600 r.p.m. bias network 206 of FIG. 5 for providing zero voltage of the speed sensing signal output at an input frequency of 420 cycles per second.

The section associated with secondary winding portion 236 produces a voltage which is both proportional to the amplitude and the frequency of the voltage produced at the output of speed transducer 60. In this section, the frequency sensitive elements are series connected inductor 242, parallel connected series arrangement of inductor 244 and capacitor 246, these elements being the double resonant network 202 of FIG. 5. The values of these elements are so chosen whereby inductors 242 and 244 resonate with capacitor 246 at a frequency below the operating range of the turbine and inductor 244 resonates with capacitor 246 at a frequency above the operating range of the turbine. Consequently, the voltage developed across resistor 250 is at a maximum at the lower resonating frequency and at a minimum at the higher resonating frequency. The speed control operation is confined to the range of A.C. input frequency bounded by these two resonating frequencies. Such range possess a negative slope of voltage as a function of frequency. Resistor 250 and the net D.C. load determines the magnitude of the lower resonating frequency output voltage and hence the actual value of this slope.

The output of the double resonant network is converted to a D.C. voltage by the full wave bridge rectifier circuit 252 which corresponds to the A.C. to D.C. converter 208 of FIG. 5, the resultant unidirectional voltage output therefrom being attenuated in the resistor voltage divider comprising the series arrangement of resistors 254 and 256.

The output across series arrangement of resistors 235 and 240, i.e., the 3600 r.p.m. bias network, and the output of the double resonant network as determined by the voltage across resistor 256 are in series bucking circuit arrangement. Variable resistor 235 is adjusted to provide a net zero D.C. component with respect to common at the chosen frequency such as 420 cycles per second A.C. input frequency with transfer relay 218 deenergized. The A.C. components appearing in the output of this series bucking circuit are removed in the low pass filter circuit comprising a series connected inductor 258 and a parallel connected capacitor 260. The remaining D.C. component is coupled to the speed regulation network attenuator (stage 212 of FIG. 5), which comprises a resistor 262, a variable resistor 264 and a resistor 266. The point at which variable resistor 264 is adjusted is chosen so as to set the proportion of the developed D.C. voltage impressed on the speed sensing signal output terminals and, thus, it is utilized to select the desired incremental output voltage per cycle change of input frequency. This output voltage is at common potential at the chosen frequency of the system, i.e., 420 cycles per second, is positive with respect to common at input frequencies lower than the aforesaid chosen frequency and is negative for input frequencies higher than the chosen frequency.

The starting conditions for the turbine consist of transfer relay 218 being in the energized state and approximately zero frequency output from speed transducer 60. Under these conditions there is little or no output developed by the 3600 r.p.m. bias transfer network or the double-resonant network. A positive D.C. output exists at startup at the speed sensing signal terminal 300 as a consequence of normally closed contacts 218A being open and the connection of terminal 300 to the voltage divider comprising a resistor 280, a variable resistor 282 and a resistor 284. From variable resistor 282, there is taken a portion of the positive D.C. supply that is coupled to terminal 300.

The section associated with secondary winding portion 238 functions to provide startup bias. In this section, the A.C. input voltage is rectified in a full wave bridge rectifier 268, the latter rectifier corresponding to the A.C. to D.C. converter 204 of FIG. 5. The output of rectifier 268 is filtered in a series connected inductor 270 and a parallel connected capacitor 272, inductor 270 and capacitor 272 comprising filter stage 222 of FIG. 5. The voltage output from the filter is attenuated in the series arrangement of a resistor 274, a variable resistor 276 and a resistor 278, resistors 274, 276 and 278 corresponding to the transfer bias network 224 depicted in FIG. 5. The voltage taken from the tapped point on variable resistor 276, i.e., the transfer bias network, sets the level of a developed negative D.C. voltage that is connected in series with the startup bias voltage. Thus as the turbine speed is increased, the transfer bias voltage reduces the net effect of the amount of the startup bias appearing at the speed sensing signal terminal 300. Capacitor 281 provides filtering for this voltage. Variable resistor 276 may be suitably adjusted such that there is provided net zero voltage with respect to common at an input frequency of about 385 cycles per second (3300 r.p.m.) turbine speed. At this point, and, of course, at higher input frequencies, transfer relay 218 is caused to be deenergized. Thus, only the 3600 r.p.m. bias and double resonant networks remain in the circuit to produce a speed sensing signal output voltage.

Connected between the positive potential source and the negative potential source is the series arrangement of a resistor 286, variable resistor 288, a resistor 290, a resistor 292 and a variable resistor 294, a resistor 296 and a resistor 298, the junction 291 of resistors 290 and 292 being at common potential. A voltage regulating arrangement comprising series connected breakdown diodes 289 and 285 is connected between common and the junction 287 of resistors 286 and 288. Similarly, the series arrangement of breakdown diodes 293 and 295 is connected between common and the junction 297 of resistors 296 and 298. Connected between tapped points on variable resistors 288 and 294 is a potentiometer 299, this being the speed-load control potentiometer externally controllable by knob 107 (FIGS. 2 to 4). The high speed level set for the system is set when the slider is at a chosen upper position on variable resistor 288. This high speed adjustment is a setting for a no load turbine speed. The voltage provided at tapped point on variable resistor 294 provides the low speed level for a no load turbine speed. The setting on speed-load potentiometer 299 enables the variation of the speed-load set signal.

*Pressure transducer*

In FIG. 7 there is shown a schematic diagram of a pressure transducer arrangement suitable for use as the pressure transducers of the system of FIGS. 2 to 4. In this circuit, the output of a pressure transducer exciting oscillator (oscillator 122 of FIGS. 2-4) and having a frequency such as about 3 kc. is applied to the primary winding 304 of a transformer 302. The voltage appearing in secondary winding 306 of transformer 302 energizes the primary winding 312 of a differential transformer 310, which also comprises secondary windings 314 and 316, through a series connected resistor 308. A resistor 309 connected across secondary winding 306 serves to provide the required resistive load to maintain a low impedance of nearly zero phase angle on primary winding 304 of transformer 302 to minimize the influence of interconnecting cable capacitance on the voltage in secondary winding 306. Resistor 308 is chosen to have a large value compared to the resistance of primary winding 312 and consequently functions to provide a comparatively constant current source independent of ambient temperature.

The core 315 of variable differential transformer 310 is caused to move by the action of changes in applied pressure such as, for example, the response of a Bourdon tube (not shown) to pressure changes. The two secondary windings 314 and 316 are connected in a series bucking arrangement and a net difference voltage appears at the output of the circuit. A capacitor 318 is connected across this output, a net capacitance value being chosen for capacitor 318, such that the output voltage of the circuit is maximized by the forming of a series turned circuit by capacitor 318 and the inductance of secondary windings 314 and 316.

A voltage divider comprising resistors 320, 322 and 324 together with a variable resistor 326 connected across resistor 322 functions as a balancing network to compensate for the influences of various tolerances on the variable differential transformer's null output voltage. This balancing network provides an A.C. potential of adjustable amplitude and phase that is coupled from the output back to junction 313 of the secondary windings of transformer 310. Thus, the terminal voltage of one secondary winding may be slightly shifted relative to the other winding by means of potentiometer 326 in order to obtain a null output whose fundamental frequency component has substantially zero amplitude.

The pressure transducer of FIG. 7, functions to convert input pressure to an electrical circuit voltage. This is accomplished by translating pressure into a mechanical motion with a precision Bourdon tube assembly, which in turn positions core 315, core 315 being rigidly attached to the tip of the Bourdon tube.

The voltages induced in the secondary windings of transformer 310 are determined by the axial position of core 315. When core 315 is centrally located, an equal amount of magnetic flux links secondary windings 314 and 316 and equal voltages appear at their terminals. As the core is moved from the central position, more flux is caused to link one secondary than the other with a resultant larger induced voltage in the secondary winding toward which the core is moved. Since the two secondary windings are electrically connected in series opposition, the two voltages therein are opposite in phase. The resulting net voltage difference between the voltages in the secondary windings is the transformer output voltage. The net difference voltage when the core is moved from the centrally located position is a linearly increasing voltage and the position of core 315 determines the output voltage and its phase. A null output voltage for a given pressure, i.e., a calibration pressure may be chosen from the circuit of FIG. 7 for a specified pressure and should the input pressure change from this given value, the A.C. output voltage and its phase would indicate the amount and direction of such change.

*Pressure translator*

In FIG. 8, there is shown a block diagram of a pressure translator suitable for use as the pressure translators of the system of FIGS. 2 to 4.

The pressure translator is an electronic A.C. to D.C. converter circuit, the function of which is to provide a D.C. output voltage which is a chosen linear function of the deviation in the amplitude of an A.C. input thereto from an adjustable A.C. bias voltage.

Referring now to FIG. 8, the output of the pressure transducer which is a voltage having the frequency of oscillator 122, an amplitude proportional to the deviation in steam line pressure from the transducer null pressure and a phase indicative of the direction of the deviation, is applied to an amplifier stage 330. Amplifier 330 reproduces the output of the pressure transducer at a suitable power level for its summation with the A.C. voltage from a pressure level set adjustment circuit 334, such adjustment being controllable externally in all of the pressure translators of the system by a control knob such as designated by 335 and enabling the setting of a desired steam line pressure. Phase shift network 332 and pressure set adjustment 334 provide an adjustable A.C. bias voltage having the frequency of oscillator 122.

The output of amplifier 330 and pressure set adjustment stage 334 are algebraically summed as shown conceptually in stage 336 and this summed voltage is coupled to a second amplifier 338 which provides the signal voltage input to a demodulator 340. Demodulator 340 may suitably be a phase sensitive A.C. to D.C. converter whose D.C. output voltage is proportional to the amplitude of the A.C. signal voltage applied thereto and its electrical phase, relative to the A.C. reference voltage from oscillator 122. The reference voltage is produced by passing the output of oscillator 122 through a phase shift network 342.

The output of demodulator 340 is suitably a unidirectional potential that is coupled to a low pass filter 344 which attenuates the components therein having the frequency of oscillator 122 and higher frequency components. The time constant network 346 is employed following filter stage 344 to provide the desired output voltage transient response.

In FIG. 8, oscillator 122 supplies the pressure transducer, pressure level set adjustment bias voltage and the demodulator reference voltage. Thus, if the electrical phase of the pressure transducer output for steam pressures below the transducer calibration (null) pressure is chosen to be a leading phase angle of a given amount of degrees relative to its input, and the two adjustable phase shift networks 332 and 342 in the pressure translator of FIG. 8 are arranged such that the electrical phase of their respective output voltages corresponds to the phase of the output voltage of the pressure transducer associated therewith, then such phase correspondence results in a maximum D.C. output voltage for a given demodulator signal voltage. In addition, it serves to maintain the linear incremental pressure translator gain independent of the bias voltage from the pressure level set adjustment.

The output voltage of the pressure translator is determined by both the A.C. signal applied thereto from the pressure transducer and the bias voltage supplied by the setting on the pressure level set potentiometer in the pressure set adjustment circuit 334. Thus, if it is first considered that the bias voltage is zero and the A.C. signal from the pressure transducer is zero when the steam pressure is at the calibration pressure of the transducer, then the A.C. input voltage to and the D.C. output voltage from demodulator 340 is zero. The output of demodulator 340 is proportional to deviations in pressure from the transducer calibration pressure, the circuit elements in the demodulator 340 being so chosen and arranged such that the polarity reverses as the pressure changes from above to below the calibration pressure value. To provide a chosen linear range of output voltage from demodulator 340, A.C. voltage limiters are suitably incorporated in amplifier circuits 330 and 338.

As the A.C. bias voltage is increased from the pressure set adjustment by externally controlling a potentiometer contained therein by knob 335, this bias voltage is in phase opposition to the amplified A.C. output voltage from amplifier 330 when the pressure applied to a pressure transducer is below its calibration pressure. Thus, the linear range of the voltage output of demodulator 340, as a function of steam pressure, is caused to take place about a mean pressure which is located below the transducer calibration pressure. Such depression of the operating range is proportional to the selected A.C. bias voltage. At a chosen maximum A.C. bias voltage zero output voltage is produced from the demodulator 340, such pressure being a minimum calibration pressure.

Referring now to FIGS. 9 to 11, wherein there is shown a schematic representation of the pressure translator of FIG. 8, the output from the pressure transducer is applied to amplifier 330 which consists of transistor 350 and its associated circuit components. Resistor 352 and the breakdown diodes 354, 356 and 358 provide a voltage regulator circuit. The input from the pressure transducer is coupled to transistor 350. Resistor 360 and the shunt connected diodes 362 and 364 form an A.C. voltage limiter circuit which prevents excessive voltages from being applied to the base of transistor 350 when the pressure control system is not operating or the turbine is shut down. For the normal operating input voltages to a translator which may be about 0.10 volt peak to peak or less, reverse connected diodes 362 and 364 exhibit high forward and inverse resistances relative to resistor 360. With these conditions, the input signal is applied to the base of transistor 350 with substantially no attenuation. When the instantaneous input voltage exceeds a chosen value such as about + or − 0.45 volt, diodes 362 and 364 exhibit a low forward resistance relative to resistor 360. Consequently, the input voltage to the base of transistor 350 is limited to a voltage of a chosen value such as about 0.9 volt, peak to peak.

The input A.C. signal is coupled to the base of transistor 350 through a capacitor 366. Transistor 350 is connected as an emitter follower stage to raise the power level of the input signal. A D.C. bias voltage for the base of transistor 350 is supplied from the resistor voltage divider comprising resistors 368 and 370. This divider is connected from the collector of transistor 350 to common and provides, in conjunction with the collector resistor 372, a degenerative feedback D.C. voltage to stabilize the transistor operating characteristics. A capacitor 374 bypasses the A.C. voltage appearing at the collector to common. The output voltage of the amplifier appears across the emitter resistor 376.

A passive adder circuit comprising resistors 378 and 380 and the input impedance to transistor 384 performs the summing operation of the amplifier input signal and the adjustable bias voltages. The amplified input signal from transistor 350 is A.C. coupled through a capacitor 382. A capacitor 386 A.C. couples the bias voltage from the slider of the pressure level set adjustment potentiometer 400 (this is the potentiometer externally controllable in the pressure translators of the system of FIGS. 2 to 4), to junction point 381. The input impedance to the transistor 384 stage is chosen to be small compared to resistors 378 and 380. Thus, the current supplied to the base of transistor 384 from each source is substantially independent of the other source, i.e., the total current through the A.C. input impedance is the sum of the currents from each signal source. In the normal pressure control operating range with steam line pressure below transducer calibration pressure, the amplified input signal and the adjustable bias voltage are opposite in electrical phase. Consequently, the two currents to the input impedance of transistor 384 subtract to produce a net difference A.C. input current to the base thereof.

The second amplifier 338 is a three-stage, capacitance coupled A.C. amplifier comprising transistors 384, 390, 410, 420, 430 and 440 and their associated circuit components. The input signal to this amplifier is the net difference current output of the passive summing network comprising resistors 378 and 380. The output voltage of the amplifier appears at the emitter of transistor 440. This output is A.C. coupled to the demodulator circuit through a capacitor 450 and an isolating resistor 448, the potentiometer 392 enabling gain adjustment. Signal voltage limiters are incorporated in the input circuitry of the stages comprising transistors 410 and 420 and transistors 430 and 440 respectively.

Each of the three stages of amplifier 338, i.e., those comprising transistors 384 and 390, transistors 410 and 420 and transistors 430 and 440 substantially comprise the same basic circuitry. Thus, in considering the first stage which comprises transistors 384 and 390 and their associated circuit components, the input transistor 384 is connected as a common emitter amplifier. Its collector biasing voltage is supplied through a resistor 388. The voltage drop across its emitter resistor 389 produces a negative feedback signal to stabilize the gain and reduce the phase shift in the first stage. In addition to the input signal which is A.C. coupled to the base of transistor 384 through capacitors 382 and 386 in the passive summing network, a degenerative feedback current from transistor 390 is also fed to the base of transistor 384 through a filter and voltage divider network comprising resistors 383 and 385 and a capacitor 387. This feedback signal establishes the D.C. operating characteristics and the A.C. gain as well as providing a low A.C. input impedance.

The output voltage, taken from the collector of transistor 384 is coupled directly to the base of transistor 390 which is connected as an emitter follower amplifier and raises the power level of the signal applied thereto. The emitter resistors 391 and 393 comprise a voltage divider network to supply the degenerative feedback network. The output voltage from transistor 390 is taken from its emitter.

The second or third stages of amplifier 338 are similar in structure and operation to the first stage as described, they differing only in the type of input and output coupling networks used for each stage.

Thus, the output of the first amplifier stage is applied to an adjustable attenuator network comprising a potentiometer 392 and a resistor 394. The slider of potentiometer 392 is positioned to select the proper pressure control sub-system gain, the range of gain adjustment being suitably about five to one. Capacitor 396 A.C. couples the voltage tapped on potentiometer 392 to a voltage limiter comprising a resistor 398, a diode 401 and a diode 402. A capacitor 408 A.C. couples the output of the limiter network to the base of transistor 410 and resistors 398 and 406 determine the input signal current at this point. The output taken from the emitter of transistor 420 is A.C. coupled to a voltage limiter network 424 by a capacitor 422. A capacitor 428 A.C. couples the output of the latter limiter network to the stage comprising transistors 430 and 440. The output signal from amplifier 338 is coupled to the demodulator 340 by capacitor 450 and isolating resistor 448.

Demodulator 340 comprises diodes 452 and 456 together with a transformer 446 and associated circuitry. The A.C. input signal to the demodulator is applied between the slider of potentiometer 454 and common through an isolating series resistor 448. A unidirectional D.C. output voltage exists at the slider of the potentiometer 454 which is coupled to the output through a resistor 458. The reference A.C. voltage of the chosen frequency is coupled to the primary winding 445 of transformer 446 from a phase shift network as will be further described hereinbelow.

Functionally, demodulator 340 is a phase sensitive half wave A.C. to D.C. converter and its basic operation may be considered analogous to that of a synchronous switch connected from point 455 on potentiometer 454 to common with the slider open circuited. Such hypothetical switch would be caused to open or close by alternate half cycles of the demodulator reference voltage from oscillator 122. The input signal voltage to the demodulator is either in phase or 180° out of phase with this reference voltage, the phase reversal being dependent upon the phase of the net input signal to amplifier 338. When such hypothetical switch is closed, the output voltage is zero and a half cycle of signal voltage appears across resistor 448. When it is opened, the alternate half cycle of the signal voltage is coupled to the output. Thus, the output signal is a half wave rectified voltage whose average value and polarity is proportional to the amplitude and phase of the demodulator A.C. signal voltage.

In the circuit of FIGS. 9–11, the demodulator reference voltage is coupled to the primary winding 445 of transformer 446. Terminal 449 of the center-tapped secondary winding 447 is connected to common. The balance potentiometer 454, resistors 451 and 459 and diodes 452 and 454 are connected in series across the full transformer secondary winding 447. The values of the components are so chosen that each voltage in the secondary winding has a value peak to peak which is greater than the maximum limited signal voltage peak to peak. During the half cycle of the reference voltage when terminal 443 of secondary winding 447 is positive with respect to terminal 453, the comparatively high amplitude of the transformer voltage relative to the signal voltage prevents diodes 452 and 456 from conducting. Thus, the only path for demodulator input signal current is to the output terminal 460. During the next half cycle of the reference voltage, diodes 452 and 456 conduct and the parallel impedance of the two halves of the series demodulator circuit shunts the output signal. Such switching operation substantially reduces the amount of the signal voltage appearing at the output terminals but does not result in the output voltage being exactly zero during this half cycle of reference voltage.

Potentiometer 454 is utilized to compensate for transformer and other components tolerances. The slider of potentiometer 454 is adjusted such that there is provided a zero D.C. output voltage when the A.C. input to the demodulator is zero volt.

The half-wave rectified demodulator output voltage is coupled to output 460 of the translator through resistor 458. Capacitors 466, 468 and 470 are connected in series with a potentiometer 472 and capacitors 462 and 464 are connected in parallel with the output of the translator. Resistor 458 increases the output impedance of the translator and together with capacitors 462 and 464 forms a low pass filter. Such filter provides a D.C. output voltage substantially free of the reference A.C. voltage and higher frequency ripple voltage components.

Capacitors 466, 468 and 470 and potentiometer 472 operating in conjunction with the output impedance of the translator and the external impedance connected to such output comprise a lag-lead time constant network. With potentiometer adjusted for zero effective resistance, the aforesaid network operates as a low pass filter and has a time constant of a chosen value such as 30 seconds depending upon the circuit component values. As the resistance of potentiometer 472 is increased, the attenuation at high frequencies is caused to remain at a fixed attenuation level in contrast to the increasing attenuation with frequency exhibited by a low pass filter. Furthermore, the time constant increases and the constant level of attenuation decreases. Such time constant network is suitably adjusted to provide transient response characteristics of the pressure control for optimum system performance.

A transformer 412 supplies two phase shift networks which adjust the phase of the pressure set bias voltage and the demodulator reference voltage. For the desired operation of a pressure translator, the electrical phase of the latter voltages have to correspond to the phase of the input signal supplied from the pressure transducer.

Primary winding 411 of transformer 412 is supplied from oscillator 122. Secondary winding 413 is center-tapped to common. The reference voltage for the demodulator 340 is obtained from the potential drop appearing at the junction 416 of capacitors 415 and 417 and the resistor 418. This RC series circuit is supplied from the full secondary voltage from winding 413 and the current through the RC circuit has a leading electrical phase angle with respect to the voltage in transformer 412. For example, if the condition is considered where the series resistance in resistors 418 and 419 is adjusted to equal the value of the parallel impedance of capacitors 415 and 417 and where the circuit is only lightly loaded, with proper selection of component values, the current will have a phase shift of 45° leading with respect to the total voltage. Consequently, the demodulator reference voltage supplying transformer 446 is the vector sum of one half of the voltage in secondary winding 413 of transformer 412 and the voltage drop across resistors 418 and 419. This vector sum is a voltage which leads the voltage in secondary winding 413 by 90° and has the same magnitude as the voltage in this half of secondary winding 413. A phase shift greater than, or less than, such value may be obtained by adjusting a variable resistor 419, the magnitude of the voltage being substantially independent of the adjustment.

Similar operation occurs in the series circuit of a capacitor 425, a resistor 426 and a potentiometer 427 which supplies a pressure level set adjustment voltage. A resistor 432 and a potentiometer 434 are in series arrangement with the pressure level set adjustment and provide a means of adjusting the maximum bias voltage available from the pressure level set adjusting potentiometer.

The polarity of the output of a pressure translator depends upon the polarity of diodes 452 and 456. Where a translator produces a positive increment of voltage with an increase in pressure, the diodes are poled as shown in FIGS. 9 to 11. Where a translator produces a negative increment, the polarity of diodes 452 and 456 is reversed.

When the translator of FIGS. 8 to 11 is utilized as the initial pressure translator 68 of FIGS. 2 to 4, the filter arrangement 478 comprising resistor 479, diodes 473 and 474 and capacitors 475 and 476 are used in lieu of capacitors 467, 466, 468, and 470. In filter arrangement 478, capacitors 475 and 476 operate as a filter providing a fixed time constant, a suitable time constant value being about 0.5 seconds. Resistor 479 and diodes 474 and 473 function to limit the output voltage to substantially one polarity. The forward voltage drop across diode 474 produced from the positive supply source provides a small positive voltage. When the signal voltage at terminal 460 decreases toward the bias voltage, diode 473 becomes forward biased thereby introducing a small impedance with respect to common as compared to resistor 458. This action reduces the gain of the translator and limits the excursion of the output in this region of operation.

*Summers*

The summers of the system of this invention depicted in FIGS. 2 to 4 may be of several types. Their function is to provide an output voltage which is a specified linear function of their input voltage or voltages within a suitably limited range.

The summers which may be effectively utilized for the above-stated purpose all comprise, as a basic element, a high gain, wide-band, D.C. inverting amplifier and a summing network with one or more input impedances and one or more feedback impedances.

In FIG. 12 there is shown a simple circuit configuration of such amplifier. The open-loop voltage gain of the D.C. amplifier therein may be, for practical purposes, considered infinite. The expression $e_{out}$, the output voltage in terms of the input voltage for infinite open loop gain is:

$$e_{out} = -\frac{R_F e_{in}}{R_I} \tag{1}$$

The closed loop gain is then $$-\frac{R_F}{R_I}$$

To differentiate the input voltage $[e_{in}(t)]$, an input capacitor $C_I$ has to be used in place of resistor $R_I$ in the circuit of FIG. 12. For infinite open loop amplifier voltage gain, the output voltage $[e_{out}(t)]$ is then proportional to the time derivative of the input voltage $[e_{in}(t)]$; and $$e_{out}(t) = -R_F C_I \frac{d e_{in}(t)}{dt} \tag{2}$$

To integrate the input voltage $[e_{in}(t)]$, a feedback capacity $C_F$ has to be used in place of the feedback resistor $R_F$ in the circuit of FIG. 12. For infinite open-loop amplifier voltage gain, the output voltage $[e_{out}(t)]$ is then proportional to the time integral of the input voltage $[e_i(t)]$ and $$e_{out}(t) = -\frac{1}{R_I C_F} \int_0^t e_{in}(t)\, dt \tag{3}$$

If a step input voltage $(\Delta e_{in})$ is applied to such an integrating circuit, the resultant output voltage change $(\Delta e_{out})$ is a function of time and is computed by the equation:

$$\Delta e_{out} = -\frac{t}{R_I C_F} \Delta e_{in} \tag{4}$$

If the output voltage and the input voltage are both zero when the input step voltage is applied, Equation 4 simplifies to:

$$e_{out} = -\frac{t}{R_I C_F} e_{in} \tag{5}$$

The product $R_I C_F$ in Equations 3, 4 and 5 is the time constant and if $R_I$ is in megohms and $C_F$ is in microfarads, the time constant is in seconds. The time $(t)$ is also in seconds.

Suitably, the values of the components of summers are chosen such that their output voltages are limited to a maximum positive value such as between $+6$ and $+8$ volts and a maximum negative value such as between $-6$ and $-8$ volts.

In FIG. 13, there is shown a three input type summer. The output voltage therefrom may be expressed as $$e_o = -R_F \left( \frac{e_{i1}}{R_{i1}} + \frac{e_{i2}}{R_{i2}} + \frac{e_{i3}}{R_{i3}} \right) \tag{6}$$

The potentiometer included in resistance $R_{i1}$ and $R_{i2}$ enable independent gain adjustments for the input No. 1 and input No. 2 channels respectively. The feedback capacitor is utilized to limit the frequency responsive of the D.C. amplifier. The feedback impedance comprises the parallel combination of resistance $R_F$ and the reactance of capacitor $C_F$. For steady D.C. voltages, the reactance of capacitor $C_F$ is infinite and the feedback impedance is essentially the resistance of $R_F$. As the frequency increases from 0 c.p.s., the reactance of capacitance $C_F$ and, consequently, the feedback impedance decreases. Accordingly, the gain decreases with frequency. The value of capacitance $C_F$ is suitably chosen such that the frequency response characteristic of the summer is down 3 db at a chosen frequency such as about 150 c.p.s.

The summer of FIG. 13 is suitably utilized as the extraction limit summer of FIGS. 2 to 4. In operation, the inputs thereto would be the output of the appropriate conduit valves position command summer, the extraction pressure summer and the bias voltage representing valves' indexing and mechanical overtravel.

In FIG. 14, there is shown a three input summer with an internal bias injector. For steady D.C. input voltages, the output voltage $e_o$ is computed by the equation $$e_o = -R_F \left( \frac{e_{i1}}{R_{i1}} + \frac{e_{i2}}{R_{i2}} + \frac{e_{i3}}{R_{i3}} + \frac{e_b}{R_b} \right) \tag{7}$$

With no internal bias voltage applied ($e_b = 0$) this summer functions the same as the summer of FIG. 13. The potentiometer in the three input channels enable independent gain adjustments in each channel respectively.

The internal bias injector provides a fourth input voltage which is utilized to bias the output voltage. The input bias voltage $e_b$ is applied to a fourth separate input resistance. The range of the input bias voltage may be chosen to be about $-1$ to $+1$ volt D.C. and its range of effect on the output voltage of the circuit may be about this same amount.

The internal bias injector is a voltage divider and bridge network comprising a potentiometer $R_4$ and resistors $R_5$, $R_6$, $R_7$ and $R_8$. The internal bias voltage $e_b$ taken from the slider of potentiometer $R_4$, is applied to input bias resistor $R_b$. The feedback capacitor $C_F$ functions to limit the frequency response of the D.C. amplifier.

The summer of FIG. 14 is suitably utilized as the valves' position command summers of FIGS. 2 to 4. The three inputs $e_1$, $e_2$ and $e_3$ are the speed channel, and high and low pressure conduit channel control signals. The fourth input voltage which is utilized to bias the output voltage to provide for valves indexing and mechanical overtravel.

In FIG. 15 there is shown a one input type summer with a variable positive series voltage limiter and a variable negative voltage limiter. The input voltage $e_1$ is applied to the input resistor $R_I$. The feedback capacitor $C_F$ operates to limit the frequency response of the D.C. amplifier.

The output No. 1 voltage is variably negatively limited by a negative feedback voltage limiter $CR_1$.

The output No. 1 voltage is also limited by variable positive series voltage limiter $CR_2$.

The circuit of FIG. 15 is suitably utilized as the high pressure conduit extraction pressure summer of FIGS. 2 to 4. Variable resistors $R_A$ and $R_E$ are the externally controllable admission and extraction pressure potentiometers. Variable resistors $R_{A1}$ and $R_{E1}$ enable an admission range and an extraction range limit adjustment. Since the circuit of FIG. 15 is quite similar to that of FIG. 16, a more detailed explanation is given of the structure and operation of the circuit of FIG. 16.

In FIG. 16, there is shown a one-input type summer having two outputs with a variable positive series voltage limiter and a fixed negative feedback voltage limiter. For steady D.C. input voltages, the output No. 1 voltage when not limited by either voltage limiter is in accordance with the equation $$e_{o1} = -\frac{R_F}{R_I} e_i \qquad (8)$$

The input voltage $e_i$ is applied to the input resistor $R_I$. The feedback capacitor $C_F$ operates to limit the frequency response of the D.C. amplifier.

The output No. 1 voltage is limited to a maximum negative value, suitably about $-0.5$ by a fixed negative feedback voltage limiter comprising diode $CR_1$. The voltage across diode $CR_1$, is virtually equal to the output No. 1 voltage with respect to common since the input to the D.C. amplifier is virtually at common potential because for substantially all practical purposes, there is provided infinite gain. When the output No. 1 voltage is more positive than about $-0.5$ volt, diode $CR_1$ is nonconductive, its resistance is very high and its effect on the net feedback impedance is negligible. When the output No. 1 voltage falls to the negative limit value such as the aforestated $-0.5$ volt, diode $CR_1$ conducts and its resistance falls to a comparatively low value. Such low resistance shunts the feedback resistor $R_F$ and thereby causes a considerable reduction of the net feedback impedance. Since the closed-loop gain of the summer is equal in magnitude to the ratio of the net feedback impedance to the input impedance, this gain falls to a small value, (suitably less than 0.1 with proper choice of component values). The output No. 1 voltage accordingly is limited to the chosen maximum negative value.

The output No. 1 voltage is also limited by a variable positive series voltage limiter so that this voltage cannot become more positive than the chosen value. With a variable resistor $R_1$ in a full upper position and with chosen circuit component values, such positive limit may be externally adjustable with a potentiometer $R_2$ to a value, for example between $-0.3$ and $+5.0$ volts. With potentiometer $R_1$ in a full lower position, $R_2$ can be utilized to adjust the positive limit to a value such as between $-0.3$ volt and $+1.5$ volts.

The variable positive series voltage limiter comprises diode $CR_2$, resistors $R_3$, $R_4$, variable resistor $R_1$, resistors $R_5$ and $R_6$, externally controllable potentiometer $R_2$ and a resistive load of a chosen value. When the output No. 1 voltage is less positive than the preset positive limit, diode $CR_2$ conducts and its resistance is relatively low. In this situation, the output No. 1 voltage is more positive than the output voltage from the amplifier, suitably about 0.6 volt more positive. When the output No. 1 voltage rises to the preset positive limit, diode $CR_2$ is rendered nonconductive and its resistance becomes very high. Consequently, the output No. 1 voltage is effectively disconnected from the D.C. amplifier output voltage and the bias voltage network for the limiter now determines the output No. 1 voltage.

The bias voltage network for the limiter comprises three voltage dividers. A first voltage divider comprises resistors $R_6$ and $R_5$ connected between common and the negative potential source. This first divider provides a negative voltage for the second voltage divider which consists of resistors $R_4$, $R_1$ and $R_2$ connected between the positive voltage source and the negative voltage from the first voltage divider. The second voltage divider provides a voltage for the third voltage divider, such voltage being taken from potentiometer $R_2$. The third voltage divider consists of resistor $R_3$ and the external resistive load and is connected between the slider on potentiometer $R_2$ and power common. The output No. 1 voltage is connected to the third voltage divider.

When the output No. 1 voltage is less positive than the voltage which it would assume if the D.C. amplifier output voltage were disconnected, i.e., the preset positive limit voltage which the third voltage divider comprising resistor $R_3$ and the resistive load would force it to assume, diode $CR_2$ conducts and its resistance is low. If this output No. 1 voltage is considerably less positive than the preset positive limit voltage, almost all of the current from the bias voltage network flows through the diode $CR_2$ and the low output impedance of the D.C. amplifier thereby bypassing the external resistive load. Consequently, almost all of the bias voltage appears across resistor $R_3$. In this condition the output No. 1 voltage is more positive than the D.C. amplifier output voltage.

As the output No. 1 voltage approaches the preset positive limit voltage, the resistance of diode $CR_2$ increases and some of the current from the bias voltage network flows through the external resistive load. At the same time, the current flow through this load from the D.C. amplifier is correspondingly reduced and the output No. 1 voltage continues to be the same amount more positive than the output voltage from the D.C. amplifier.

When the output No. 1 voltage rises to the voltage which it would assume if the D.C. amplifier output voltage were disconnected, i.e., the preset positive limit voltage which resistor $R_3$ and the resistive load would force it to assume, diode $CR_2$ is cut off and the output No. 1 voltage is effectively disconnected from the D.C. amplifier output voltage. The current from the bias voltage network now flows through the external resistive load bypassing diode $CR_2$ and the D.C. amplifier output impedance. Therefore, the bias voltage appears across the voltage divider of resistor $R_3$ and the load and the output No. 1 voltage is now determined by the bias voltage network. The output No. 1 voltage is then limited to the preset positive limit as determined by resistor $R_3$ and the load regardless of any further positive increase in the D.C. amplifier output voltage. As has been stated hereinabove, internal potentiometer $R_1$ and externally controllable potentiometer $R_2$ are utilized to adjust the limit voltage.

The D.C. amplifier output voltage rises to an upper positive value when positive limiting action occurs. This is understood when it is realized that in this situation, diode $CR_2$ disconnects all feedback circuitry except capacitor $C_1$ from the D.C. amplifier output so that the amplifier output voltage is limited only by the positive voltage limiter. Feedback capacitor $C_1$ minimizes high frequency noise after positive limiting has occurred and other feedback circuitry is consequently disconnected thereby.

The D.C. amplifier output voltage, viz., the output No. 2 voltage may suitably be utilized to actuate an external trip circuit to energize a warning inductor, for example, when the output of No. 1 voltage becomes positively limited.

The circuit of FIG. 16 is suitably utilized as the low pressure conduit extraction pressure summer of the system of FIGS. 2 to 4. Its input voltage $e_i$ is the output of the low pressure conduit translator. Variable resistor $R_2$ is the externally controllable flow limit control potentiometer contained therein.

In FIG. 17 there is shown a circuit wherein a diode $CR_N$ provides a fixed negative limit. The voltage divider comprising resistors $R_{20}$, $R_{21}$ and $R_{22}$ connected between common and the negative voltage source injects a negative bias voltage into the input of the amplifier.

The circuit of FIG. 17 is suitably utilized as power limit summer 128 of the system of FIGS. 2 to 4. The inputs to the summer, viz., $e_{i1}$ and $e_{i2}$, are the outputs of the initial and exhaust pressure translators. The negative bias voltage injected into the input of the summer insures that there is no limit imposed on the output of speed summer 110 when there is no input to power limit summer 128 from either initial pressure translator 124 and/or exhaust pressure translator 132. A variable resistor, $R_1$, is included in the circuit of FIG. 17 and adjusted to insure that the output of the power limit summer is always a little less negative than a chosen fixed negative limit to make certain that there is always a slight negative output from speed summer 110 at the no load value to permit a minimum flow of steam into the turbine and thereby prevent motoring of the turbine generator set.

In FIG. 18, there is shown a three input, two output summer with a variable negative series voltage limiter externally controllable by a potentiometer and a variable negative feedback voltage limit controlled by an external voltage source. The circuit of FIG. 18 being suitable for use as speed summer 160 of the system of FIGS. 2 to 4. For steady D.C. input voltages, the output No. 1 voltage ($e_{o1}$) when not limited by either voltage limiter is in accordance with the equation:

$$e_{o1} = -R_F\left(\frac{e_{i1}}{R_{i1}} + \frac{e_{i2}}{R_{i2}} + \frac{e_{i3}}{R_{i3}}\right) \qquad (10)$$

The feedback capacitor $C_F$ is utilized to limit the frequency response of the D.C. amplifier. Potentiometer $R_{Llm}$ is the externally controllable load limit potentiometer.

The output No. 1 voltage is limited by a variable negative series voltage limiter controlled by an external potentiometer so that this voltage cannot become more negative than an adjustable, preset value, such value suitably being between $+0.5$ volt and $-5$ volts which may be determined by an externally controllable load limit potentiometer $R_{Llm}$, the varying of the position of the slider on this potentiometer providing a correspondingly variable voltage substantially between these limits. The variable negative series voltage limiter comprises diode $CR_5$, resistors $R_A$, $R_E$ and $R_C$, potentiometer $R_{Llm}$ and a resistive load $R_L$. This negative voltage limiter functions in a manner similar to that described for the variable positive series voltage limiter in the circuit of FIG. 15. The feedback capacitor $C_F$ minimizes high frequency noise after limiting by the series limiter has occurred whereby the other feedback circuitry has been disconnected.

The output No. 1 voltage is also limited by a variable negative feedback voltage limiter controlled by an external voltage source so that the output No. 1 voltage cannot become more negative than a value determined by this external voltage source. Thus, as the external voltage source is varied from a negative value to a positive value, suitably from about $-1.5$ volts to $+4.5$ volts, the negative limit value varies, suitably from about $-0.3$ to about $-6.3$ volts. The negative limit becomes more negative when the external voltage source becomes less negative or more positive.

The variable negative feedback voltage limiter comprises diode $CR_6$ and resistors $R_D$ and $R_E$. The voltage across diode $CR_6$ is virtually equal to its cathode voltage with respect to common because the input to the D.C. amplifier is virtually at common potential because of the feedback circuitry. When the output No. 1 voltage is less negative than the negative limit determined by the external voltage source, diode $CR_6$ is reversed biased, its resistance is very high and there is substantially no feedback current therethrough. When the output No. 1 voltage becomes as negative as the negative limit determined by the external voltage source, diode $CR_6$ conducts, its resistance becomes low and there is a large feedback current therethrough. This prevents the output No. 1 voltage from becoming any more negative than the negative limit determined by the external voltage source regardless of any further positive increases in the input voltage to the summer.

The cathode voltage of diode $CR_6$ is determined by the external voltage source and by the D.C. amplifier output voltage. For a given external voltage, the cathode voltage of diode $CR_6$ rises and falls with the D.C. amplifier output voltage. When the cathode voltage of diode $CR_6$ becomes sufficiently negative, suitably about $-0.6$ volt, diode $CR_6$ conducts.

In FIG. 19 there is shown a two input summer circuit for independently summing and then integrating, such circuit being suitable for use as the speed corrector stage 112 of FIGS. 2 to 4. This circuit suitably has two inputs, viz., the speed sensing signal and the speed-load set signal. The circuit provides one output voltage, includes a fixed negative voltage limiter and a variable positive series voltage limiter. For steady D.C. input voltages, the output voltage $[e_o(t)]$ when not limited by the negative or positive voltage limiter is in accordance with the equation:

$$e_0(t) = \frac{R_{FA}}{R_{iB}C_{FB}} \int_0^t \left(\frac{e_{i1}(t)}{R_{i1A}} + \frac{e_{i2}(t)}{R_{i2A}}\right) dt \qquad (11)$$

When a step voltage having a value of $e_{i1}$ is applied to the input No. 1 at a time when both of the input voltages and the output voltage are zero, the resultant output voltage $e_o(t)$ is a function of time $(t)$, and is in accordance with the equation:

$$e_0(t) = \left(\frac{R_{FA}}{R_{iB}}\right)\left(\frac{t}{R_{iA}C_{FB}}\right)e_{i1} \qquad (12)$$

The components of the circuit may be suitably chosen such that with the value of resistor $R_{iB}$ in megohms and the value of capacitor $C_{FB}$ in microfarads, the time constant of the circuit product, $R_{iB}C_{FB}$ is in seconds.

The input voltage No. 1 voltage $e_{i1}(t)$ is applied to a resistor $R_{i1A}$. The input No. 2 voltage $e_{i2}(t)$ is applied to a resistor $R_{i2A}$. The feedback capacitor $C_{FA}$ is utilized to limit the frequency response of D.C. amplifier A. The output voltage $e_{oA}(t)$ from D.C. amplifier A is applied to the input resistance $R_{iB}$ for D.C. amplifier B. The output voltage of the circuit of amplifier A is in accordance with the equation:

$$e_{0A}(t) = -R_{FA}\left(\frac{e_{i1}(t)}{R_{i1A}} + \frac{e_{i2}(t)}{R_{i2A}}\right) \qquad (13)$$

The input resistance for D.C. amplifier B may be provided by either one of two circuit configurations. With a jumper J connected in the position legended "slow," the input resistance consists of resistor $R_S$ in series with the parallel combination of a potentiometer $R_V$ and resistor $R_X$. With jumper J connected in the position legended "fast," the input for amplifier B consists of resistor $R_T$ in series arrangement with parallel combination of the potentiometer $R_V$ and resistor $R_X$. When not limited by the positive or negative voltage limiter, the output voltages of amplifier B is expressed by the equation:

$$e_0(t) = -\frac{1}{R_{iB}C_{FB}} \int_0^t e_{oA}(t) \, dt \qquad (14)$$

Equation 11 which specifies the output voltage of the circuit of FIG. 19 as a function of the input No. 1 voltage and the input No. 2 voltage is obtained by combining Equations 13 and 14.

The product $R_{iB}C_{FB}$ is the time constant for the integrating amplifier A. Potentiometer $R_V$ is utilized to adjust the time constant within the limits permitted by the connection of jumper J. However, regardless of this connection, the time constant may be increased by increasing the resistance of potentiometer $R_V$. With jumper J connected in the "fast" position, the time constant may be a chosen value such as about 0.9 to slightly less that 3.3 seconds. With jumper J connected in the "slow" position, the time constant may suitably be adjustable from about 3.5 seconds or less to about 5.9 seconds or more.

To enable negative voltage limiting in the circuit of FIG. 19, for example, at about −0.5 volt, the fixed negative feedback voltage limiter which comprises a diode $CR_7$ is included.

The functioning of this negative limiter is similar to that described for the fixed negative feedback voltage limiter of the circuit fo FIG. 16.

The output voltage of the circuit of FIG. 19 may also be limited by a variable positive series voltage limiter so that this voltage cannot be more positive than an adjustable preset value, a suitable preset value being between about +2.0 and +4.5 volts. The variation of the resistance of potentiometer $R_Y$ enables the adjusting of the limited positive value. The variable positive voltage limiter comprises a diode $CR_8$, a resistor $R_K$, potentiometer $R_Y$, resistors $R_M$ and $R_N$, and the external resistive load, $R_L$. The operation of this positive voltage limiter is similar to that described for the variable positive series voltage limiter in the circuit of FIG. 16.

*D.C. amplifier*

In FIG. 20, there is shown a block diagram of a D.C. amplifier suitable for use in the summer stage of the system of this invention. This amplifier receives its input voltage from the summing junction, i.e., the input resistance junction and normally operates in the system from a very small input error voltage at this junction.

The functional sections which comprise the amplifier are an electronic chopper 480, a carrier amplifier 482, a demodulator 484, a filter 486, an A.C. bypass network 488, a differential amplifier 490, a direct coupled amplifier 492, a positive limiter 494 and a negative limiter 496. The input voltage to the D.C. amplifier is applied to electronic chopper 480 which chops D.C. and low frequency A.C. components into a square wave carrier voltage. This square wave has a phase corresponding to the instantaneous polarity of the D.C. and low frequency A.C. input voltages, and also the amplitude of the square wave is proportional to them in magnitude.

The output of chopper 480 is amplified by carrier amplifier 482 and demodulated by demodulator 484 which is suitably of the phase-sensitive type. The demodulator output voltage is filtered in filter 486 and the output of filter 486 is applied as one input to differential amplifier 490. The input voltage to the D.C. amplifier is also applied to A.C. bypass network 488 which bypasses high frequency components from the summing junction, the output of network 488 being applied as the other input to differential amplifier 490.

The output voltage of carrier amplifier 482 is 180° out of phase with its input voltage. The phase sensitive demodulator 484 is connected such that the output of filter 486 is an amplified voltage opposite in polarity and phase respectively, to the D.C. and low frequency A.C. components of the input voltage to the D.C. amplifier. It is this amplified and inverted voltage which is applied to one input of differential amplifier 490.

The output voltage from A.C. bypass network 488 is chosen to be in phase with its input for a chosen range of frequencies. It is this non-inverted voltage which is applied to the other input of differential amplifier 490. The D.C. and low frequency A.C. input voltages are inverted whereas the high frequency A.C. input voltages are not. Consequently, in differential amplifier 490, there are summed two voltages which, together, represent all the desired components of input voltage to the D.C. amplifier and this sum is amplified. The combination in the circuit of FIG. 20 of an electronic chopper, a carrier amplifier, a demodulator, a filter, an A.C. bypass network and direct-coupled amplifier presents the advantages of a low D.C. zero drift characteristic and a wide-band frequency response.

The output voltage from differential amplifier 490 is applied to direct coupled amplifier 492 from which the amplifier output voltage is obtained. This output voltage is limited to a maximum positive value, suitably between +6.0 to +8.0 volts and to a maximum negative value, suitably between −6.0 to −8.0 volts. Voltage limitation is accomplished by applying the output voltage to positive limiter 494 and negative limiter 496, these limiters suitably being of the fixed feedback type.

*Servo amplifier*

In FIG. 21, there is shown an arrangement suitable for use as the servo amplifiers of the system of this invention. In this arrangement the valve position command voltage produced at the output of the pertinent summer is applied to an input T network comprising resistors 500 and 502 and a capacitor 504. The valve position feedback voltage is applied to an input resistor 506. An emitter follower stage 508 and a lead circuit 510 comprising parallel connected capacitors 512 and 514 and a series connected resistor 516 provide damping by injecting a signal proportional to valve velocity. The D.C. amplifier 518 is chosen to be a wide band amplifier capable of amplifying not only steady D.C. voltages but, also, A.C. voltages, transient voltages or combinations of these three.

The command and feedback voltages are opposite in polarity. The sum of the values of resistors 500 and 502 and the value of resistor 506 are chosen to have equal values. When the command and feedback voltages are equal in magnitude, the resultant error component of the D.C. amplifier output voltage is zero. When the command and feedback voltages differ in magnitude, the resultant error component of the D.C. amplifier output voltage is proportional to their algebraic sum. Such error component represents, both in magnitude and polarity, the difference between the desired and actual valve position. The magnitude and polarity of the error component are such as to correct the valve position and thus reduce the error component to zero.

The valve position feedback voltage is also applied through emitter follower 508 to input lead circuit 510. A component proportional to the time derivative of the valve position, i.e., to valve velocity, is introduced into the D.C. amplifier output voltage by lead network 510. When valve position remains constant, the valve velocity component is zero. When valve position is changing, the valve velocity component is proportional to the rate of change. This serves to stabilize the servo amplifier system by partly compensating for lag characteristics of the servo valve, hydraulic ram, and associated oil lines.

The series combination of resistors 520 and 522 provide the feedback resistance for the D.C. amplifier. A capacitor 524 provides a feedback capacitance for the D.C. amplifier to attenuate its gain at high frequencies.

The output voltage of D.C. amplifier 518 is amplified by a servo power amplifier 526 to provide the control current for the torque motor and servo valve assembly 528 which is located on the steam turbine. The magnitude and polarity of the output current is such as to correct the steam valve position, and thus reduce the output current to zero.

Steam valve position is sensed by a position transducer 530 which is located on the turbine and connected into an impedance bridge circuit included in the servo amplifier. The A.C. output voltage of the impedance bridge is proportional in magnitude and responsive in phase to steam valve position with zero bridge output chosen to correspond to the full closed valve position. The output of impedance bridge 532 is applied to a phase sensitive full-wave rectifier 534. Both impedance bridge 532 and rectifier 534 are energized by the same exciter 536 reference oscillator voltage, oscillator 536 suitably being an A.C. oscillator having a frequency of 3 kc. The output of rectifier 534 is consequently a full-wave rectified unidirectional voltage proportional in magnitude to the A.C. output voltage of bridge 532. The polarity of the output of rectifier 534 is usually of the same polarity, i.e., negative and is determined by the phase of the output of impedance bridge 532 together with the phase of the reference voltage applied from oscillator 536 to phase sensitive rectifier 534.

A low-pass filter 538 smooths the output voltage from rectifier 534 by removing the unwanted high frequency components. This can be understood when the fact is realized that a component having twice the frequency of the output of oscillator 536 results from the full wave rectification. The output of filter 538 is a relatively smooth D.C. voltage proportional in magnitude and identical in polarity to the fullwave rectified voltage output from phase-sensitive rectifier 534. The output of filter 538 provides the above set forth valve position feedback voltage.

In FIGS. 22 to 24 wherein there is shown a schematic diagram of a circuit represented by the block diagram of FIG. 20. It is understood that in the operation of this circuit, a valve position command voltage is compared with a feedback voltage proportional to the actual valve position.

As mentioned hereinabove, the valve position command voltage is applied to the input T network comprising resistors 500 and 502 and capacitor 504. This command voltage normally may vary from zero volt which is chosen to command a fully closed valve to a suitable positive valve such as +5 volts which commands a fully open valve. The values of the components of the T network are so chosen whereby it passes frequencies up to a chosen value such as about 150 c.p.s. with very little attenuation but greatly attenuates frequencies in excess thereof.

A negative voltage proportional to the valve position is taken from filter 538 (FIG. 21). This filter output voltage is connected to a voltage divider comprising a potentiometer 542 and a resistor 544. Potentiometer 542 which is the feedback voltage control stage 540 of FIG. 20 enables gain adjustment for valve position feedback. The valve position feedback voltage from potentiometer 542 is applied to the input resistor 506. This feedback voltage is chosen suitably to have a range of from zero volt which represents a fully closed valve to about −5 volts which represents a fully open valve.

As has been stated in the description of the circuit of FIG. 21, the command and feedback voltages, which are opposite in polarity, are applied to equal input value resistances. When these voltages are equal in magnitude, the resultant error component of the output voltage of D.C. amplifier 518 is zero. When these voltages differ in magnitude, the resultant error component of the output voltage of D.C. amplifier 518 is proportional to their algebraic sum. This error component represents, in both magnitude and polarity, the difference between the desired and actual valve position. D.C. amplifier 518 is an inverting amplifier and consequently a positive error component results at its output when the valve is too far open, and a negative error component results when the valve is too far closed. The magnitude and polarity of the error component are such as to correct the valve position, and thus reduce the error component to zero. Consequently, a positive error component functions to further close the valve and a negative error component causes an increased opening of the valve.

The valve position feedback voltage from potentiometer 542 is also applied to a compound emitter follower comprising transistors 546 and 548 and an emitter resistor 550. This emitter follower provides a low impedance output for driving lead circuit 510. Lead circuit 510, as has been stated hereinabove, injects into D.C. amplifier 518 a signal proportional to valve velocity to stabilize the servo system by partly compensating for lag characteristics of the servo valve, hydraulic ram and associated oil lines.

The closed loop gain of D.C. amplifier 518 is equal to the ratio of the feedback resistance provided by resistors 520 and 522 to the input resistance and is negative. Capacitor 524 provides the feedback capacitance for D.C. amplifier 518 and operates to limit its frequency response. Resistors 521, 523, 525, and 527, and capacitors 529, 531 and 533 may be further included in the circuit to add special lead and/or lag characteristics to the frequency response of D.C. amplifier 518.

Resistors 552, 554, 556 and 558, potentiometer 560, and resistor 562 provide a valve position synchronizing circuit. A voltage from the voltage divider and bridge network of resistor 552, potentiometer 560 and resistors 554, 556 and 558 is taken from the slider of potentiometer 560, the latter voltage being applied to D.C. amplifier input resistor 562. Potentiometer 560 may be utilized for making fine adjustments of the lower steam valve relative to the upper valve.

Potentiometers 564 and 566 provide zero adjustments for impedance bridge 532. Potentiometer 568 is the zero adjustment for servo power amplifier 526.

D.C. amplifier 518 may suitably be a high-gain wideband D.C. inverting amplifier capable of responding not only to D.C. input voltages but also to alternating and transient input voltages and which amplifies an alternating or a transient voltage superimposed upon a D.C. voltage level. D.C. amplifier 518 may contain positive and negative voltage limiters of the fixed feedback type to suitably limit its output voltage to a positive and negative maximum of about 6.0 to 8 volts respectively. It receives its input from summing junction 519.

The servo power amplifier 526 is a wide-band D.C. amplifier with three direct coupled stages of amplification, viz., an input stage, a driver stage and an output stage. The values of the circuit components therein are suitably chosen to provide a given output current for a given input voltage, suitably about −35 to +35 ma. for an input voltage of +5.0 to −5.0 volts. The input of servo amplifier 526 is driven by the output voltage of D.C. amplifier 518. Its output current is fed to the torque motor and servo valve assembly 528 thereby controlling the hydraulic equipment which positions the steam valve.

The output of amplifier 518 is connected through a resistor 570 to a servo power amplifier input transistor 572. The emitter of transistor 572 is connected to the slider of potentiometer 568 which provides the zero set control for power amplifier 528. Potentiometer 568 is energized from the voltage drop across forward biased diodes 569 and 571 which provide temperature compensation for the input stage of servo power amplifier 526 comprising transistor 572.

The output at the collector of transistor 572 is direct coupled to driver stage transistor 574. The emitter of transistor 574 is connected to a source of regulated voltage provided by a breakdown diode 576. The output current from the collector of transistor 574 flows into the base of a transistor 578 and through the base emitter diode of transistor 578 and a resistor 580 to the negative power supply. In this connection, some of the collector current of transistor 574 also flows to the negative supply through a resistor 579.

The output stage of the servo power amplifier consists of transistors 578 and 582. Breakdown diode 584 provides a regulated voltage which is applied to a resistor 586 for operating the output stage. Current to the collector of transistor 578 is supplied through breakdown diode 584, resistor 586, transistor 582 and a resistor 588. The collector of transistor 578 is also coupled through two forward-biased diodes 587 and 589 to the base of transistor 582. This arrangement enables the coupling of the base of transistor 582 to the collector of transistor 578 through a comparatively low impedance.

In operation, when the collector current of transistor 574 increases, increased current flow through the base-emitter resistance of transistor 578 drives its collector more negative. By the coupling through diodes 587 and 589, the base of transistor 582 is also driven more negative, thus increasing the collector-emitter resistance of transistor 582. The torque motor output, which is connected to the emitter of transistor 582 is driven to a less positive potential with respect to common. Thus, when the input voltage to the servo power amplifier becomes more positive, the collector current of transistor 574 increases and "negative" output current flows upward through the torque motor.

When the collector current in transistor 574 is decreased, the collector-emitter resistance of transistor 578 increases and the collector of transistor 578 is driven more positive. In turn, by the coupling through diodes 587 and 589, the base of transistor 582 is also driven more positive thus lowering the collector-emitter resistance of transistor 582. As a result, the torque motor output is driven more positive with respect to common. Thus, when the input voltage to servo power amplifier 526 becomes more negative, the collector current of transistor 574 decreases and "positive" output current flows downward through the torque motor.

The torque motor current flows through a resistor 590 to common. Inverse current feedback is provided in servo power amplifier 526 by the voltage drop across resistor 590 which is proportional to output current flow, together with the circuit formed through a variable resistor 591 and a resistor 592 to the base of transistor 572. This feedback voltage is opposite in phase to the input voltage applied to resistor 570. Potentiometer 591 is utilized to set the gain of the servo power amplifier. A potentiometer 593 provides the adjustment for the maximum positive output current, i.e., the saturation current that the servo power amplifier is capable of delivering. A diode 594 is provided to protect to the base-emitter junction of transistor 582 against excessive reverse-bias voltages by shunting reverse current around this junction and through diode 594. A capacitor 595 is provided to limit the response of the servo power amplifier to high frequencies.

When the turbine steam valve is in the "command," i.e., correct position, the output voltage of D.C. amplifier 518 is zero and consequently the current output from servo power amplifier 526 is also zero. Because both D.C. amplifier 518 and servo power amplifier 526 are inverting amplifiers, a positive output current results when the turbine steam valve is too far closed and a negative output current results when the turbine steam valve is too far open. The magnitude and polarity of the output current of servo power amplifier 526 are such as to correct the valve position and thus reduce the output current to zero. Consequently, a positive output current therefrom opens the valve further and a negative output current therefrom closes it further.

The impedance bridge 532 of FIG. 21 comprises the secondary winding 602 of a transformer 600, potentiometer 564, a resistor 565 and potentiometer 566. Impedance bridge 532 provides an A.C. voltage proportional in magnitude to the position of the turbine steam valve.

The primary winding 601 of transformer 600 is energized by oscillator 536 and secondary winding 602 energizes impedance bridge 532. The position transducer 530 may suitably be a variable inductance device in which a movable pushrod varies the inductance between terminals A and B and B and C thereof differentially. As one's inductance is increased, the other's is decreased. The position of the turbine valve mechanism determines the position of the movable pushrod. This pushrod is suitably set at its zero position when the turbine steam valve is fully closed.

With the pushrod in the zero position, potentiometers 564 and 566 are adjusted for zero electrical output from the impedance bridge. Potentiometer 564 is the in-phase zero adjustment and adjusts to zero the 3,000 c.p.s. component of the bridge output voltage which is in phase with the bridge excitation. Because of differences in the effective resistances of the two halves of the winding of transducer 530, a small quadrature component having the frequency of oscillator 536 may be present in the bridge output voltage. Potentiometer 566 is the quadrature zero adjustment for adjusting to zero that component of the impedance bridge output voltage which is 90 degrees out of phase with the excitation for the impedance bridge.

Both the in-phase and quadrature components of the output voltage of bridge 532 are zero with the turbine steam valve fully closed and the quadrature component remains substantially zero regardless of valve position. However, the in-phase component is proportional in magnitude to valve position. When the valve is partially or fully open, the bridge output voltage and the phase-sensitive rectifier reference voltage, i.e., the voltage at terminal 603 with respect to the voltage at terminal 605 in secondary winding 604, are 180° out of phase. Consequently, if the valve mechanism were to overtravel beyond the zero (valve fully closed) position, the output of impedance bridge 532 and the phase sensitive rectifier reference voltage would be in phase. The output voltage of impedance bridge 532 is applied to phase sensitive rectifier 534.

Phase sensitive rectifier 534 as shown in FIGS. 22 to 24 is a full-wave, two-ring demodulator. It comprises secondary winding 604 of transformer 600, transformer 606 comprising a primary winding 608 and secondary windings 610 and 612, resistors 614, 616, 618 and 620 and full wave rectifiers 615 and 619. Phase sensitive rectifier 534 provides a full-wave rectified voltage which is proportional in magnitude to the A.C. output voltage of the impedance bridge. The polarity of the output voltage from phase sensitive rectifier 534 is determined by the phase of the output voltage from bridge 532. Phase sensitive rectifier 534 is energized by the reference voltage in secondary winding 604 of transformer 600 and is the voltage at terminal 603 with respect to terminal 605.

The output voltage of bridge 532 is applied to primary winding 608 of transformer 606, the magnitude of the voltages in secondary windings 610 and 612 being stepped up a suitable amount such as about 1.3, their phase relationship to the voltage of primary winding 608 being shown by the polarity dots designated thereon.

When the turbine steam valve is fully closed, the output voltage of impedance bridge 532 is zero, no voltages are induced in secondary windings 610 and 612 and the output voltage of phase sensitive rectifier 534 is zero. When the turbine steam valve is partially or fully open, the output voltage of impedance bridge 532 is proportional in magnitude to the amount of valve opening, and is 180° out of phase with reference voltage for phase sensitive rectifier 534. Voltages are induced in secondary windings 610 and 612 and the output voltage of phase sensitive rectifier 534 is a negative full-wave rectified voltage, proportional in magnitude to valve position.

On the positive half cycle, the diodes of rectifier 615 are forward biased, i.e., conducting, and the diodes of rectifier 619 are reverse biased (non-conducting). The negative half cycle of voltage induced in secondary winding 612 is coupled through the diodes of rectifier 615 to filter 538. The positive half cycle of voltage induced in secondary winding 610 has no effect on the output voltage of phase sensitive rectifier 534 due to the high resistance of the diodes of rectifier 619.

On the negative half cycle of the reference voltage, the diodes of rectifier 615 are reverse biased and the diodes of rectifier 619 are forward-biased. The negative half cycle of voltage induced in secondary winding 610 at this time is applied to filter 538 since the low forward resistance of the diodes of rectifier 619 effectively connects terminal 611 of winding 610 to common. The positive half-cycle of voltage induced in secondary winding 612 has no effect on the rectifier output voltage since the high reverse resistance of the diodes of rectifier 615 effectively disconnects terminal 613 of secondary winding 612 from filter 538.

If the turbine valve mechanism should overtravel beyond the zero (valve fully closed) position, the output voltage of impedance bridge 532 would be proportional in magnitude to the amount of such overtravel and would be in phase with the rectifier reference voltage. Voltages would be induced in secondary windings 610 and 612 and the output voltage of phase sensitive rectifier 534 would be a positive full-wave rectified voltage proportional in magnitude to valve overtravel.

Filter 538 is a two-stage, low-pass L.C. filter network comprising inductors 622 and 624 and capacitors 626, 628 and 630 with inductor 624 being tuned to twice the frequency of the output of oscillator 536, i.e., 6 kc. when the oscillator frequency is 3 kc. The filter smooths the full-wave rectified output voltage of phase sensitive rectifier 534 by removing the components therefrom having twice the frequency of exciter 536 and other undesired high-frequency components.

The output of phase sensitive rectifier 534 is applied through inductor 622 to the pi network comprising inductor 624 and capacitors 626, 628 and 630. The values of inductor 624 and capacitor 628 are chosen so that their parallel combination is resonant at a frequency of approximately twice the frequency of the output of oscillator 536.

When the turbine steam valve is fully closed, the input voltage to and consequently the output voltage from filter 538 is zero.

When the turbine steam valve is partially or fully open, the input voltage to filter 538 is a negative full-wave rectified voltage, proportional in magnitude to valve position. Therefore, the output of filter 538 is a substantially smooth negative D.C. voltage proportional in magnitude to valve position.

If the turbine valve mechanism should overtravel beyond the zero (valve fully closed) position, the filter output voltage would be a smooth positive D.C. voltage proportional in magnitude to the amount of overtravel.

*Exhaust pressure to speed transfer circuitry*

In FIG. 25, there is shown a circuit suitable for use as the exhaust pressure to speed transfer circuitry stage 134 of FIGS. 2 to 4. Assuming an arrangement wherein the local turbine is a single turbine generator unit or wherein it is tied into a load bus with other turbines but where it controls frequency for the arrangement whereby speed corrector stage 112 is in service and exhaust pressure regulation is not in service, then the circuit of FIG. 25 merely functions to effect the application of the voltage take-in from the speed-load set potentiometer in the speed translator stage to speed summer 110 through a resistor 652 and junction point 650. Where the local turbine is tied into a utility distribution line through a tie line breaker, with speed corrector 112 out of service, exhaust pressure regulation in service and stage 134 in the ready position, i.e., the setting of potentiometer 672 at its upper point, then the circuit of FIG. 25 operates to effect the application of the output from exhaust pressure translator 132 to power limit summer 128 and the output at junction point 650 to speed summer 110. In such situation, the exhaust pressure control knob 137 which controls the in-out exhaust pressure potentiometer 654 is in the IN position.

With either the exhaust pressure control or the speed corrector in service and the pressure speed transfer control in the OUT position, a relay K not shown, is in the deenergized state and contacts K1 and K3 associated therewith are in the normally open position while contacts K2 associated with relay K are in the normally closed position. Consequently, the voltage at junction 650 is determined by the value of the voltage from the speed-load potentiometer, the value of resistor 662, normally closed contacts K2 and the value of a variable resistor 668. The speed-load set potentiometer externally controllable by knob 107, FIGS. 2 to 4, has to be brought to its maximum output position when stage 134 is in the ready position.

Now, for the exhaust pressure to speed transfer circuitry stage 134 to operate in a situation wherein the tie line breaker opens, with suitable mechanical ganging of the components of relay K and suitable relay logic circuitry (not shown), relay K is placed in the energized state by the opening of the tie line breaker whereby contacts K1 and K3 assume the closed position and contacts K2 assume the open position. Consequently, the voltage at junction point 650 is now determined by the near maximum voltage setting, which can be taken from the speed load-set potentiometer in speed translator 104, the value of resistor 652 and the value of resistor 662. The ready position of control potentiometer 672 substantially shorting potentiometer 672 to common. Consequently, the potential at junction point 650 is lowered in value whereby a lesser opening of the inlet valves is commanded at the output of $V_1$ summer 140 (FIGS. 2–4), predetermined by the essential electrical load to be carried by the turbine. In this same situation, the signal from exhaust pressure translator 132 is substantially shorted to common through a low value resistor 666 and the now closed contacts K3.

In the circuit of FIG. 25, resistor 662 represents a reset load level, i.e., it sets a predetermined load level. Resistor 668 represents the full resistance of transfer ready potentiometer 672 when it is in the OUT position. Resistor 668 functions to place stage 134 initially into operation without unbalancing turbine operation.

*Trigger and relay circuit*

In FIG. 26, there is shown a circuit suitable for use as the extraction limit trigger stages 150 and 183 of FIGS. 2 to 4. The circuit comprises an amplifier and a relay assembly.

The trigger amplifier comprises a set point circuit 676, a differential amplifier 678, a trigger circuit 680, a bias circuit 681, and an input No. 2, output No. 3 circuit. The No. 1 voltage input to the circuit is taken from the slider at variable resistor 542 in FIGS. 22 to 24, i.e., the feedback control voltage arrangement of the servo amplifier. The difference between the input No. 1 voltage and the adjustable set point voltage from the set point circuit is amplified by the differential amplifier and the output from the differential amplifier is applied to the trigger circuit, which controls the relay in the relay assembly. The trigger amplifier energizes this assembly when the input No. 1 voltage becomes less negative than the set point voltage.

The set point circuit 678 comprises a voltage divider and bridge network comprising resistors 682, 684, 686 and 688 and a potentiometer 690. The set point voltage represents the almost closed position of the extraction valves and is determined by the setting potentiometer 690. The set point voltage value is chosen to vary in a suitable range such as from about −2.0 to +5 volts D.C.

Differential amplifier 678 comprises transistors 692 and 694 and their associated circuit components. This amplifier amplifies the difference between the No. 1 voltage and the adjustable set point voltage and its output drives the trigger circuit 680. The input No. 1 voltage is filtered by the network of a resistor 696 and a capacitor 698 and is applied through a diode 702 to the base of transistor 694. The set point voltage from potentiometer 690 is filtered by a network comprising a resistor 702 and a capacitor 704 and is applied through a diode 700 to the base of transistor 692. Filter network resistor 696, capacitor 698, resistor 702 and capacitor 704 decrease the response of the trigger amplifier to transients with frequencies above a chosen value such as about 10 c.p.s. Diodes 700 and 702 are included to protect transistors 692 and 694 respectively from excessive reverse bias on their base emitter junctions. Resistors 708 and 710 provide collector loads for transistors 692 and 694 respectively.

To maintain the trigger circuit in the untriggered condition, the potential at the base of transistor 694 has to be more negative or less positive than the potential at the base of transistor 692. This results in a forward bias on the base emitter junction of transistor 692 and resulting current flows through the common emitter resistor 712 to drive the emitter of transistor 694 less negative. Consequently, the forward bias on the base emitter junction of transistor 694 is correspondingly decreased. The output voltage in this situation at the collector of transistor 694 is suitably a positive potential such as about +10 to +25 volts D.C.

When the input No. 1 voltage at the base of transistor 694 goes more positive or less negative than the potential at the base of transistor 692, i.e., the set point voltage, the forward bias on the base emitter junction of transistor 694 causes it to conduct. The resultant current flow through resistor 712 drives the emitter of transistor 692 less negative to decrease the forward bias on base to emitter junction of transistor 692. Thus, the collector current in transistor 692 is decreased and the collector current in transistor 694 is increased. The output voltage at the collector of transistor 694 in this situation is suitably from about −3 to +10 volts D. C.

Trigger circuit 680 comprises two transistors 714 and 716 and their associated circuit components. The circuit receives its input from the differential amplifier output and its output controls the relays in the relay assembly.

The output at the collector of transistor 694 is applied across the voltage divider comprising resistors 718 and 720 to the base of transistor 714. A diode 720 protects the base emitter junction of transistor 714 against excess reverse bias by shunting reverse current around the junction and through the diode. A resistor 722 is the collector load for transistor 714.

In the untriggered condition of the circuit of FIG. 26, the base emitter junction of transistor 714 is biased in the forward direction and thereby conductive. The potential at its collector is applied across the voltage divider network comprising a resistor 724 and a resistor 726 to the base of transistor 716. The values of the circuit components are so chosen whereby, in this situation, the base emitter junction of transistor 716 is biased in the reverse direction and transistor 716 is nonconductive.

In the triggered condition of the circuit of FIG. 26, the base to emitter junction of transistor 714 is biased in the reverse direction and transistor 714 is cutoff. The potential at its collector is positive, suitably about +5 volts D.C. This latter voltage is applied across the voltage divider network comprising resistors 724 and 726 to the base of transistor 716. The base emitter junction of transistor 716 is thus biased in the forward direction and transistor 716 conducts. The resultant current flow through the common emitter resistor 728 drives the emitter of transistor 714 more positive thereby applying a reverse bias to the base emitter junction of transistor 714 and maintaining it nonconductive. Transistor 716, therefore, continues to conduct.

Bias circuit 681 is a voltage divider network which comprises a potentiometer 730 and a resistor 732. Circuit 681 provides the bias voltage (output No. 2 voltage) for the circuit when the circuit is in the triggered condition (the bias voltage shown as an input to the relays in the limit triggers of FIGS. 2 to 4).

The magnitude of the bias voltage is determined by the setting of potentiometer 730 and is adjustable within a suitable range such as from about 0 to −1.0 volt D.C.

The operating coil of a relay A is connected between the collector of transistor 716 and the positive potential source disabling circuit 734. The disabling circuit controls the application of positive source potential to the operating coil of relay A. When such potential is removed from the coil, the arrangement of FIG. 26 disabled. In the disabled condition, the circuit arrangement cannot assume the triggered state and activate its output signals no matter what the value of the input No. 1 voltage. A diode 736 is utilized to discharge the coil of relay A and thus protect transistor 716 from inductive voltage surges.

A pair of normally open contacts A1 associated with relay A controls a relay B. A resistor 738 and a capacitor 740 are connected across contacts A1 to provide arc suppression. The normally closed pair of contacts A2 associated with the operating coil of relay A controls the production of the output No. 2 signal from the trigger module, such signal, being the valve position command voltage produced at the output of a pressure conduit valve position command summer 160 or 180 in FIGS. 2 to 4. The other normally closed contact pair 43 associated with relay A controls the production of the output No. 3 signal from the circuit, this output No. 3 being the bias voltage from potentiometer 730.

With the arrangement of FIG. 26, in the untriggered state, transistor 716 is not conductive and relay A is in the deenergized state. Normally open contacts A1 consequently are in the open position and relay B is also deenergized. Normally closed contacts A2 and A3 are in the closed position and the output No. 2 and output No. 3 signals are shorted to common.

With the triggered condition of the arrangement of FIG. 26, transistor 716 is conductive and relay A is energized. Normally open contacts A1 are closed and relay B is energized. Normally closed contacts A2 and A3 are in the open position and the output No. 2 and output No. 3 signals from the circuit are activated. Relay B may be utilized to operate indicating lights and the like.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. In an elastic fluid multi-stage turbine which is included in an arrangement of a plurality of turbines, said arrangement including means for controlling the frequency of said turbine, said turbine including a rotatably mounted output shaft, inlet valve means governing the flow of fluid to said turbine, first and second extraction conduits connected to first and second intermediate stages of said turbine and an exhaust conduit, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed, second means responsive to the pressure in said exhaust conduit for generating a second signal which is a function of the pressure in said exhaust conduit, means in circuit with said first and second signal generating means for modifying said first signal with said second signal to produce a first resultant signal which is a function of said speed and the pressure in said exhaust conduit, third means responsive to the pressure in said first extraction conduit for generating a third signal which is a function of the pressure in said first extraction conduit, fourth means responsive to the pressure in said second extraction conduit for generating a fourth signal which is a function of the pressure in said second extraction conduit, means in circuit with said generating means for modifying said first resultant signal with said third and fourth signals, for modifying said third signal with said first resultant and fourth signals, and for modifying said fourth signal with said first resultant and third signals, a first network controlled by said modified first resultant signal for governing the position of said inlet valve means, a second network controlled by said modified third signal for governing the position of said first extraction valve means, and a third network controlled by said modified fourth signal for governing the position of said second extraction valve means to thereby selectively control both the speed of said output shaft and the fluid pressure in said first and second extraction conduits and in said exhaust conduit.

2. In an elastic fluid multi-stage turbine as defined in claim 1 wherein said inlet valve means comprises upper and lower inlet valve mechanisms, and wherein said first circuit network comprises first and second circuit arrangements, said first modified resultant signal controlling said first and second circuit arrangements to govern the position of said first and second inlet valve mechanisms respectively.

3. In an elastic fluid multi-stage turbine as defined in claim 1 wherein said first electric signal is a unidirectional potential signal and wherein said first generating means includes means for providing a voltage level having a value about which variations of shaft speed are referenced.

4. In an elastic fluid multi-stage turbine as defined in claim 3 wherein said shaft is adapted to include a variable load and wherein said first generating means includes means for providing a voltage having a value which represents a maximum speed for said shaft in the absence of any load.

5. In an elastic fluid multi-stage turbine as defined in claim 4 wherein said means for deriving said first electric signal further includes means for providing a limiting voltage which represents the maximum degree of opening permitted to said inlet valve means in response to changes in shaft speed and load independent of the value of said voltage about which said variations of said shaft speed are referenced and the voltage representing said maximum speed.

6. In an elastic fluid multi-stage turbine as defined in claim 1 wherein said first resultant signal producing means comprises means for controlling the output of said first generating means in accordance with the output of said second generating means.

7. In an elastic fluid multi-stage turbine as defined in claim 1 wherein said modifying means comprises respective first, second and third summing means for algebraically adding said first resultant, said third and said fourth signals.

8. In an elastic fluid multi-stage turbine as defined in claim 1 wherein said first, second and third circuit networks include respectively first, second and third like transducing means for generating a voltage having an amplitude which is a function of the degree of movement of a valve means respectively from a chosen position.

9. In an elastic fluid multi-stage turbine as defined in claim 8 wherein said first, second and third networks respectively include first, second and third deriving means respectively responsive to the outputs of said first, second and third transducer means for producing respective first, second and third unidirectional potentials which represent the positions of said inlet valve means and said first and second extraction valve means.

10. In an elastic fluid multi-stage turbine as defined in claim 9 wherein there are included summing means for algebraically adding said first modified resultant signal and said first unidirectional potential, summing means for algebraically adding said third modified signal and said second unidirectional potential and summing means for algebraically adding said fourth modified signal and said third unidirectional potential.

11. In an elastic fluid multi-stage turbine as defined in claim 1 wherein said means for generating said second, third and fourth signals includes first, second and third transducer means, respectively, for providing first, second and third alternating current voltages having amplitudes respectively proportional to the pressure in said exhaust conduit and in said first and second extraction conduits, means for producing null voltages at first, second and third maximum pressures from said generating means, means for producing first, second and third alternating current signals having first, second, and third predetermined values which represent desired operating pressures in said exhaust and extraction conduits, and means for converting said first, second and third alternating current voltages to first, second and third unidirectional potentials which represent deviations of the pressures in said exhaust conduit and said extraction conduits from said respective predetermined operating pressures.

12. In an elastic fluid multi-stage turbine as defined in claim 11 wherein there are further included means for providing first, second and third chosen reference voltages to establish chosen reference pressure levels in said exhaust and high low pressure extraction conduits respectively at which said turbine is to normally operate, said chosen voltages respectively not exceeding the magnitudes of the voltages representing said predetermined maximum pressures.

13. In an elastic fluid multi-stage turbine as defined in claim 12 wherein there are further included means for providing a first flow limit voltage which represents a maximum flow of elastic fluid through said exhaust conduit, means for providing a second flow limit voltage which represents a maximum flow of elastic fluid through said first extraction conduit, means for providing a third flow limit voltage which represents a maximum flow of elastic fluid through said second extraction conduit, means for algebraically summing said first unidirectional potential, said first reference voltage and flow limit voltage, means for algebraically summing said second unidirectional potential reference voltage and flow limit voltage, and means for algebraically summing said third unidirectional potential, reference voltage and flow limit voltage, the outputs of said summing means being unidirectional potentials which respectively represent a deviation in pressure in the exhaust and high and low pressure extraction conduits from said chosen reference pressures and flow limits respectively up to a given maximum for each conduit.

14. In an elastic fluid multi-stage turbine as defined in claim 1 wherein there are further included means for admitting fluid to said first extraction conduit, said means responsive to the pressure in said first extraction conduit generating a fifth signal which is a function of the pressure of said admitted fluid.

15. In an elastic fluid multi-stage turbine as defined in claim 14 wherein said fifth signal is combnied with said first resultant signal and said fourth signal in said modifying means to provide said modified first resultant signal for controlling said first network, said modified third signal for controlling said second network, and said modified fourth signal for controlling said third network.

16. In an elastic fluid multi-stage turbine which is included in an arrangement of a plurality of turbines, said arrangement including means for controlling the frequency of said turbine, said turbine including a rotatably mounted output shaft, inlet valve means governing the flow of fluid to said turbine, first and second extraction conduits connected to first and second intermediate stages of said turbine and an exhaust conduit, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed, second means responsive to the pressure in said exhaust conduit for generating a second signal which is a function of the pressure in said exhaust conduit, means in circuit with said first and second signal generating means for modifying said first signal with said second signal to produce a first resultant signal which is a function of said speed and the pressure in said exhaust conduit, third means responsive to the pressure in said first extraction conduit for generating a third signal which is a function of the pressure in said first extraction conduit, fourth means responsive to the pressure in said second extraction conduit for generating a fourth signal which is a function of the pressure in said second extraction conduit, means in circuit with said generating means for modifying said first resultant signal with said third and fourth signals, for modifying said third signal with said first resultant and fourth signals, and for modifying said fourth signal with said first resultant and third signals, a first network controlled by said modified first resultant signal for governing the position of said inlet valve means, a second network controlled by said modified third signal for governing the position of said first extraction valve means, and a third network controlled by said modified fourth signal for governing the position of said second extraction valve means, first limiting means enabled in response to a selected position of said first extraction valve means for counteracting the modification of said first resultant signal with said third signal, and for enhancing said modified first resultant signal with said first signal and second limiting means enabled in response to a selected position of said second extraction valve means for counteracting the modification of said first resultant and third signals with said fourth signal and for enhancing said modified first resultant and said modified third signals with said first signal.

17. In an elastic fluid multi-stage turbine as defined in claim 16 wherein a limiting means comprises means which is triggered in response to said selected valve means position and means responsive to said triggering for adding one of said third and fourth signals to itself in the opposite polarity.

18. In an elastic fluid multi-stage turbine as defined in claim 17 wherein there are further included means for admitting fluid to said first extraction conduit, said third means responsive to the pressure in said first extraction conduit generating a fifth signal which is a function of the pressure of said admitted fluid.

19. In an elastic fluid multi-stage turbine as defined in claim 18 wherein said fifth signal is combined with said first resultant signal and said fourth signal in said modifying means to provide said modified first resultant signal for controlling said first network, said modified third signal for controlling said second network and said modified fourth signal for controlling said third network.

20. In an elastic fluid multi-stage turbine as defined in claim 19 wherein the enabling of said first limiting means effects the counteracting of said first resultant signal by said fourth signal.

21. In an elastic fluid multi-stage turbine which includes a rotatably mounted output shaft, inlet valve means governing the flow of fluid to said turbine, first and second extraction conduits connected to first and second intermediate stages of said turbine, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed, second means responsive to the pressure of fluid admitted to said turbine for generating a second signal which is a function of said admitted fluid pressure of a chosen value, means in circuit with said first and second signal generating means for modifying said first signal with said second signal to produce a first signal having a magnitude up to a predetermined limiting value, third means responsive to the pressure in said first extraction conduit for generating a third signal which is a function of the pressure in said extraction conduit, fourth means responsive to the pressure in said second extraction conduit for generating a fourth signal which is a function of the pressure in said second extraction conduit, means in circuit with said generating means for modifying said first resultant signal with said third and fourth signals, for modifying said third signal with said first resultant and fourth signals and for modifying said fourth signal with said first resultant and third signals, a first network controlled by said modified first resultant signal for governing the position of said inlet valve means, a second network controlled by said modified third signal for governing the position of said first extraction valve means, and a third network controlled by said modified fourth signal for governing the position of said second extraction valve means to thereby selectively control both the speed of said output shaft and the fluid pressure in said first and second extraction conduits and to limit the speed of said output shaft in accordance with said predetermined value.

22. In an elastic fluid multi-stage turbine which includes a rotatably mounted output shaft, and inlet valve means governing the flow of fluid to said turbine, first and second extraction conduits connected to first and second intermediate stages of said turbine, first extraction valve means which governs the proportion of fluid which flows from the first intermediate stage to a succeeding stage and second extraction valve means which governs the proportion of fluid which flows from the second intermediate stage to a succeeding stage; the combination comprising first means responsive to the speed of said output shaft for generating a first signal which is a function of said speed, second means responsive to the pressure in said first extraction conduit for generating a second signal which is a function of pressure in said first extraction conduit, third means responsive to the pressure in said second extraction conduit for generating a third signal which is a function of the pressure in said second extraction conduit, means in circuit with said generating means for modifying said first signal with said second and third signals, for modifying said second signal with said first and third signals and for modifying said third signal with said first and second signals, a first network controlled by said modified first signal for governing the position of said inlet valve means, a second network controlled by said modified second signal for governing the position of said first extraction valve means, a third network controlled by said modified third signal for governing the position of said second extraction valve means, means for admitting steam to said first extraction conduit, said second means generating a fourth signal which is a function of the pressure of said admitted steam, said third and fourth signals modifying said first signal to produce said first modified signal, said first and third signals modifying said fourth signal to produce said second modified signal and said first and fourth signals modifying said third signal to produce said third modified signal to control said first, second and third networks respectively.

23. In an elastic fluid multi-stage turbine which includes a rotatably mounted output shaft, inlet valve means governing the flow of fluid to said turbine, first and second extraction conduits connected to first and second intermediate stages of said turbine, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed, second means responsive to the pressure in said first extraction conduit for generating a second signal which is a function of pressure in said first extraction conduit, third means responsive to the pressure in said second extraction conduit for generating a third signal which is a function of the pressure in said second extraction conduit, means in circuit with said generating means for modifying said first signal with said second and third signals, for modifying said second signal with said first and third signals and for modifying said third signal with said first and second signals, a first network controlled by said modified first signal for governing the position of said inlet valve means, a second network controlled by said modified second signal for governing the position of said first extraction valve means, a third network controlled by said modified third signal for governing the position of said second extraction valve means, means for admitting fluid to said first extraction conduit, said second means generating a fourth signal which is a function of the pressure of said admitted fluid, said third and fourth signals modifying said first signal to produce said first modified signal, said first and third signals modifying said fourth signal to produce said second modified signal and said first and fourth signals modifying said third signal to produce said third modified signal to control said first, second and third networks respectively, first limiting means enabled in response to a selected position of said first extraction valve means for counteracting the modification of said first signal with said second and fourth signals and for enhancing said first modified signal with said first signal, and second limiting means enabled in response to a selected position of said second extraction valve means for counteracting the modification of said first and second and fourth signals with said third signals and for enhancing said first modified signal with said first signal.

24. In an elastic fluid multi-stage turbine as defined in claim 23 wherein a limiting means comprises means which is triggered in response to said selected valve means position, and means responsive to said triggering for adding one of said second, third and fourth signals to itself in the opposite polarity.

25. In an elastic fluid multi-stage turbine which is included in an arrangement of a plurality of turbines, said arrangement including means for controlling the frequency of said turbine, said turbine including a rotatably mounted output shaft, inlet valve means governing the flow of fluid to said turbine, first and second extraction conduits connected to first and second intermediate stages of said turbine and an exhaust conduit, first extraction valve means which governs the proportion of fluid which flows from the first intermediate stage to a second stage, and second extraction valve means which governs the proportion of fluid which flows from the second intermediate stage to a succeeding stage, the combination comprising first means responsive to the speed of said output shaft for generating a first signal which is a function of said speed, second means responsive to the pressure in said exhaust conduit for generating a second signal which is a function of the pressure in said exhaust conduit, third means responsive to the pressure of fluid admitted into said turbine for generating a third signal which is a function of said admitted fluid pressure of a given value, means in circuit with said first, second and third signal generating means for modifying said first signal with said second and third signals to produce a first resultant signal which is a function of said speed, the pressure in said exhaust conduit and said admitted fluid pressure and for limiting said first resultant signal at a predetermined value in accordance with said third signal, fourth means responsive to the pressure in said first extraction conduit for generating a fourth signal which is a function of the pressure in said first extraction conduit, fifth means responsive to the pressure in said second extraction conduit for generating a fifth signal which is a function of the pressure in said second extraction conduit, means in circuit with said generating means for modifying said first resultant signal with said fourth and fifth signals, for modifying said fourth signal with said first resultant and fifth signals, and for modifying said fifth signal with said first resultant and fourth signals, a first network controlled by said modified first resultant signal for governing the position of said inlet valve means, a second network controlled by said fourth modified signal for governing the position of said first extraction valve means, and a third network controlled by said modified fifth signal for governing the position of said second extraction valve means to thereby selectively control both the speed of said output shaft and the fluid pressure in said first and second extraction conduits and in said exhaust conduit, and to limit the speed of said output shaft in accordance with said predetermined value.

26. In an elastic fluid multi-stage turbine as defined in claim 25 wherein there are further included means for admitting fluid to said first extraction conduit, said fourth means responsive to the pressure in said first extraction conduit generating a sixth signal which is a function of the pressure of fluid admitted to said first extraction conduit, said sixth signal being combined with said first resultant signal and said fifth signal in said modifying means to provide said modified first signal for controlling said first network, said modified fourth signal for controlling said second network and said modified fifth signal for controlling said third network.

27. In an elastic fluid multi-stage turbine as defined in claim 26 and further including first limiting means enabled in response to a selected position of said first extraction valve means for counteracting the modification of said first resultant signal with said fourth and sixth signals, and for enhancing said first resultant signal with said first signal, and second limiting means enabled in response to a selected position of said second extraction valve means for counteracting the modification of said first resultant and fourth and sixth signals with said fifth signal, and for enhancing said first resultant signal with said first signal, said limiting means comprising means which is triggered in response to said selected valve means position and means responsive to said triggering for adding one of said fourth, sixth and fifth signals to itself in the opposite polarity.

28. In an elastic fluid multi-stage turbine which is tied into a system comprising a plurality of turbines and wherein said system includes means for maintaining frequency control of said turbine, said turbine including a rotatably mounted output shaft, inlet valve means governing the flow of fluid to said turbine, first and second extraction conduits connected to first and second intermediate stages of said turbine and an exhaust conduit, first extraction valve means which governs the proportion of fluid which flows from the first intermediate stage to a succeeding stage and second extraction valve means which governs the proportion of fluid which flows from the second intermediate stage to a succeeding stage; the combination comprising first means responsive to the speed of said output shaft for generating a first signal which is a function of said speed, second means responsive to the pressure in said exhaust conduit for generating a second signal which is a function of the pressure in said exhaust conduit, means in circuit with said first and second signal generating means for controlling said first signal with said second signal to produce a first resultant signal which controls the generated load of said turbine in accordance with the pressure in said exhaust conduit, third means responsive to the pressure in said first extraction conduit for generating a third signal which is a function of the pressure in said first extraction conduit, fourth means responsive to the pressure in said second extraction conduit for generating a fourth signal which is a function of the pressure in said second extraction conduit, means in circuit with said generating means for modifying said first resultant signal with said third and fourth signals, for modifying said third signal with said first resultant and fourth signals, and for modifying said fourth signal with said first resultant and third signals, a first network controlled by said modified first resultant signal for governing the position of said inlet valve means, a second network controlled by said modified third signal for governing the position of said first extraction valve means and a third network controlled by said modified fourth signal for governing the position of said second extraction valve means, and means responsive to the disconnecting of said turbine from said system for removing from said first signal, the control of said second signal.

29. In an elastic fluid multi-stage turbine as defined in claim 28 wherein there are further included means for admitting fluid to said first extraction conduit, said means responsive to the pressure in said first extraction conduit generating a fifth signal which is a function of the pressure of said admitted fluid, said fifth signal being combined with said first resultant signal and said fourth signal in said modifying means to provide said modified first resultant signal for controlling said first network, said modified third signal for controlling said second network and said modified fourth signal for controlling said third network.

30. In an elastic fluid multi-stage turbine as defined in claim 29 and further including first limiting means enabled in response to a selected position of said first extraction valve means for counteracting the modification of said first resultant signal with said third and fifth signals and for enhancing said first resultant signal with said first signal and second limiting means enabled in response to a selected position of said extraction valve means for counteracting the modification of said first resultant signal and said third and fifth signals with said fourth signal and for enhancing said first resultant signal with said first signal, said limiting means comprising means which is triggered in response to said selected valve means position and means responsive to said triggering for adding one of said third, fourth and fifth signals to itself in the opposite polarity.

31. In an elastic fluid multi-stage turbine which is tied into a multiple turbine generating system which maintains the frequency of said turbine, said turbine including a rotatably mounted output shaft, inlet valve means governing the flow of fluid to said turbine, first and second extraction conduits connected to first and second intermediate stages of said turbine, and an exhaust conduit, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed, second means responsive to the pressure in said exhaust conduit for generating a second signal which is a function of the pressure in said exhaust conduit, third means responsive to a range of minimum permissible pressures of the fluid admitted into said turbine for generating a third signal which is a function of said minimum admitted fluid pressures, means in circuit with said first and second and third signal generating means for producing a first resultant signal controlled in accordance with said second signal and having a predetermined limiting value in accordance with said third signal, fourth means responsive to the pressure in said first extraction conduit for generating a fourth signal which is a function of the pressure in said first extraction conduit, fifth means responsive to the pressure in said second extraction conduit for generating a fifth signal which is a function of the pressure in said second extraction conduit, means in circuit with said generating means for modifying said first resultant signal with said fourth and fifth signals, for modifying said fourth signal with said first resultant and fifth signals and for modifying said fifth signal with said first resultant and fourth signals, a first network controlled by said modified first resultant signal for governing the position of said inlet valve means, a second network controlled by said modified fourth signal for governing the position of said first extraction valve means and a third network controlled by said modified fifth signal for governing the position of said second extraction valve means and means responsive to the disconnection of said turbine from said system for removing the control exercised by said second signal over said first signal whereby the first resultant signal is a function of said first signal limited in accordance with said third signal.

32. In an elastic fluid multi-stage turbine as defined in claim 31 and further including means for admitting fluid into said first extraction conduit, said means responsive to pressure in said first extraction conduit generating a sixth signal which is a function of the pressure of said admitted conduit fluid, said sixth signal being combined with said first resultant signal and said fifth signal in said modifying means to provide said modified first resultant signal for controlling said first network, said modified fourth signal for controlling said second network and said modified fifth signal for controlling said third network.

33. In an elastic fluid multi-stage turbine as defined in claim 31 wherein there are further included first limiting means enabled in response to a selected position of said first extraction valve means for counteracting the modification of said first resultant signal with said fourth signal, and for enhancing said first resultant signal with said first signal, and second limiting means enabled in response to a selected position of said second extraction valve means for counteracting the modification of said first resultant and said fourth signals with said fifth signal, and for enhancing said modified first resultant signal with said first signal, said limiting means comprising means which is triggered in response to said selected valve means position and means responsive to said triggering for adding one of said fourth and fifth signals to itself in the opposite polarity.

34. In an elastic fluid multi-stage turbine as defined in claim 31 and further including means for admitting fluid into said first extraction conduit, said means responsive to the pressure in said first extraction conduit generating a sixth signal which is a function of the pressure of said admitted steam, said sixth signal being combined with said first resultant signal and said fifth signal in said modifying means to provide said modified first resultant signal for controlling said first network, said modified fourth signal for controlling said second network and said modified fifth signal for controlling said third network, first limiting means enabled in response to a selected position of said first extraction valve means for counteracting the modification of said first resultant signal with said fourth and sixth signals and for enhancing said first resultant signal with said first signal, and second limiting means enabled in response to a selected position of said second extraction valve means for counteracting the modification of said first resultant and said fourth and sixth signals with said fifth signal and for enhancing said first resultant signal with said first signal, said limiting means each comprising means which is triggered in response to said respective selected valve means position and means responsive to said triggering for adding one of said fourth, fifth, and sixth signals to itself in the opposite polarity.

35. In an elastic fluid multi-stage turbine which includes a rotatably mounted output shaft, inlet valve means governing the flow of fluid to said turbine, first and second extraction conduits connected to first and second intermediate stages of said turbine, and an exhaust conduit, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed and for generating a second signal which represents a given speed for a given load, means in circuit with said first means for comparing said first and second signals and for integrating the difference therebetween to produce a time integrated signal, second means responsive to the pressure in said exhaust conduit for generating a second signal which is a function of the pressure in said exhaust conduit, means in circuit with said first signal, said second signal and said integrating means for producing a first resultant signal, third means responsive to the pressure in said first extraction conduit for generating a third signal which is a function of the pressure in said first extraction conduit, fourth means responsive to the pressure in said second extraction conduit for generating a fourth signal which is a function of the pressure in said second extraction conduit, means in circuit with said generating means for modifying said first resultant signal with said third and fourth signals, for modifying said third signal with said first resultant and fourth signals and for modifying said fourth signal with said first resultant and second signals, a first network controlled by said modified first resultant signal for governing the position of said inlet valve means, a second network controlled by said modified third signal for governing the position of said first extraction valve means and a third network controlled by said modified fourth signal for governing the position of said second extraction valve means.

36. In an elastic fluid multi-stage turbine as defined in claim 35 wherein said integrating means comprises summing means in circuit with said first signal generating means for adding said first and second signals to provide a difference signal therebetween and means for time integrating said difference signal.

37. In an elastic fluid multi-stage turbine as defined in claim 36 and further including means for admitting fluid into said first extraction conduit, said means responsive to the pressure in said first extraction conduit generating a fifth signal which is a function of pressure of said admitted conduit fluid, said fifth signal being combined with said first resultant signal and said fourth signal in said modifying means to provide said modified first signal for controlling said first network, said modified third signal for controlling said second network, and said modified fourth signal for controlling said third network.

38. In an elastic fluid multi-stage turbine as defined in claim 37 and further including first limiting means enabled in response to a selected position of said first extraction valve means for counteracting the modification of said first resultant signal with said third and fifth signals and for enhancing said first resultant signal with said first signal, and second limiting means enabled in response to a selected position of said second extraction valve means for counteracting the modification of said first resultant and third and fifth signals with said fourth signal and for enhancing said first resultant signal with said first signal, said limiting means comprising means which is triggered in response to said selected valve means position and means responsive to said triggering for adding one of said third, fourth, and fifth signals to itself in the opposite polarity.

39. In an elastic fluid multi-stage turbine as defined in claim 35 and further including first limiting means enabled in response to a selected position of said first extraction valve means for counteracting the modification of said first resultant signal with said third signal and for enhancing said first resultant signal with said first signal, and second limiting means enabled in response to a selected position of said second extraction valve means for counteracting the modification of said first resultant and said third signals with said fourth signal and for enhancing said first resultant signal with said first signal, said limiting means comprising means which is triggered in response to said selected valve means position and means responsive to said triggering for adding one of said third and fourth signals to itself in the opposite polarity.

40. In an elastic fluid multi-stage turbine which is contained in an arrangement of a plurality of turbines, said arrangement including means for controlling the frequency of said turbine, said turbine including a rotatably mounted output shaft, inlet valve means governing the flow of fluid to said turbine, first and second extraction conduits connected to first and second intermediate stages of said turbine and an exhaust conduit, first extraction valve means which governs the proportion of fluid which flows from the first intermediate stage to a succeeding stage of said turbine, and second extraction valve means which governs the proportion of fluid which flows from the second intermediate stage to a succeeding stage of said turbine; the combination comprising first means responsive to the speed of said output shaft for generating a first signal which is a function of said speed and a second signal which represents a chosen speed with a given load, means in circuit with said first signal generating means for comparing said first and second signals and for time integrating the difference therebetween, second means responsive to the pressure in said exhaust conduit for generating a third signal which is a function of the pressure in said exhaust conduit, third means responsive to a pressure of a chosen minimum value of fluid admitted into said turbine for generating a fourth signal which is the function of said minimum admitted fluid pressure, means in circuit with said first, second and third signal generating means and said integrating means for modifying said first signal with said time integrated signal and said third and fourth signals to produce a first resultant signal controlled to a predetermined limiting value in accordance with said fourth signal, fourth means responsive to the pressure in said first extraction conduit for generating a fifth signal which is a function of the pressure in said first extraction conduit, fifth means responsive to the pressure in said second extraction conduit for generating a sixth signal which is a function of the pressure in said second extraction conduit, means in circuit with said generating means for modifying said first resultant signal with said fifth and sixth signals, for modifying said fifth signal with said first resultant and sixth signals, and for modifying said sixth signal with said first resultant and fifth signals, a first network controlled by said modified first resultant signal for governing the position of said inlet valve means, a second network controlled by said modified fifth signal for governing the position of said first extraction valve means and a third network controlled by said modified sixth signal for governing the position of said second extraction valve means.

41. In an elastic fluid multi-stage turbine as defined in claim 40 and further including means for admitting fluid into said first extraction conduit, said fourth means generating a seventh signal which is a function of the pressure of said conduit admitted fluid, said seventh signal being combined with said first resultant and sixth signals in said modifying means to provide said modified first signal for controlling said first network, said modified fifth signal for controlling said second network and said modified sixth signal for controlling said third network.

42. In an elastic fluid multi-stage turbine as defined in claim 41 and further including first limiting means enabled in response to a selected position of said first extraction valve means for counteracting the modification of said first resultant signal with said fifth and seventh signals and for enhancing said first resultant signal with said first signal, and second limiting means enabled in response to a selected position of said second extraction valve means for counteracting the modification of said first resultant, fifth and seventh signals with said sixth signal and for enhancing said first resultant signal with said first signal, said limiting means comprising means which is triggered in response to said selected valve means position and means responsive to said triggering for adding one of said fifth, sixth and seventh signals to itself in the opposite polarity.

43. In an elastic fluid multi-stage turbine as defined in claim 40 and further including first limiting means enabled in response to a selected position of said first extraction valve means for counteracting the modification of said first resultant signal with said fifth signal and for enhancing said first resultant signal with said first signal, and second limiting means enabled in response to a selected position of said second extraction valve means for counteracting the modification of said first resultant and fifth signals with said sixth signal and for enhancing said first resultant signal with said first signal, said limiting means comprising means which is triggered in response to said selected valve means position and means responsive to said triggering for adding one of said fifth and sixth signals to itself in the opposite polarity.

44. In an elastic fluid multi-stage turbine capable of controlling the frequency of a plurality of turbines connected to a common load bus and adapted to be tied into an arrangement of a plurality of turbines, said arrangement including means for controlling the frequency of said turbines, said turbine including a rotatably mounted output shaft, inlet valve means governing the flow of fluid to said turbine, first and second extraction conduits connected to said first and second intermediate stages of said turbine and an exhaust conduit, first extraction valve means which governs the proportion of fluid which flows from the first intermediate stage to a succeeding stage, and second extraction valve means which governs the proportion of fluid which flows from the second intermediate stage to a succeeding stage; the combination comprising first means responsive to the speed of said output shaft for generating a first signal which is a function of said speed and a second signal which represents a chosen speed and given load, means in circuit with said first means for comparing said first and second signals and integrating the difference therebetween to produce a time integrated difference signal, second means responsive to the pressure in said exhuast conduit for generating a third signal which is a function of the pressure in said exhaust conduit, first modifying means in circuit with said first and second signal generating means and said integrating means for modifying said first signal with said integrated and third signals to produce a first resultant signal, third means responsive to the pressure in said first extraction conduit for generating a fourth signal which is a function of the pressure in said first extraction conduit, fourth means responsive to the pressure in said second extraction conduit for generating a fifth signal which is a function of the pressure in said second extraction conduit, second modifying means in circuit with said first modifying means and said third and fourth generating means for modifying said first resultant signal with said fourth and fifth signals, for modifying said fourth signal with said first resultant and fifth signals and for modifying said fifth signal with said first resultant and fourth signals, a first network controlled by said modified first resultant signal for governing the position of said inlet valve means, a second network controlled by said modified fourth signal for governing the position of said first extraction valve means, and a third network controlled by said modified fifth signal for governing the position of said second extraction valve means, means responsive to the tying in of said turbine into said arrangement for removing the modifying action of said integrated signal from said first signal to effect control of said first resultant signal in accordance with said third signal and responsive to the disconnection of said turbine from said arrangement for removing the control of said third signal from said first resultant signal.

45. In an elastic fluid multi-stage turbine as defined in claim 44, and further including means for admitting fluid into said high pressure conduit, said third means generating a sixth signal which is a function of the pressure of said conduit admitted fluid, said sixth signal being combined with said first resultant signal and said fifth signal in said second modifying means to provide said modified first resultant signal for controlling said first network, said modified fourth signal for controlling said second network and said modified fifth signal for controlling said third network.

46. In an elastic fluid multi-stage turbine as defined in claim 45 and further including first limiting means responsive to a selected position of said first extraction valve means for counteracting the modification of said first resultant signal with said fourth and sixth signals and for enhancing said first resultant signal with said first signal and second limiting means enabled in response to a selected position of said second extraction valve means for counteracting the modification of said first resultant signal and said fourth and sixth signals with said fifth signal and for enhancing said first resultant signal with said first signal.

47. In an elastic fluid multi-stage turbine as defined in claim 44 and further including first limiting means enabled in response to a selected position of said first extraction valve means for counteracting the modification of said first resultant signal with said fourth signal and for enhancing said first resultant signal with said first signal, and second limiting means enabled in response to a selected position of said second extraction valve means for counteracting the modification of said first resultant and said fourth signals with said fifth signal and for enhancing said first resultant signal with said first signal, said limiting means comprising means which is triggered in response to a selected extraction valve position and means responsive to said triggering for effecting the addition of one of said fourth and fifth signals to itself in the opposite polarity.

48. In an elastic fluid multi-stage turbine as defined in claim 44 wherein there is further included fifth means responsive to a pressure in fluid admitted to said turbine of a chosen minimum value for generating a sixth signal which is a function of said minimum admitted fluid pressure, said first modifying means being in circuit with said sixth signal generating means to limit said first resultant signal to a predetermined value in accordance with said sixth signal.

49. In an elastic fluid multi-stage turbine as defined in claim 48 and further including means for admitting fluid into said first extraction conduit, said third means generating a seventh signal which is a function of the pressure of said conduit admitted steam, said seventh signal being combined in said second modifying means with said first resultant signal and said fifth signal to provide said modified first resultant signal for controlling said first network, said modified fourth signal for controlling said second network and said modified fifth signal for controlling said third network.

50. In an elastic fluid multi-stage turbine as defined in claim 49 and further including first limiting means enabled in response to a selected position of said first extraction valve means for counteracting the modification of said first resultant signal with said fourth and seventh signals, and for enhancing said first resultant signal with said first signal, and second limiting means enabled in response to a selected position of said second extraction valve means for counteracting the modification of said first resultant signal and said fourth and seventh signals with said fifth signal and for enhancing said first resultant signal with said first signal.

51. In an elastic fluid multi-stage turbine which is contained in an arrangement of a plurality of turbines, said arrangement including means for controlling the frequency of said turbine, said turbine including a rotatably mounted output shaft, inlet valve means governing the flow of fluid to said turbine and an exhaust conduit; the combination comprising first means responsive to the speed of said output shaft generating a first signal which is a function of said speed, second means responsive to the pressure in said exhaust conduit for generating a second signal which is a function of the pressure in said exhaust conduit, means in circuit with said first and second signal generating means for modifying said first signal with said second signal to produce a first resultant signal, and a network controlled by said first resultant signal for governing the position of said inlet valve means.

52. In an elastic fluid multi-stage turbine which is contained in an arrangement of a plurality of turbines, said arrangement including means for controlling the frequency of said turbine, said turbine including a rotatably mounted output shaft, inlet valve means governing the flow of fluid to said turbine and an exhaust conduit; the combination comprising first means responsive to the speed of said output shaft for generating a first signal which is a function of said speed, second means responsive to the pressure in said exhaust conduit for generating a second signal which is a function of the pressure in said exhaust conduit, third means responsive to the pressure of fluid admitted into said turbine for generating a third signal which is a function of a chosen minimum pressure in said admitted fluid, means in circuit with said first, second and third signal generating means for modifying said first signal with said second and third signals to produce a first resultant signal which is limited to a predetermined value in accordance with said minimum pressure, and a network responsive to the application thereto of said first resultant signal for governing the position of said inlet valve means.

53. In an elastic fluid multi-stage turbine which includes a rotatably mounted output shaft and inlet valve means governing the flow of fluid to said turbine; first means responsive to the speed of said output shaft for generating a first signal which is a function of said speed, second means responsive to the pressure of fluid admitted into said turbine for generating a second signal which represents a minimum chosen pressure in said admitted fluid, means in circuit with said first and second signal generating means for controlling said first signal with said second signal to a predetermined value in accordance with said chosen minimum pressure, and a network responsive to the application thereto of said controlled first signal for governing the position of said inlet valve means.

54. In an elastic fluid multi-stage turbine adapted to be tied into a multiple turbine generating system capable of controlling the frequency of said turbine, said turbine including a rotatably mounted output shaft, inlet valve means governing the flow of fluid to said turbine, and an exhaust conduit; the combination comprising first means responsive to the speed of said output shaft for generating a first signal which is a function of said speed, second means responsive to the pressure in said exhaust conduit for generating a second signal which is a function of the pressure in said exhaust conduit, the value of said exhaust conduit pressure controlling the generated load of said turbine; means in circuit with said first and second signal generating means for controlling said first signal in accordance with said second signal to produce a first resultant signal, a network controlled by said first resultant signal for governing the position of said inlet valve means, and means responsive to the disconnection of said turbine from said system for removing from said first signal, the control of said second signal.

55. In an elastic fluid multi-stage turbine as defined in claim 54 and further including third means responsive to the pressure of fluid admitted into said turbine for generating a third signal which is a function of a chosen minimum pressure in said admitted fluid, said controlling means being in circuit with said first, second and third signal generating means for producing said first resultant signal controlled in accordance with said second signal and limited to a predetermined value in accordance with said minimum pressure.

56. In an elastic fluid multi-stage turbine which includes a rotatably mounted output shaft, and inlet valve means governing the flow of fluid to said turbine; means responsive to the speed of said output shaft for generating a first signal which is a function of said speed and a second signal which represents a chosen load at a given speed, means in circuit with said first generating means for comparing said first and second signals and for integrating the difference therebetween to produce a time integrated signal, means in circuit with said generating means and said integrating means for modifying said first signal with said time integrated signal to produce a resultant signal, and a network controlled by said resultant signal for governing the position of said inlet valve means.

57. In an elastic fluid multi-stage turbine which includes a rotatably mounted output shaft, inlet valve means governing the flow of fluid to said turbine, an extraction conduit connected to an intermediate stage of said turbine and extraction valve means which governs the proportion of fluid which flows from the intermediate stage to a succeeding stage of the turbine; the combination comprising first means responsive to the speed of said output shaft for generating a first signal which is a function of said speed, second means responsive to the pressure in said extraction conduit for generating a second signal which is a function of the pressure in said extraction conduit, means for admitting fluid into said extraction conduit, said second means generating a third signal which is a function of the pressure of said admitted steam, means in circuit with said generating means for modifying said first signal with said second and third signals and for modifying said second and third signals with said first signal, a first network controlled by said modified first signal for governing the position of said inlet valve means, and a second network controlled by said modified second and third signals for governing the position of said extraction valve means.

No references cited.

SAMUEL LEVINE, *Primary Examiner.*